United States Patent [19]

Sundberg

[11] Patent Number: 4,908,763

[45] Date of Patent: Mar. 13, 1990

[54] SPECTRAL DATA PROCESSING METHOD FOR DETECTION OF HYDROCARBONS

[75] Inventor: Kenneth R. Sundberg, Bartlesville, Okla.

[73] Assignee: Phillips Petroleum Company, Bartlesville, Okla.

[21] Appl. No.: 242,942

[22] Filed: Sep. 9, 1988

[51] Int. Cl.$^4$ .......................... G01V 5/00; G01V 5/02
[52] U.S. Cl. ..................................... 364/420; 250/253
[58] Field of Search ................. 364/420, 421; 250/253

[56] References Cited

U.S. PATENT DOCUMENTS 4,678,911 7/1987 Sundberg et al. .................. 250/253

OTHER PUBLICATIONS

Thiessen, R. L. et al., "Surface Reflectance Correction and Stereo Enhancement of Landsat Thematic Mapper Imagery for Structural Geologic Expoloration", Thematic conference on Remote Sensing for Exploration Geology, Reno, NV, Sep. 29, 1986, published in report number PNL-SA-13832, Nov. 1986, p. 12.

Everett, J. R. et al., "Evaluation of Thematic Mapper Performance as Applied to Hydrocarbon Exploration", NASA Conference Publication 2355, NASA Scientific & Technical Information Branch, Washington, DC, 1985, 119-IV, p. 125.

Hurtak, J. et al., "Strategies for Radar Penetration of Oil Shale and Tar Sands for New Energy Sources", Miami Internatinal Conference on Alternative Energy Sources, Miami, FL, Dec. 9, 1985, published by Hemisphere Publishing, New York, Report No. CONF-851201, 3-26.

Collins, W. et al., "High Spectral Resolution of Imaging Systems for 1984", Proceedings of the International Symposium on Remote Sensing of Environment, Third Thematic Conference: Remote Sensing for Exploration Geology, Colorado Springs, CO, Apr. 16, 1984, published by Environmental Research Institute of Michigan, Ann Arbor, MI, Report No. CONF-840432, 1984, 293-4.

SAS® User's Guide: Statistics, Version 5 Edition, Cary, NC, SAS Institute, Inc., 1985, pp. 317-333 and 377-400.

DeGroot, M. H., i Probability and Statistics, Reading, Mass., Addison-Wesley Publishing Company, 1975, pp. 172, 173, 456-463, 530-532.

Snedecor, G. W. and W. A. Cochran, *Statistical Methods*, Ames, Iowa, Iowa University Press, 1967, pp. 215-220.

*Primary Examiner*—Clark A. Jablon
*Attorney, Agent, or Firm*—William R. Sharp

[57] ABSTRACT

A method of processing spectral data for the earth's surface is provided which effectively identifies areas having a high probability of containing hydrocarbons. The method involves processing of intensity values for various wavebands of radiation reflected from areas of the earth's surface which correspond to image elements called pixels. The intensity values are employed in conjunction with predetermined hydrocarbon productivity data (i.e. drilled productive, dry holes) to derive discriminant probability functions whose values for various pixels are indicative of the presence of hydrocarbons in those pixels.

16 Claims, 4 Drawing Sheets

SPECTRAL DATA PROCESSING METHOD FOR DETECTION OF HYDROCARBONS

BACKGROUND OF THE INVENTION

This invention relates to a method for processing spectral data for the earth's surface such that the results of such data processing can be used to predict the presence of hydrocarbons.

It is known to collect and process spectral data for the earth's surface for the purpose of locating hydrocarbons. According to one prior method, intensities for different wavebands of electromagnetic radiation reflected from the earth's surface are detected by an appropriate means, such as the LANDSAT satellite. This intensity data is then processed to give alteration indexes which can be used to predict the presence of hydrocarbons in certain areas.

Although the above-described prior method provides excellent results, improvement and further development would be desirable.

SUMMARY OF THE INVENTION

It is, therefore, an object of the invention to provide an improved spectral data processing method for identifying areas which are potentially productive with respect to hydrocarbons.

The object is realized by a method of processing spectral data for a preselected set of pixels which correspond to adjacent areas of the earth's surface, wherein the method comprises: selecting n waveband(s) as represented by the positive integers $1, \ldots, n$; obtaining intensity values for each waveband with respect to electromagnetic radiation reflected from the areas of the earth's surface corresponding to each pixel so as to yield an intensity data set $\{x_1, \ldots, x_n\}$ for each pixel, where $x_1 \ldots, x_n$ corresponds to the intensity values for respective wavebands $1, \ldots, n$; dividing said intensity data sets into a predetermined number of disjoint data set clusters, wherein any one intensity data set is contained in only one cluster; determining the value of each of monotonic functions $f_1(x), \ldots, f_n(x)$, where x represents intensity, for each respective waveband for each pixel so as to yield a function data set $\{f_1(x_1), \ldots, f_n(x_n)\}$ for each pixel, wherein $f_1(x_1), \ldots, f_n(x_2)$ are hereafter denoted as $y_1, \ldots, y_n$; selecting certain productive pixels and dry pixels, associated with each of the clusters, previously determined to correspond to hydrocarbon-bearing and nonbearing areas of the earth's surface respectively; determining a discriminant probability function, being a function of $y_1, \ldots, y_n$, for each cluster by utilizing the function data sets corresponding to the productive pixels and dry pixels associated with each respective cluster; and determining for each cluster the value of its corresponding discriminant probability function with respect to each function data set, the value of the discriminant probability function being indicative of the probability of the presence of hydrocarbons. Pixels can be determined to be either potentially productive or dry with respect to hydrocarbons based on their corresponding discriminant probability function values. Additionally, it is within the scope of certain aspects of the invention to plot a map based on probability values for the pixels. Such a map enables easy and fast identification of areas with high production potential.

The previously determined productive and dry pixels can be, by way of example, pixels containing productive and dry wells respectively. By using spectral data corresponding to these pixels, the discriminant probability function so obtained can be employed as an effective exploration tool in identifying potentially productive areas, as is further explained in the following description and as is demonstrated in a subsequent example.

DETAILED DESCRIPTION OF THE INVENTION

Figure 1:
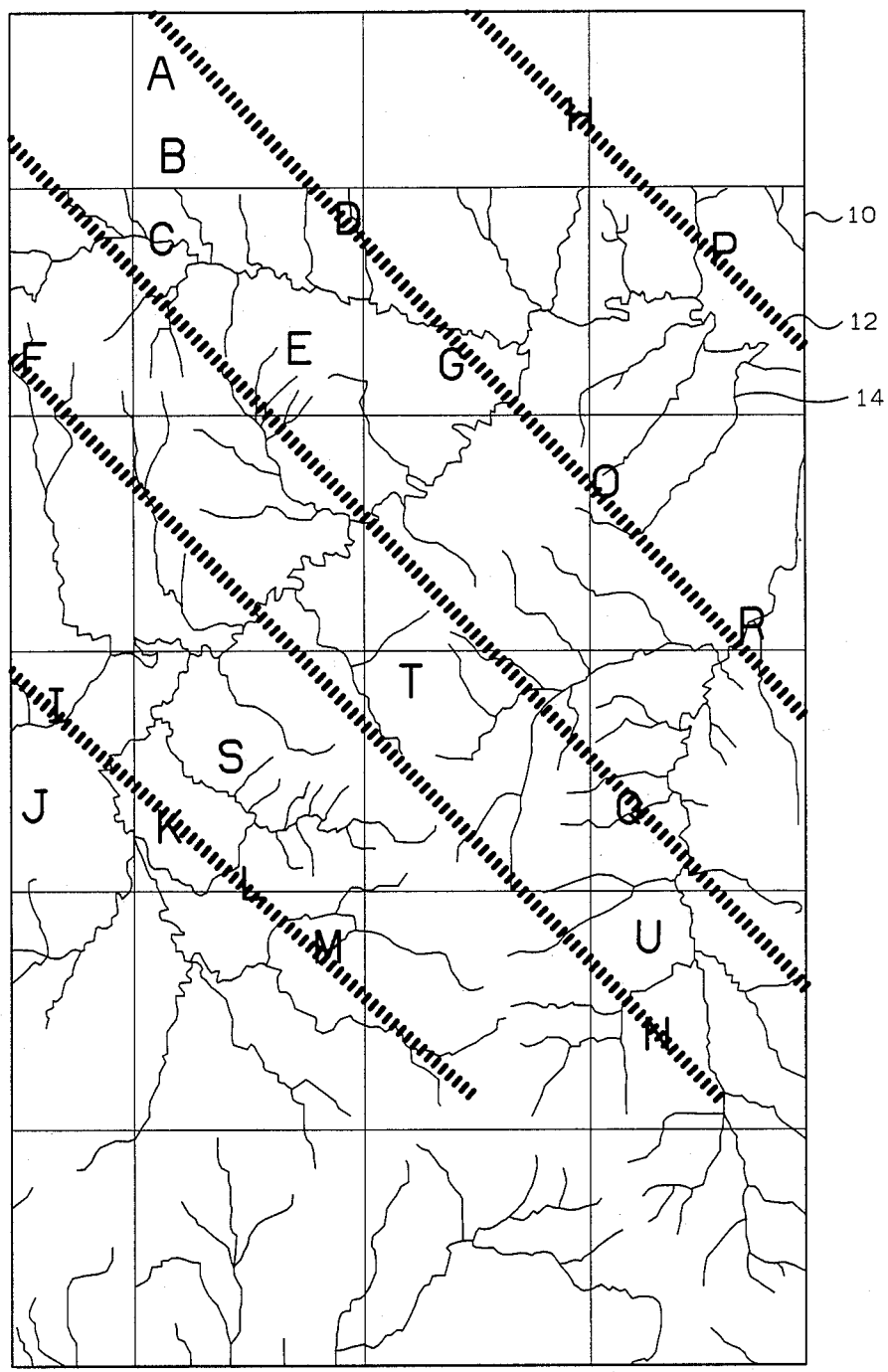
FIG. 1 is a map of an area for which spectral data was processed in accordance with the invention. Letters A-U indicate areas which have high discriminant probability function values associated therewith and are therefore considered to be good production prospects. The map also shows stream drainage with solid dark lines and producing trends with dashed lines.

A preferred embodiment of the invention will now be described. First however, it is appropriate at this point to define several terms which are used repeatedly throughout the following description.

A "pixel" as used herein is an element of an image that corresponds to an area of the earth's surface, typically square in shape.

A "waveband" is range of wavelengths in the electromagnetic spectrum.

A "cumulative probability density function (CPDF)" is a function such that for an arbitrary parameter Z associated with a number of observations (corresponding to a number of pixels, for examples) CPDF (Z) for a particular value of Z is the fraction of the total number of observations having parameter values less than the particular value of Z.

A "data set" is groups of data elements which are listed hereafter by enclosing them in braces.

A "mean data set" is that data set derived by averaging the data elements of the various data sets in a group of data sets.

A "vector" is a means by which a data set can be expressed. For example, the data set $\{x_1, \ldots, x_n\}$ is expressible as vector x which has components $x_1, \ldots, x_n$. Any vector subsequently discussed is assumed to be a column vector, unless stated otherwise, which can be defined as an $n \times b$ 1 matrix having n rows and one column.

The "transpose" of a vector is denoted by a prime symbol ('), which indicates interchanging of rows and columns. The transpose of a column vector ($n \times 1$ matrix) is a row vector ($1 \times n$ matrix).

The various steps of an embodiment of the invention are as follows. Some of the steps may be performed in a different order if desired.

1. Select Waveband(s)

It is within the scope of the invention to select any number, including only one, and/or combination of wavebands since the presence of hydrocarbons will have at least some effect on the spectral reflective properties of the earth's surface with respect to virtually any waveband. The number of wavebands selected is hereafter denoted as n such that the wavebands are represented by the positive integers $1, \ldots, n$. However, it is preferable to use at least two different wavebands, and it is most preferable to use at least three different wavebands. It is also desirable that at least one of the wavebands is a green waveband in the wavelength range of about 500 nm to about 600 nm since the reflective properties of the earth's surface have been found to be highly affected for this waveband. Employing the green waveband in combination with a red waveband in the wavelength range of about 600 nm to about 700 nm is particularly advantageous in giving results which closely correlate with the presence of hydrocarbons. Such a combination of wavebands along with a third infrared waveband (i.e. wavelength greater than 700 nm) is demonstrated to be particularly effective in a subsequently described example.

2. Obtain Intensity Values for Each Waveband

Spectral data, as hereafter described in detail, is collected with respect to a preselected section of the earth's surface which can be divided for the purpose of spectral data collection into a plurality of pixels. This section of the earth's surface can contain from, for example, about 500 to about 100,000 pixels, and more preferably from about 30,000 to 50,000 pixels.

Most conveniently, spectral data for each pixel is collected by means of one of the LANDSAT satellites. One type of LANDSAT satellite uses a multispectral scanner which has the capability of detecting radiation in several different wavebands, including a green waveband in the wavelength range of about 500 nm to about 600 nm, a red waveband in the wavelength range of about 600 nm to about 700 nm, and infrared wavebands in the wavelength ranges of 700–800 nm and 800–1,100 nm.

In operation, the scanner aboard LANDSAT scans the earth's surface so as to receive radiation being reflected from each of the separate pixels. For each pixel, the scanner produces an electrical signal proportional to the energy reflected from the pixel for each waveband. These signals are then transmitted in digital form to a ground station for recording. The signal produced and transmitted as described is generally proportional to the intensity of radiation received by the multispectral scanner for each pixel. However, the recorded signal is divided into 64 unitless increments, such that a signal for a particular pixel is assigned a digit from 0 to 64. The parameter thus detected and measured by the LANDSAT scanner is usually called "brightness", which is a nonphysical parameter, but is generally proportionally related to intensity. Therefore, throughout this description, the term intensity will be regarded as synonymous with the term brightness.

LANDSAT data can be obtained in digital or image form and can be purchased from the EOSAT Corp. at the EROS Data Center, Sioux Falls, S.D. If data is purchased in image form, a photographic representation of the terrain is supplied which is typically converted to digital form for processing. Most conveniently for the purposes of this invention however, data is obtained in digital form on computer-compatible tapes. Typically, as purchased, a LANDSAT tape will contain data for what is called a "scene". Such a scene is a relatively large area of the earth's terrain which includes about 7 millions pixels. Thus, only a portion of section of the terrain is usually selected from the scene whose associated data is processed according to the present method.

Although the preferred embodiment is described as employing LANDSAT data, the above data could alternatively be collected by means of a scanner aboard an aircraft similar to that described in U.S. Pat. No. 4,421,981 of Hough.

By using the LANDSAT data for the section of interest, an intensity value is obtained for each selected waveband with respect to each pixel of the section so as to yield an intensity data set $\{x_1, \ldots, x_n\}$ for each pixel where $x_1, \ldots, x_n$ corresponds to the intensity values for respective wavebands $1, \ldots, n$. It should be noted that these integers as they are arbitrarily assigned to particular wavebands are solely for convenience of notation to differentiate between the wavebands. An integer $1, \ldots$, or n can be arbitrarily assigned to each of the n wavebands. For example, for two selected red and green wavebands, the integer 1 could be assigned to the green waveband and the integer 2 could be assigned to the red waveband, or vice versa.

3. Divide Intensity Data Sets Into Disjoint Clusters

The various intensity data sets are now divided into a preselected number, preferably 3 to 5, of disjoint clusters such that any one intensity data set is in only one cluster. It is most advantageous to group data sets corresponding to pixels with similar spectral properties into a particular cluster. The final clusters generally correspond to pixels having similar terrain. For example, one cluster may correspond to areas of scrub oak, another cluster may correspond to pasture, and yet another may correspond to heavy vegetation along river or creek banks. Therefore, the effects hydrocarbons have on vegetation and/or soil in any particular cluster is relatively uniform among the various pixels so as to enable derivation of statistically significant discriminant probability functions for each cluster.

A preferred procedure (FASTCLUS) for clustering data sets is described below. It should be understood, however, that any other clustering technique is within the scope of the invention.

The FASTCLUS procedure is discussed in detail on pages 377–400 of the *SAS® User's Guide: Statistics, Version 5 Edition*, published by the SAS Institute Inc. of Cary, N.C., copyrighted in 1985. Software employing this procedure is available from the SAS Institute. The FASTCLUS procedure, as carried out in accordance with a preferred embodiment of the invention, performs a disjoint cluster analysis on the basis of Euclidean distances. By way of example, Euclidean distance between two data sets and their associated vectors $\alpha$ (having components $\alpha_1, \ldots \alpha_n$) and $\beta$ (having components $\beta_1, \ldots \beta_n$) can be defined as $\sqrt{(\alpha_1-\beta_1)^2 + \ldots (\alpha_n-\beta_n)^2}$. For the purpose of the following description of FASTCLUS, the term "distance" is understood to mean Euclidean distance.

By way of example and for the sake of illustration of FASTCLUS, assume that four clusters are desired. Four intensity data sets are randomly selected. These randomly selected data sets are called "seeds". The distance between each remaining intensity data set and each respective seed is then determined and each data set is assigned to the nearest seed. Assignment of a data set to a particular seed means that data set is a member of the cluster associated with that seed. Each data set is assigned to only one cluster. The various intensity values associated with the data sets in each cluster are now averaged to derive a means data set which replaces the seed. Distance from each remaining data set to the mean data sets are determined to decide which data sets are closest to which means such that the data sets are reassigned to the nearest mean. This procedure is repeated as many times as is necessary until the means either do not move anymore, or as is more typical, move less than a predetermined distance. At this final state of FAST-CLUS, the final four clusters according to this illustration are formed by assigning each data set to the nearest mean such that the data set is a member of the cluster associated with that nearest mean.

4. Determine the Value of Functions for Each Pixel

The next step of the method is to determine the value of each of functions $f_1(x), \ldots, f_n(x)$ for each respective waveband for each pixel in each cluster so as to yield a function data set $\{f_1(x), \ldots, f_n(x_n)\}$ for each pixel in each cluster. The function $f(x)$ should be monotonic. That is, the function should either increase or decrease in value as the intensity value x increases. The functions $f_1(x), \ldots, f_n(x)$ may be the same or different, but are most conveniently the same, and are most preferably cumulative probability density functions (CPDF's) for each cluster. Using this particular type of function is advantageous primarily because it changes in value rapidly around the mean intensity data set of each cluster. Thus with respect to a particular cluster, and a particular intensity data set in that cluster, CPDF ($x_1$) is the fraction of the total number of pixels in that cluster which have intensity values for the first waveband less than a particular intensity value $x_1$. The function is applied similarly to intensities for the other wavebands and for other pixels in the cluster, and function data sets are obtained for the remaining clusters.

For ease of notation $f_1(x_1), \ldots, f_n(x_n)$ will hereafter be denoted $y_1, \ldots, y_n$.

5. Select Productive and Dry Pixels

Certain pixels are now selected from each of the clusters which have previously determined to be hydrocarbon-bearing and nonbearing respectively. It is preferable to select at least one such productive or dry pixel for each approximately six to ten square mile area, and most preferably for each three square mile if possible.

Such pixels can be determined to be either dry or productive by employing any reliable technique. Of course, if the information is available it is most desirable to assign certain pixels as being productive or dry based on the presence of productive or dry wellsites located with the respective pixels. However if such information is not available, other means of selecting such pixels can be used, such as geochemical techniques. One particularly suitable geochemical technique is known as MOST (Microbial Oil Survey Technique) which is described in U.S. Pat. No. 2,880,142 of Hitzman. Certain pixels could be assigned to be "productive", or hydrocarbon-bearing, or "dry", nonbearing, based on geochemical survey results for such pixels.

5. Determine Discriminant Probability Function for Each Cluster

A discriminant probability function (being a function of $y_1, \ldots, y_n$ which represents $f(x_1), \ldots, f(x_n)$ as noted above) is now determined for each cluster by utilizing the function data sets which correspond to the productive and dry pixels associated with each respective cluster. The value of such a function for a pixel should be indicative of the probability of the presence of hydrocarbons in that pixel. Although any probability function having this property is within the scope of the invention, a function obtained by the DISCRIM procedure is presently preferred.

The DISCRIM procedure is described on pages 317–333 of the *SAS® User's Guide*, supra, which is hereby incorporated by reference. This procedure as applied to a particular cluster develops a discriminant probability function corresponding to that cluster by making use of a measure known as generalized square distance. The notation below is used to described generalized squared distance:

| | |
|---|---|
| p,d | subscripts to distinguish productive and dry groups of function data sets belonging to a particular cluster |
| $S_p$, $S_d$ | the covariance matrices within groups p and d |
| $\|S_p\|$, $\|S_d\|$ | the determinants of $S_p$ and $S_d$ |
| S | the pooled covariance matrix |
| y | a vector having as components $y_1, \ldots, y_n$ |
| $m_p$, $m_d$ | the vectors having as components the members of the mean function data sets for groups p and d |
| $q_p$, $q_d$ | the prior probabilities for groups p and d which are each assumed to be .50, thereby denoting equal probabilities of any function data set being in groups p or d. "Prior" denotes assumed probability before the present discriminant analysis. |

Covariance matrices are well known in the field of statistics (i.e. multivariate analysis) and are discussed in, for example, the text *Probability and Statistics* by Morris H. DeGroot, Addison-Wesley Publishing Co., 1975, pp. 530–532, such pages being hereby incorporated by reference. A covariant matrix of y (having variable components $y_1, \ldots, y_n$) is defined to be the n × n matrix such that for i=1, ..., n and j=1, ..., n, the element in the ith row and jth column is the covariance of $y_i$ with respect to $y_j$, or Cov ($y_i, y_j$). The concept of covariance is discussed in the Degroot text on pages 172–173. A "within group" covariant matrix is the covariant matrix constructed from data sets in a particular group, whereas the pooled covariant matrix is the covariant matrix derived by averaging the elements of the p and d within group matrices.

The generalized square distance from a vector y to, for example, the mean vector $m_p$ is $$D_p^2(y) = g_1(y,p) + g_2(p) \qquad (1)$$

where $$g_1(y,p) = (y-m_p)'S_p^{-1}(y-m_p) + \log_e |S_p| \qquad (2)$$

if the within-group covariance matrix is used, or $$g_1(y,p) = (y-m_p)'S^{-1}(y-m_p) \qquad (3)$$

if the pooled covariance matrix is used; and $$g_2(p) = -2 \log_e (q_p) \qquad (4)$$

if the prior probabilities are not all equal, or $$g_2(p) = 0 \qquad (5)$$

if the prior probabilities are equal. As discussed above, the prior probabilities are assumed to be equal, so that $g_2(p) = 0$ and $$D_p^2(y) = g_1(y,p). \qquad (6)$$

The option of using within-group or pooled covariance matrices can be built into a suitable computer program (later set forth) for performing the various data processing steps. Of course, the generalized squared distance for group d is determined similarly.

The discriminant probability function for a particular cluster and for the productive group can be expressed in terms of generalized squared distance as follows:

$$P_p(y) = \frac{e^{(-0.5 D_p^2(y))}}{e^{(-0.5 D_p^2(y))} + e^{(-0.5 D_d^2(y))}} \qquad (7)$$

The value P of this function for a particular vector y corresponding to a particular function data set $\{y_1, \ldots, y_n\}$ is the probability that the pixel corresponding to this data set bears hydrocarbons.

6. Determine Value of Discriminant Probability Function With Respect to Each Pixel For each cluster, the value P of the corresponding discriminant probability function is determined with respect to each function data set and its corresponding pixel. Thus, a value P is assigned to each pixel.

7. Determine the Value of CPDF(P) for Each Pixel

It is preferable to determine the cumulative probability density function CPDF(P) for each pixel in each cluster rather than relying solely on the P values themselves. By determining CPDF(P) for each pixel, the result is a fractional value corresponding to each pixel which essentially ranks any particular pixel with respect to the other pixels. For example, a CPDF(P) value of 0.90 for a particular pixel means that 90% of the total number of pixels have P values less than the P value for this particular pixel.

8. Map CPDF(P) Values

A particularly effective but optional technique for visually illustrating the CPDF(P) values for pixels in a section involves mapping the CPDF(P) values by plotting on a map, of the areas corresponding to the pixels, locations having associated therewith pixels with CPDF(P) values above a predetermined value. Most preferably, different ranges of CPDF(P) values can be plotted so as to be visually distinguishable using various black and white notations or different colors. Such mapping is discussed and illustrated in a subsequent example.

9. Select Pixels as Potentially Productive Based on CPDF(P) Values

Certain pixels are now selected as potentially productive if their corresponding CPDF(P) values are above a predetermined value, which is preferably greater than 0.05. These selected pixels are now targeted as drilling prospects and can be further investigated with other hydrocarbon locating techniques if desired.

EXAMPLE

This example is provided to further illustrate the invention and should not be construed to limit the invention in any manner.

LANDSAT spectral data was obtained for a section in Kansas which is represented by the map in FIG. 1. The section contains 540,000 pixels and is divided by solid lines into 6 mile×6 mile square areas ("townships"), such as the one shown at 10. Intensity values were obtained for each pixel with respect to a green waveband (500 nm–600 nm), a red waveband (600 nm–700 nm) and an infrared waveband (800–1,100 nm), thus yielding three intensity values $x_1$, $x_2$ and $x_3$ for each pixel. Pixels in LANDSAT imagery correspond to areas of about one acre. To increase the pixel size to approximately twenty acres, the image was divided into 5×5 pixel blocks, and the intensity values $x_1$, $x_2$, $x_3$ for all the pixels in each block were averaged together to produce average intensities which characterized the larger twenty acre area as one single pixel.

This intensity data was processed in accordance with a preferred embodiment of the invention, described previously, by employing four clusters (derived with FASTCLUS) and CPDF functions for $f_1(x_1)$, $f_2(x_2)$ and $f_3(x_3)$ to derive the function data sets. In addition 258 dry pixels and 223 productive pixels were selected based on the presence of either dry or productive wellsites in the respective pixels. A discriminant probability function of the form of equation (7) was determined for each cluster using the DISCRIM procedure, and probability P values were computed for each pixel by utilizing these functions and within-group covariant matrices. Finally, CPDF(P) values were determined for each pixel. Of course, all of the data processing was performed by a computer using a computer program which is presented following this example.

Referring again to FIG. 1, "productive trends" are indicated by dashed lines as shown at 12. These trend lines are drawn so as to lie along actual producing fields. Drainage streams (mostly small creeks) are represented by solid lines as at for example 14. Letters A–U indicate areas having associated therewith CPDF(P) values of at least 0.60.

A and C–J correspond to producing fields and are used for control. It can be seen that these lie on or near producing trends. K–U are sites which have not been drilled, but are excellent prospects based on their high CPDF(P) values. K–R can be seen to lie on producing trends. S and T do not lie on producing trends, but are on circular drainage anamolies. That is, these are surrounded by drainage streams. Such an area is usually associated with a topographic high and corresponding subterranean structure (i.e. anticline) favorable to the presence of hydrocarbon deposits. U is not on a producing trend or drainage anamoly but corresponds to a very large area with high (above 0.06) CPDF(P) values, thus making it an attractive prospect. B corresponds to a producing field which does not lie on a trend or drainage anamoly. The fact that this area is indicated to be a good prospect according to the invention particularly demonstrates the effectiveness and usefulness of the invention. B is indicated by the invention to be likely to bear hydrocarbons, which in fact it does; and moreover the area is not indicated by conventional analysis (considered here) to be a good prospect.

Figure 2:
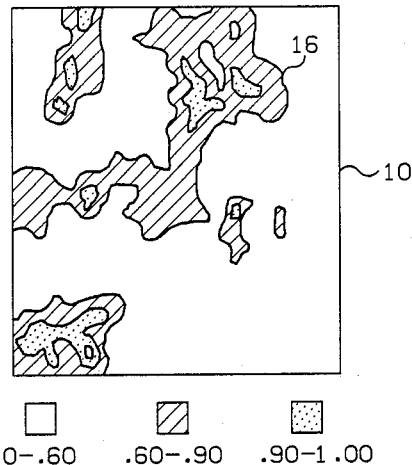
FIG. 2 is an enlarged depiction of one area (township) shown in the map of FIG. 1. This Figure is a contour map representative of discriminant probability function values as will be discussed further below.

Referring to FIG. 2, there is shown a contour plot of area 10 in which areas with CPDF(P) values within certain ranges are plotted. As shown, areas with CPDF(P) values of 0–0.60 are illustrated as white background, areas with values of 0.60–0.90 are crosshatched, and areas with values of 0.90–1.00 are stippled (dotted). Reference character 16 denotes a particularly large area with high CPDF(P) values which has at its center smaller areas with the highest CPDF(P) values of 0.90–1.00. This area is thus considered a very good prospect and corresponds to P in FIG. 1.

Figure 3:
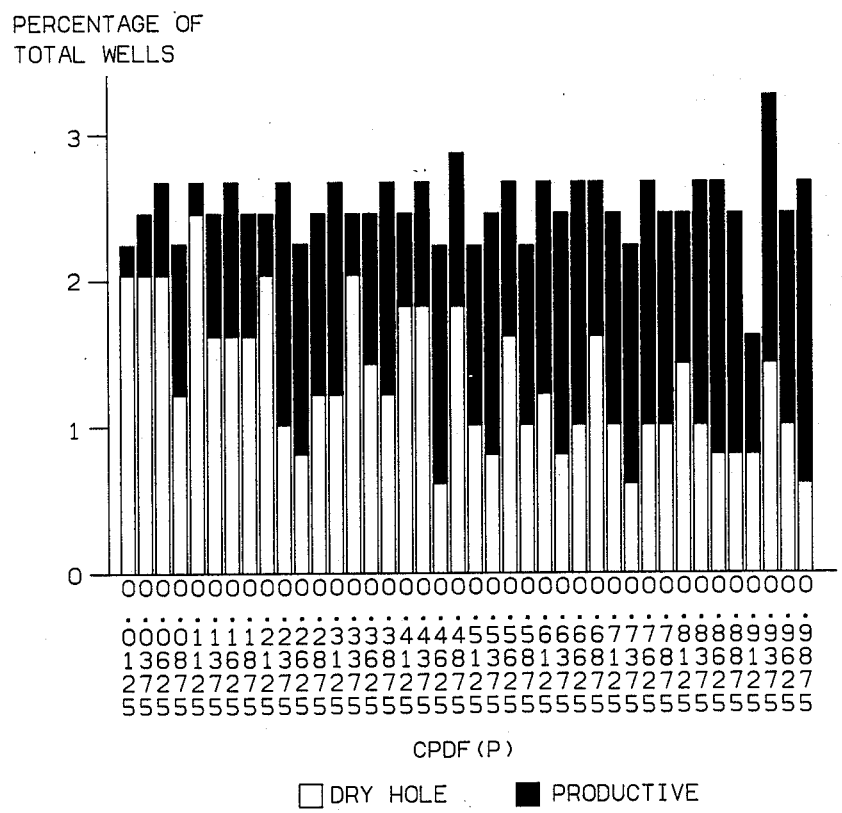
FIG. 3 is a graph which correlates the number of dry wells and successful wells with various probability values obtained according to the invention.

Referring to FIG. 3, there is shown a graph which clearly illustrates the effectiveness of the invention in predicting the presence of hydrocarbons. The horizontal axis corresponds to CPDF(P) values, and the vertical axis corresponds to the percentage of the total number (491) of wells in section 10. For example, for a CPDF(P) value of 0.0125, about 2% of the total number of wells which are located in pixels having this CPDF(P) value are dry holes, whereas only about 0.2% are productive. As the CPDF(P) values increase, it can be seen that the productive percentage generally increases. Thus, the CPDF(P) value produced by the present invention is clearly correlated with the presence of hydrocarbons.

A table is set forth below which gives the prediction results obtained for the wellsite pixels (those containing wells) if an arbitrary threshold level of 0.50 is selected for CPDF(P). That is, if one of the wellsite pixels has a CPDF(P) value of above 0.50, it is classified as productive.

| Drilling | Discriminant Prediction | | Total |
|---|---|---|---|
| Result | Dry | Productive | Wells |
| Dry Hole | 156 | 102 | 258 |
| Productive | 87 | 146 | 223 |
| Total | 243 | 248 | 491 |
| Success Rate | 64% | 58% | 45% |

Thus, the method of the invention predicts that of the 491 total wellsites, a total of 248 will be productive and 243 will be dry. Of the 248 predicted to be productive, 146 are actually productive, but 102 are dry. Dividing 146 into 248 gives a success rate of about 58% with respect to predicting whether or not certain sites will be productive. This compares favorably with the actual success rate of only 45%, derived by dividing the total number of actual productive wells (223) into the total number of wells drilled (491). Thus, success rates could be improved up to 13% simply by screening drilling targets in accordance with the present invention.

The statistical significance of the data in the above Table can be shown using the chi-squared test. The chi-squared test is a well known test in the field of statistics which measures the extent to which a contingency table, like the table above, departs from random chance. The larger the value of chi-squared, the larger the departure from randomness. A discussion of chi-squared can be found in, for example, the text *Statistical Methods*, sixth edition, by Snedecor and Cochran, Iowa University Press, 1967, on pages 215–220. The chi-squared test was carried out by performing a series of 51 separate runs in which the 491 wellsites were assigned to be either productive or dry on a purely random basis.

Figure 4:
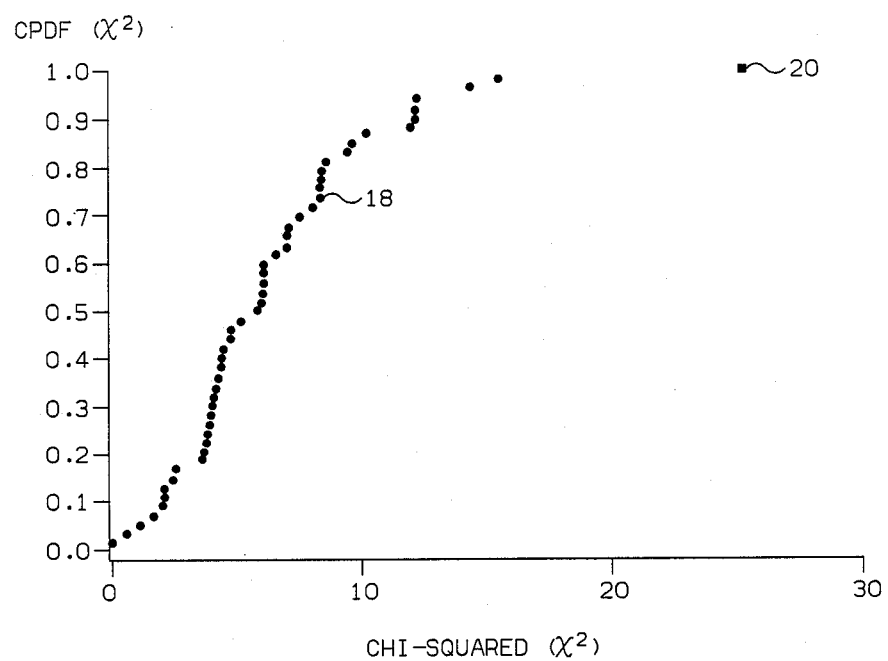
FIG. 4 is a graph which illustrates the chi-squared test with respect to the invention which, as is discussed further below, shows the statistical significance of results obtained in accordance with the invention.

The results of these random runs as compared with the results obtained according to the invention are shown in FIG. 4. The points as shown at 18 indicate the chi-squared values obtained with the random runs, and the rectangle at 20 indicates the chi-squared value obtained by application of the invention to real field data. These values are plotted versus CPDF($\chi^2$), where $\chi$ is the symbol chi, and where the CPDF($\chi^2$) values for a particular run indicates the fraction of runs having smaller chi-squared values. The graph shows that the results of the invention as set forth in the above table give a chi-squared value of about 26.2 as compared with much lower chi-squared values for the random runs. This shows the statistical significance of the results obtained according to the invention, and proves that these results were not obtained due to random chance.

SUMMATION

Figure 5:
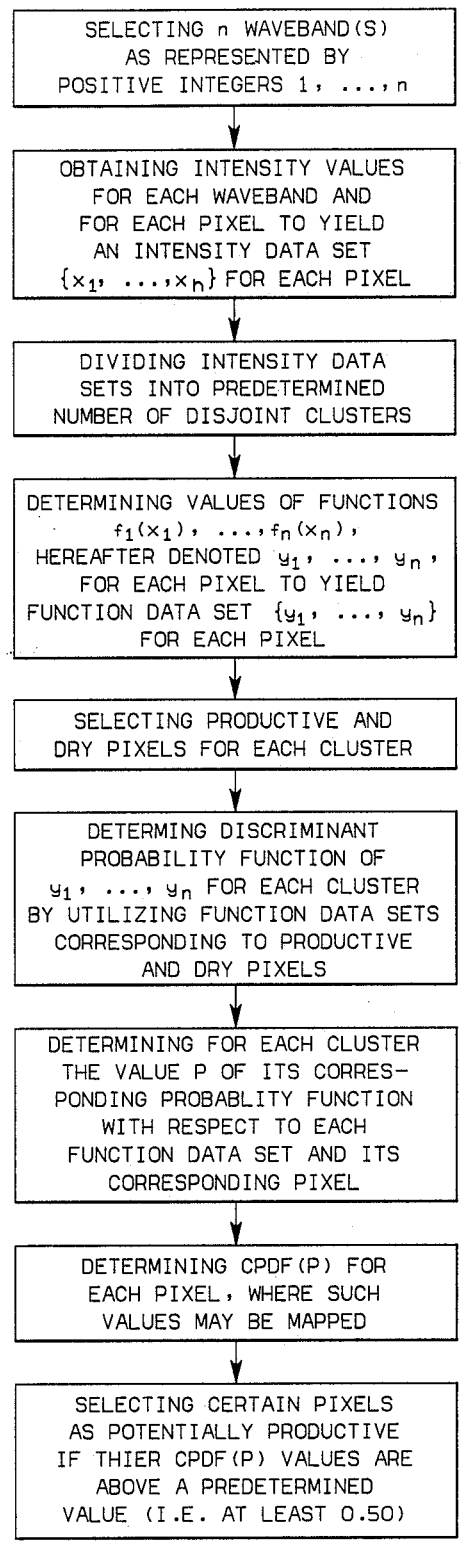
FIG. 5 is a flow chart illustrating the various steps performed in accordance with a preferred embodiment of the invention.

Referring now to FIG. 5, there is shown a flow chart which outlines the various steps of a preferred embodiment of the invention. The invention, as has been demonstrated above, provides a technique of processing spectral data which effectively predicts the presence of hydrocarbons in selected areas.

Obviously many modifications and variations of the present invention are possible in light of the above teachings. It is therefore to be understood that within the scope of the appended claims the invention may be practiced otherwise than as specifically described.

COMPUTER PROGRAM

There immediately follows a preferred computer program for carrying out the various data processing steps of the invention. This program is written for an IBM 3090 computer and is self-explanatory to one skilled in the use of the IBM 3090 computer. The input required into the computer program is the imagery data over an area (section) of interest, photogrammatic and geographic coordinates of specific locations on the earth's surface; geographic coordinates of a set of points on the earth's surface known to be productive; similar coordinates for a set of points known to be nonbearing; certain special mapping data such as the geographic coordinates of specific section, township and range boundaries.

```
DSNAME = '#25B.IMGRDRVR.CLIST'                                      VOL=SER=TSOV16
DCB=(RECFM=FB,LRECL=80,BLKSIZE=6160)                                09/09/88 253 13:38:14

/* ******************************************************************00000010
/*          COMMAND FILE FOR GLOBAL STATISTICAL ANALYSIS              00000020
/*               OF IMAGERY DATA                                      00000030
/* ******************************************************************00000050
FREE FI(SYSPROC ISPPLIB)                                             00000060
ALLOC FI(SYSPROC) DA('#25B.IMGRCLST.DATA' +                          00000070
                    '#25B.IMGRAPLC.DATA') SHR                        00000075
ALLOC FI(ISPPLIB) DA('#25B.IMGRCLST.DATA  +                          00000080
                    '#25B.IMGRAPLC.DATA' +                           00000085
                    'SYS1.ISPPLIB') SHR                              00000090
ISPF CMD(PRIMARY)                                                    00000100
FREE FI(SYSPROC)                                                     00000110
FREE FI(ISPPLIB)                                                     00000120
ALLOC FI(ISPPLIB) DA('SYS2 ISPFPDF.ISPPLIB' +                        00000130
                    'SYS1.ISPPLIB') SHR                              00000140
```

```
DSNAME = '#25B.IMGRCLST.DATA(PRIMARY)'                           VOL=SER=TSOV16
DCB=(RECFM=FB,LRECL=80,BLKSIZE=9440)                       09/09/88 253 13:37:47
/***********************************************************************/
/*                                                                     */
/* DIRECTS THE STATISTICAL ANALYSIS AND DISPLAY OF THE                 */
/*     IMAGERY DATA                                                    */
/*                                                                     */
/* 1. DISPLAY THE PRIMARY SELECTION MENU.                              */
/* 2. CARRY OUT THE CALULATION SPECIFIED.                              */
/*                                                                     */
/***********************************************************************/
CONTROL LIST CONLIST MSG END(ENDO)
SET &PRGM=
ISPEXEC DISPLAY PANEL(PRMYTBL)
ISPEXEC SELECT CMD(&PRGM)
END

DSNAME = '#25B.IMGRCLST.DATA(PRMYTBL)'                           VOL=SER=TSOV01
DCB=(RECFM=FB,LRECL=80,BLKSIZE=9440)                       08/24/88 237 14:24:51
)ATTR
/* ********************************************************************/
/* PANEL TO SELECT IMAGERY ALTERATION SIGNATURE ANALYSIS
/*
/*     LANDSAT DATA REDUCTION
/*
/*   1    MSSPRSNG   PERFORMS BASIC IMAGERY OPERATIONS SUCH AS
/*                   DEFINITION OF STUDY AREA, MAP TRANSFOMATIONS,
/*                   AND A PRIORI SIGNATURE DEFINITION.
/*   2    GCHMDSCR   TRAINS AND APPLIES AN IMAGERY DISCRIMINANAT
/*                   FUNCTION BASED ON GEOCHEMICAL DATA.
/*   3    PRDCDSCR   TRAINS AND APPLIES AN IMAGERY DISCRIMINANAT
/*                   FUNCTION BASED ON DRILLING OUTCOMES
/*   4    MAPS       SECOND LEVEL OF PROGRAM MENU TO MAKE MAPS
/*                   OF IMAGERY DATA
/*   5    CODE       THIRD LEVEL OF PROGRAM MENU TO SET UP CPS CODE
/*                   FOR IMAGERY ANALYSIS
/* ********************************************************************/
)BODY
%LANDSAT IMAGERY ALTERATION SIGNATURE ANALYSIS SYSTEM
%
% IMAGERY DATA PROCESSING
%
%  MSSPRSNG  LOCATE STUDY AREA, TRANSFORM COORDINATES, COMPUTE SIGNATURE
%
% SIGNATURE FROM GEOCHEMICAL OR PRODUACTION TRAINING
%
%  GCHMDSCR   TRAINS AND APPLIES GEOCHEMICAL DISCRIMINANT FUNCTION
%  PRDCDSCR   TRAINS AND APPLIES PROODUCTION DISCRIMINANT FUNCTION
%
% MAPPING OPERATIONS
%
%  MAPS       DRAWS COLOR CONTOUR MAPS OF IMAGERY DATA
%
% PROGRAM NAME ===>+_PRGM                        +
)END

DSNAME = '#25B.IMGRCLST.DATA(MSSPRSNG)'                          VOL=SER=TSOV01
DCB=(RECFM=FB,LRECL=80,BLKSIZE=9440)                       08/24/88 237 14:24:51
/***********************************************************************/
/*                                                                     */
/* DIRECTS THE STATISTICAL ANALYSIS AND DISPLAY OF THE                 */
/*     MICROBIAL OIL SURVEY TECHNIQUE (MOST) DATA                      */
/*                                                                     */
/* 1. DISPLAY THE PRIMARY SELECTION MENU.                              */
/* 2. CARRY OUT THE CALULATION SPECIFIED.                              */
/*                                                                     */
/***********************************************************************/
CONTROL LIST CONLIST MSG END(ENDO)
SET &PRGM=
ISPEXEC DISPLAY PANEL(BSCPRSNG)
ISPEXEC SELECT CMD(&PRGM)
END

DSNAME = '#25B.IMGRCLST.DATA(BSCPRSNG)'                          VOL=SER=TSOV01
DCB=(RECFM=FB,LRECL=80,BLKSIZE=9440)                       08/24/88 237 14:24:51
)ATTR
/* ********************************************************************/
/* PANEL TO SELECT IMAGERY ALTERATION SIGNATURE ANALYSIS
/*
/*     LANDSAT DATA REDUCTION
/*
/*   1    STDYARA    CALCULATE THE SAMPLE AND LINE NUMBERS FOR
/*                   THE CORNERS OF A RECTANGULAR LONG-LAT AREA
/*   2    SUBIMAGE   EXTRACTS A SUBIMAGE FROM A LANDSAT SCENE
/*                   XFER TAPE GENERATED BY I**2S SYSTEM
```

```
/*    3     LTLNGiMG   ONLINE PROCESSING OF IMAGERY DATA FROM SUBIMAGE
/*                     TO DEFINE THE ALTERATION SIGANTURE
/*    4     LTLNGCLS   ONLINE PROCESSING OF IMAGERY DATA FROM SUBIMAGE
/*                     TO STANDARDIZE IT WITH RESPECT TO IMAGERY
/*                     CLUSTERS AND DEFINE THE ALTERATION SIGANTURE
/*    5     DSCRMNT    ONLINE PROCESSING OF IMAGERY DATA FROM SUBIMAGE
/*                     TO DEFINE THE ALTERATION SIGANTURE USING
/*                     AVAILABLE GEOCHEM DATA FOR TRAINING A DISCRIMINANT
/*    6     GRAPHICS   SASGRAPH ANALYSIS OF IMAGERY AND SIGNATURE
/*                     PRODUCED BY LTLNGIMG
/* ************************************************************/
)BODY
%LANDSAT IMAGERY ALTERATION SIGNATURE BASIC PROCESSING SYSTEM
%
% IMAGERY DATA LOCATION
%
%  STDYAREA   SMPL LINE NUMBERS OF CORNERS OF RECTANGULAR LONG-LAT AREA
%  SUBIMAGE   EXTRACTS RECTANGULAR SUBSCENE FROM SYSTEM 101 XFER TAPE
%
% SIGNATURE DEFINITION
%
%  LTLNGIMG   LONG-LAT AND SIGNATURE FOR BASIC IMAGERY
%  LTLNGCLS   LONG-LAT AND SIGNATURE FOR CLUSTER STANDARDIZED IMAGERY
%  GRAPHICS   GRAPHICS ANALYSIS OF LTLNGIMG RESULTS
%
% PROGRAM NAME ===>+_PRGM                +
)END
DSNAME = '#25B.IMGRCLST.DATA(LTLNGCLS)'                    VOL=SER=TSOV01
DCB=(RECFM=FB LRECL=80,BLKSIZE=9440)                     08/24/88 237 14:24:51

/* ************************************************************
/* COMMANDS COMPUTE THE LONG-LAT AND CPDF'S FOR BANDS 4, 5, AND 7
/* TOGENTHER WITH THE MSS ALTERATION SIGNATURE AND CPDF OF THE
/* ALTERATION SIGNATURE FOR EACH LINE AND SAMPLE LOCATION
/* SUPPLIED TO THE ROUTINE.
/*
/* INPUT ARE DATA SETS CONTAINING THE FOLLOWING:
/*
/*  1. GEOGRAPHIC COORDINATES OF A SET OF MOMUMENT POINTS WHICH CAN
/*     BE RELIABLY LOCATED ON BOTH TOPO MAPS AND THE LANDSAT IMAGE.
/*
/*  2. PHOTOGRAPHIC MAP COORDINATES OF THE MOMUMENT POINTS FOR WHICH
/*     LONG.-LAT. VALUES HAVE BEEN DETERMINED.
/*
/*  3. LINE AND SAMPLE NUMBERS AND BRIGHTNESS VALUES OVER APPROPRIATE
/*     PIXEL COLLECTIONS IN A LNADSAT IMAGE. THESE DATA ARE IN A
/*     SAS DATA BASE.
/*
/* OUTPUT ARE THE FOLLOWING:
/*
/*  1. SAS DATA BASE CONTAINING THE IMAGE BRIGHTNESS AND CPDF BRIGH-
/*     NESS FOR ANDS 4, 5. AND 7; THE CPDF BRGIHTNESS OF BANDS 4, 5,
/*     AND 7, THE MSS ALTERATION SIGNATURE, AND THE CPDF OF THE
/*     MSS ALTERATION SIGNATURE.
/*
/*     THE SAS DATA BASE IN 1. ABOVE MAY BE SAVED IN ITS OWN DATA SET,
/*     OR IT AN OVERWRITE THE DATA BASE IN 3. ABOVE.
/*
/* ************************************************************
CONTROL LIST CONLIST MSG END(ENDO)
I  EXEC CONTROL DISPLAY REFRESH
ISPEXEC VGET (PHTOCNTL GEOGCNTL PHTOCRNR SASALTRN) PROFILE
ISPEXEC DISPLAY PANEL(ALTRDTST)
ISPEXEC VPUT (PHTOCNTL GEOGCNTL PHTOCRNR SASALTRN) PROFILE
ISPEXEC CONTROL DISPLAY REFRESH
ISPEXEC VGET (WSTBNDRY ESTBNDRY NRTBNDRY STHBNDRY) PROFILE
ISPEXEC DISPLAY PANEL(BOUNDARY)
ISPEXEC VPUT (WSTBNDRY ESTBNDRY NRTBNDRY STHBNDRY) PROFILE
CLO: +
ISPEXEC VGET (NCLUS CLSPLT) PROFILE
ISPEXEC DISPLAY PANEL(CLUSTERS)
ISPEXEC VPUT (NCLUS CLSPLT) PROFILE
FREE FI(IMAG) DA('&SASALTRN')
ALLOC FI(IMAG) DA('&SASALTRN') SHR
DEL LTLNGIMG
E LTLNGIMG DATA NON EMODE
 IN OPTIONS LS=80;;
 IN *;;
 IN *      THIS ROUTINE MAKES A LEAST SQUARES TRANSFORMATION FROM;;
 IN *      MAP COORDINATES TO LAT-LONG VALUES. THE CALCULATION IS;;
 IN *      BASED ON A FIT TO A SET OF MOMUMENT POINTS.;;
 IN *;;
 IN DATA PHOTO;;
 IN INPUT @ 3 SMPL LINE XMAP YMAP;;
 IN CARDS;;
```

```
MERGE '&PHTOCRNR' NON
B
IN PROC SYSREG DATA=PHOTO OUT=PHOTOMDL OUTEST=PHOTOPRM;;
IN MODEL SMPL = XMAP YMAP;;
IN OUTPUT RESIDUAL =R_SMPL;;
IN MODEL LINE = XMAP YMAP;;
IN OUTPUT RESIDUAL =R_LINE;;
IN DATA PHOTOPRM;;
IN SET PHOTOPRM;;
IN IF _N_=1 THEN _MODEL_='SMPL';;
IN IF _N_=2 THEN _MODEL_='LINE';;
IN PROC PRINT DATA=PHOTO;;
IN PROC PRINT DATA=PHOTOPRM;;
IN PROC PRINT DATA=PHOTOMDL;;
IN DATA PHOTO (DROP=SMPL LINE);;
IN INPUT @3 POINT :$5. XMAP YMAP;;
IN CARDS;;
MERGE '&PHTOCNTL' NON
B
IN PROC SCORE DATA=PHOTO SCORE=PHOTOPRM OUT=PHOTO TYPE=OLS;;
IN VAR XMAP YMAP;;
IN PROC PRINT DATA=PHOTO;;
IN DATA PHOTO;;
IN INPUT @3 POINT :$5. XMAP YMAP;;
IN CARDS;;
MERGE '&PHTOCNTL' NON
B
IN PROC SORT DATA=PHOTO;;
IN BY POINT;;
IN PROC SCORE DATA=PHOTO SCORE=PHOTOPRM OUT=PHOTO TYPE=OLS;;
IN VAR XMAP YMAP;;
IN DATA TOPOSHTS;;
IN INPUT @3 POINT :$5. LONG 20-27 LAT 29-35;;
IN CARDS;;
MERGE '&GEOGCNTL' NON
B
IN PROC SORT DATA=TOPOSHTS;;
IN BY POINT;;
IN DATA PHOTO;;
IN MERGE PHOTO TOPOSHTS;;
IN BY POINT;;
IN PROC PRINT DATA=PHOTO;;
IN DATA LATLONG (KEEP=SMPL LINE LONG LAT);;
IN SET PHOTO;;
IN PROC SYSREG DATA=LATLONG OUT=LTLNGMDL OUTEST=LTLNGPRM;;
IN MODEL LONG = SMPL LINE;;
IN OUTPUT RESIDUAL =R_LONG;;
IN MODEL LAT  = SMPL LINE;;
IN OUTPUT RESIDUAL =R_LAT;;
IN DATA LTLNGPRM;;
IN SET LTLNGPRM;;
IN IF _N_=1 THEN _MODEL_='LONG';;
IN IF _N_=2 THEN _MODEL_='LAT ';;
IN PROC PRINT DATA=LATLONG;;
IN DATA LATLONG;;
IN   SET LATLONG;;
IN   DROP LAT LONG;;
IN PROC PRINT DATA=LTLNGPRM;;
IN PROC PRINT DATA=LTLNGMDL;;
IN PROC SCORE DATA=LATLONG SCORE=LTLNGPRM OUT=LATLONG TYPE=OLS;;
IN VAR SMPL LINE;;
IN PROC PRINT DATA=LATLONG;;
IN DATA CPDFIMAG;;
IN SET IMAG.BASIC;;
IN PROC SORT DATA=CPDFIMAG;;
IN BY LINE SMPL;;
IN PROC SCORE DATA=CPDFIMAG SCORE=LTLNGPRM OUT=CPDFIMAG TYPE=OLS;;
IN VAR LINE SMPL;;
IN DA  CPDFIMAG;;
IN SE  CPDFIMAG;;
IN   IF LONG>&WSTBNDRY THEN DO;;
IN     DELETE;;
IN     RETURN;;
IN   END;;
IN   IF LONG<&ESTBNDRY THEN DO;;
IN     DELETE;;
IN     RETURN;;
IN   END;;
IN   IF LAT>&NRTBNDRY THEN DO;;
IN     DELETE;;
IN     RETURN;;
IN   END;;
IN   IF LAT<&STHBNDRY THEN DO;;
IN     DELETE;;
IN     RETURN;;
IN   END;;
IN   OUTPUT;;
```

```
 IN PROC FASTCLUS DATA=CPDFIMAG OUT=CPDFIMAG SHORT MAXITER=10
 IN              MEAN=CLSTRMNS MAXC=&NCLUS;;
 IN  VAR BRGT4 BRGT5 BRGT7;;
 IN PROC PRINT DATA=CLSTRMNS;;
 IN  CLEAR PAUSE;; RUN;;
 IN PROC DELETE DATA=CLSTRMNS;;
 IN PROC SORT DATA=CPDFIMAG;;
 I`  BY CLUSTER;;
IF &CLSTRPLT=&STR(N) THEN GOTO CL1
 IN PROC GPLOT DATA=CPDFIMAG;;
 IN  PLOT LONG*LAT=CLUSTER/CA=WHITE CT=WHITE;;
 IN  LABEL LAT=LATITUDE;;
 IN  LABEL LONG=LONGITUDE;;
 IN  TITLE1 IMAGERY CLUSTERS TO BE USED IN STANDARDIZATION;;
CL1: +
 SAVE
END
ALLOC FI(SGNT) DA(LTLNGIMG.DATA) SHR
SAS OPTIONS(SYSIN=SGNT) WORK('300 50') UNITS(TR)
SET &CLSCHK=&STR(N)
ISPEXEC CONTROL DISPLAY REFRESH
ISPEXEC DISPLAY PANEL(CLSTRCHK)
ISPEXEC CONTROL DISPLAY REFRESH
IF &CLSCHK=N THEN GOTO CL0
E LTLNGIMG DATA NON EMODE
 TOP
 DEL * 999999
 IN PROC STANDARD DATA=CPDFIMAG OUT=CPDFIMAG M=50 S=30;;
 IN  VAR BRGT4 BRGT5 BRGT7;;
 IN  BY CLUSTER;;
 IN DATA CPDFIMAG;;
 IN SET CPDFIMAG;;
 IN I_4=INT(BRGT4);;
 IN I_5=INT(BRGT5);;
 IN I_7=INT(BRGT7);;
 IN PROC FREQ DATA=CPDFIMAG;;
 IN TABLES I_4/NOPRINT OUT=FREQ4;;
 IN TABLES I_5/NOPRINT OUT=FREQ5;;
 IN TABLES I_7/NOPRINT OUT=FREQ7;;
 IN BY CLUSTER;;
 IN DATA FREQ4;;
 IN SET FREQ4;;
 IN BY CLUSTER;;
 IN IF FIRST.CLUSTER THEN CPDF4=0.0;;
 IN PDF4=PERCENT/100;;
 IN CPDF4+PDF4;;
 IN DROP COUNT PERCENT;;
 IN PROC SORT DATA=FREQ4;;
 IN BY CLUSTER I_4;;
 IN PROC SORT DATA=CPDFIMAG;;
 IN BY CLUSTER I_4;;
 IN DATA CPDFIMAG;;
 IN MERGE CPDFIMAG FREQ4;;
 IN BY CLUSTER I_4;;
 IN DATA FREQ5;;
 IN SET FREQ5;;
 IN BY CLUSTER;;
 IN IF FIRST.CLUSTER THEN CPDF5=0.0;;
 IN PDF5=PERCENT/100;;
 IN CPDF5+PDF5;;
 IN DROP COUNT PERCENT;;
 IN PROC SORT DATA=FREQ5;;
 IN BY CLUSTER I_5;;
 IN PROC SORT DATA=CPDFIMAG;;
 IN BY CLUSTER I_5;;
 IN DATA CPDFIMAG;;
 IN MERGE CPDFIMAG FREQ5;;
 IN BY CLUSTER I_5;;
 IN DATA FREQ7;;
 IN SET FREQ7;;
 IN BY CLUSTER;;
 IN IF FIRST.CLUSTER THEN CPDF7=0.0;;
 IN PDF7=PERCENT/100;;
 IN CPDF7+PDF7;;
 IN DROP COUNT PERCENT;;
 IN PROC SORT DATA=FREQ7;;
 IN BY CLUSTER I_7;;
 IN PROC SORT DATA=CPDFIMAG;;
 IN BY CLUSTER I_7;;
 IN DATA CPDFIMAG;;
 IN MERGE CPDFIMAG FREQ7;;
 IN BY CLUSTER I_7;;
 IN DATA CPDFIMAG;;
 IN SET CPDFIMAG;;
 IN H=0.7061*(CPDF4-CPDF5);;
 IN HI=INT(1000*H);;
 IN PROC FREQ DATA=CPDFIMAG;;
```

```
 IN TABLES HI/NOPRINT OUT=FREQHI;;
 IN BY CLUSTER;;
 IN DATA FREQHI;;
 IN SET FREQHI;;
 IN BY CLUSTER;;
 IN IF FIRST.CLUSTER THEN DO;; CPDFHI=0.0;; END;;
 IN PDFHI=PERCENT/100;;
 IN CPDFHI+PDFHI;;
 IN DROP COUNT PERCENT;;
 IN PROC SORT DATA=FREQHI;;
 IN BY CLUSTER HI;;
 IN PROC SORT DATA=CPDFIMAG;;
 IN BY CLUSTER HI;;
 IN DATA CPDFIMAG;;
 IN MERGE CPDFIMAG FREQHI;;
 IN BY CLUSTER HI;;
 IN PROC SORT DATA=CPDFIMAG;;
 IN BY LBOX SBOX;;
 IN DATA CPDFIMAG;;
 IN SET CPDFIMAG;;
 IN M4=1;;
 IN IF CPDF4>0.04 THEN M4=2;;
 IN IF CPDF4>0.10 THEN M4=3;;
 IN IF CPDF4>0.30 THEN M4=4;;
 IN IF CPDF4>0.70 THEN M4=5;;
 IN IF CPDF4>0.90 THEN M4=6;;
 IN IF CPDF4>0.96 THEN M4=7;;
 IN M5=1;;
 IN IF CPDF5>0.04 THEN M5=2;;
 IN IF CPDF5>0.10 THEN M5=3;;
 IN IF CPDF5>0.30 THEN M5=4;;
 IN IF CPDF5>0.70 THEN M5=5;;
 IN IF CPDF5>0.90 THEN M5=6;;
 IN IF CPDF5>0.96 THEN M5=7;;
 IN ISHIFT=1;;
 IN IF CPDFHI>0.04 THEN ISHIFT=2;;
 IN IF CPDFHI>0.10 THEN ISHIFT=3;;
 IN IF CPDFHI>0.30 THEN ISHIFT=4;;
 IN IF CPDFHI>0.70 THEN ISHIFT=5;;
 IN IF CPDFHI>0.90 THEN ISHIFT=6;;
 IN IF CPDFHI>0.96 THEN ISHIFT=7;;
 SAVE
END
SAS GO OPTIONS(SYSIN=SGNT)
SET &NEXT=&STR(N)
ISPEXEC CONTROL DISPLAY REFRESH
ISPEXEC DISPLAY PANEL(SGNTNEXT)
ISPEXEC CONTROL DISPLAY REFRESH
IF &NEXT=&STR(N) THEN GOTO A2
SET &BDSP=&STR(N)
SET &PRMY=&STR(100)
SET &SCND=&STR(50)
SET &UNIT=&STR(TR)
SET &SASALTRN=&STR( )
ISPEXEC CONTROL DISPLAY REFRESH
ISPEXEC DISPLAY PANEL(ALCTBASE)
ISPEXEC CONTROL DISPLAY REFRESH
FREE DA('&SASALTRN')
FREE FI(IMAG)
IF &BDSP=&STR(N) THEN GOTO A1
ALLOC FI(IMAG) DA('&SASALTRN') NEW SP(&PRMY,&SNCD)&STR( )&UNIT
A1: +
ALLOC FI(IMAG) DA('&SASALTRN') OLD
E LTLNGIMG DATA NON
 DEL * 99999
 TOP
 IN PROC DELETE DATA=IMAG.CPDFIMAG;;
 IN DATA IMAG.CPDFIMAG;;
 IN  SET CPDFIMAG;;
 SAVE
END
ALLOC FI(IMAG) DA('&SASALTRN') OLD
SAS GO OPTIONS(SYSIN=SGNT)
A2: +
END
DSNAME = '#25B.IMGRCLST.DATA(ALTRDTST)'           VOL=SER=TSOV01
DCB=(RECFM=FB,LRECL=80,BLKSIZE=9440)              08/24/88 237 14:24:51
)ATTR
/* *************************************************************/
/* PANEL TO SPECIFY THE MOMUMENT POINTS DATA SETS CONTAINING THE
/* IMAGE CORNER POINTS, THE IMAGE CONTROL POINTS, THE GEOGRAPHIC
/* COORDIMNATES OF THE CONTROL POINTS, AND THE SAS DATA BASE
/* TO CONTAIN THE PIXEL LOCATIONS AND ALTERATION SIGNATURE.
/*
```

```
/* THE IMAGE CONTROL POINTS AND THE GEOGRAPHIC COORDIMATES OF
/* THESE POINTS ARE ASSUMED TO BE IN T-CARD DATA SETS CREATED
/* BY POINT DIGITIZING ON THE INTERGRAPH SYSTEM.
/*
/* THE IMAGE CORNER POINTS CAN BE IN AN INTERGRAPH CREATED T-CARD
/* FILE, OR THE CAN BE INTERACTIVELY ENTERED BY THE USER.
/*
/* THE SAS DATA BASE CAN BE THE DATA BASE CONTAINING THE RAW
/* IMAGERY DATA OR A NEW DATA BASE. IF IT DOES NOT ALREDY
/* THE USER CAN CREATE IT.
/* ****************************************************************/
)BODY
% SPECIFY DATA SETS TO BE USED IN THE SIGNATURE CALCULATION AND MAPPING
%
% NAMES OF DATA SETS CONTAINING COORDINATES TO ALLOW LONG-LAT .
% VALUES TO BE CALCULATED FOR EACH PIXEL OF THE IMAGE
%
%        CONTENTS
%
% IMAGE COORDINATES OF    ! =>:+_PHTOCNTL                            +
% CONTROL POINTS          !    MUST BE A T-CARD FILE
%
% GEOGRAPHIC COORDINATES  ! =>:+_GEOGCNTL                            +
% OF CONTROL POINTS       !    MUST BE A T-CARD FILE
%
% SAMPLE LINE VALUES      ! =>:+_PHTOCRNR                            +
% OF IMAGE CORNERS        !    SHOULD CONTAIN DATA IN ORDER
%                         !    SAMPLE LINE X-IMAGE Y-IMAGE
%
% SAS DATA BASE FOR       ! =>:+_SASALTRN                            +
% MSS IMAGERY DATA        !    SAS DATA BASE CREATED BY SUBIMAGE
%
)END
DSNAME = '#25B.IMGRCLST.DATA(BOUNDARY)'                    VOL=SER=TSOV01
DCB=(RECFM=FB,LRECL=80,BLKSIZE=9440)                       08/24/88 237 14:24:51

)ATTR
/* ****************************************************************/
/* PANEL TO SPECIFY THE LONG-LAT BOUNDARIES OF THE STUDY AREA
/* ****************************************************************/
)BODY
% SPECIFY LONG LAT BOUNDARIES OF THE STUDY AREA
%
%   COORDINATES IN DEGREES X 100,000
%
% VALUE INPUT AS (DDDMMMMM)
%
% EAST EDGE  ==>:+_ESTBNDRY+
% WEST EDGE  ==>:+_WSTBNDRY+
% SOUTH EDGE  =>:+_STHBNDRY+
% NORTH EDGE  =>:+_NRTBNDRY+
)END
DSNAME = '#25B.IMGRCLST.DATA(CLUSTERS)'                    VOL=SER=TSOV01
DCB=(RECFM=FB,LRECL=80,BLKSIZE=9440)                       08/24/88 237 14:24:51

)ATTR
/* ****************************************************************/
/* SPECIFIES NUMBER OF CLUSTERS TO BE USED TO STANDARDIZE THE IMAGERY
/* ****************************************************************/
)BODY
% SPECIFY NUMBER OF CLUSTERS TO BE USED
% TO STANDARDIZE THE IMAGERY DATA
%
% NUMBER OF CLUSTERS =>+_NCLUS+
% DRAW A CLUSTER MAP
%   (Y OR N)  ==>:+_Z+
)INIT
   .ZVARS='(CLSPLT)'
)END
DSNAME = '#25B.IMGRCLST.DATA(CLSTRCHK)'                    VOL=SER=TSOV01
DCB=(RECFM=FB,LRECL=80,BLKSIZE=9440)                       08/24/88 237 14:24:51

)ATTR
/* ****************************************************************/
/* INDICATES WHETHER OR NOT THE CLUSTER MAP WAS ACCEPTABLE
/* ****************************************************************/
)BODY
% WAS THE CLUSTER MAP PRODUCED ACCEPTABLE FOR
% CLACULATING THE ALTERATION SIGNATURE ?
%
%    (Y OR N)  ==>:+_Z+
)INIT
   .ZVARS='(CLSCHK)'
)END
```

```
DSNAME = '#25B.IMGRCLST.DATA(SGNTNEXT)'                          VOL=SER=TSOV01
DCB=(RECFM=FB,LRECL=80,BLKSIZE=9440)                             08/24/88 237 14:24:51
)ATTR
/* ****************************************************************/
/* PANEL TO ALLOW ALLOCATION OF SAS DATA BASE FOR IMAGE SIGNATURE
/* ****************************************************************/
)BODY
% IF THE CALCULATION OF THE ALTERATION SIGNATURE WENT NORMALLY
% USER SHOULD RECORD THE RESULT IN A PERMANENT SAS DATA BASE
%
%     RECORD MSS SIGNATURE (Y OR N) =>:+_Z+
)INIT
  .ZVARS='(NEXT)'
)END
DSNAM  = '#25B.IMGRCLST.DATA(ALCTBASE)'                          VOL=SER=TSOV01
DCB  (RECFM=FB,LRECL=80,BLKSIZE=9440)                            08/24/88 237 14:24:51
)AT
/* ****************************************************************/
/*     FIES D  A SPACE AND UNIT PARAMETERS FOR THE SAS DATA BASE
/*      ONTAIN  E CELL AVERAGED IMAGE BRIGHTNESS VALUES
/* SUBSCENE TO BE ANALYZED.
/*
/*    PRMY     PRIMARY ALLOCATION
/*    SCND     SECONDARY ALLOCATION
/*    UNIT     STORAGE UNITS
/* ****************************************************************/
)BODY
% SPECIFIES DATA NAME, SPACE, AND UNIT PARAMETERS FOR THE SAS
% DATA BASE TO CONTAIN THE CELL AVERAGED IMAGE BRIGHTNESS
% VALUES AND SIGNATURE OF THE SUBSCENE TO BE ANALYZED.
%
%    FULLY QUALIFIED NAME OF SAS DATA BASE
%    ===>:+_SASALTRN                                         +
%
%    SHOULD THE DATA SET BE CREATED =>:+_Z+
%
%    PRIMARY ALLOCATION ===>:+_PRMY+
%    SECONDARY ALLOCATION =>:+_SCND+
%                                        !TR FOR TRACKS
%    STORAGE UNITS ========>:+_UNIT   +%!CY FOR CYLINDERS
%                                        !NUMERIC FOR BYTES
%
)INIT
  .ZVARS='(BDSP)'
)END
DSNAME = '#25B.IMGRCLST.DATA(PRDCDSCR)'                          VOL=SER=TSOV01
DCB=(RECFM=FB,LRECL=80,BLKSIZE=9440)                             08/24/88 237 14:24:51

/********************************************************************/
/*
/* DIRECTS THE DISCRIMINANAT ANALYSIS AND DISPLAY OF THE
/*     DRILLING OUTCOMES AND LANDSAT MSS IMAGERY DATA
/*
/* 1. DISPLAY THE PRIMARY SELECTION MENU.
/* 2. CARRY OUT THE CALULATION SPECIFIED.
/*
/********************************************************************/
CONTROL LIST CONLIST MSG END(ENDO)
SET &PRGM=
ISPEXEC DISPLAY PANEL(PRDCSTUP)
ISPEXEC SELECT CMD(&PRGM)
END
DSNAME = '#25B.IMGRCLST.DATA(PRDCSTUP)'                          VOL=SER=TSOV01
DCB=(RECFM=FB,LRECL=80,BLKSIZE=9440)                             08/24/88 237 14:24:51
)ATTR
/* ****************************************************************/
/* PANEL TO MAKE A DISCRIMINANT ANALYSIS OF THE MSS IMAGERY DATA
/* ****************************************************************/
)BODY
%LANDSAT IMAGERY PRODUCTION DISCRIMINANT ANALYSIS SYSTEM
%
% BASIC MAPPING PROGRAMS TO SET UP DATASETS FOR TRAINING
%
%  APLCGRID   RESAMPLES, MAPS, AND STORES IMAGERY DATA      ! BASIC
%  PRDCSTAT   INTERPOLATES IMAGERY AT WELLSITES FOR TRAINING ! IMAGERY
%  PRDCFILE   WRITES IMAGERY FILE FOR DISCRIMINANT ANALYSIS ! DATA
%
%  APLCLSTR   RESAMPLES, MAPS, AND STORES IMAGERY DATA      ! CLUSTERED
%  PDCLSTAT   INTERPOLATES IMAGERY AT WELLSITES FOR TRAINING ! IMAGERY
%  PDCLFILE   WRITES IMAGERY FILE FOR DISCRIMINANT ANALYSIS ! DATA
%
% DISCRIMINANT CALCULATION
%
```

```
%  PRDCLINR   CALCULATES LINEAR WELL DISCRIMINANT
%  PRDCQUAD   CALCULATES QUADRATIC WELL DISCRIMINANT
%  PRDCSGNF   MONTE CARLO TYPE SIMULATION FOR SIGNIFICANCE OF PRDCTRNG
%  PDCLLINR   CALCULATES LINEAR WELL DISCRIMINANT FOR CLUSTERED DATA
%  PDCLQUAD   CALCULATES QUADRATIC WELL DISCRIMINANT FOR CLUSTERED DATA
%  PDCLSGNF   MONTE CARLO TYPE SIMULATION FOR SIGNIFICANCE OF PRDCTRNG
%
%  PRDCALTR   STORES THE DISCRIMINANT SIGNATURE AND MAPS DATA
%  APLCMAPS   MAPS IMAGERY DATA
%  APLCGCHM   MAPS IMAGERY AND GEOCHEMICAL DATA
%  APLCFLTR   FILTERS AND MAPS IMAGERY ANOMALIES
%  APLCTRND   FILTERS AND MAPS IMAGERY TRENDS
%
% PROGRAM NAME ===>+_PRGM                        +
)END
DSNAME = '#25B.IMGRAPLC.DATA(APLCLSTR)'                     VOL=SER=TSOV01
DCB=(RECFM=FB,LRECL=80,BLKSIZE=9440)                        08/24/88 237 14:26:05

/* ****************************************************************
/* COMMANDS CREATE A BATCH PROGRAM TO DRAW APPLICON COLOR CONTOUR
/* PLOTS OF SPECTRAL IMAGERY DATA.  THE DATA ARE GRIDDED WITH THE
/* DISCRETE GRIDDING ALGORITHM, AND THE RESULTS ARE OUTPUT TO A
/* PERMENANT TSO DATA SET IN CPS INTERNAL FORMAT.
/*
/* 1. IMAGERY DATA ARE IN A SAS DATA BASE.
/*
/* 2. WELL LOCATIONS AND DRILLING RESULTS.  A T-CARD FILE GIVING THE
/*    DRILLING RESULTS OF ANY WELLS THE USER WANTS POSTED ON THE PLOT.
/*    FILE COULD BE PREPARED BY ANY RETRIEVAL PROGRAM, SUCH AS THE
/*    PROGRAM PRDCTNMP IN THIS PACKAGE.
/*
/* ****************************************************************
CONTROL LIST CONLIST MSG END(ENDO)
ISPEXEC VGET (JNAM INIT USER LABL YNAM JA MCRB BUGSAS) PROFILE
SET &TIME=4
SET &LINE=&STR(09)
SET &AD=&STR(GSCNC)
SET &RGN=&STR(3500)
SET &HOLD=&STR(N)
ISPEXEC VGET (JNAM INIT USER LABL YNAM JA IMAG SASBASE) PROFILE
ISPEXEC CONTROL DISPLAY REFRESH
ISPEXEC DISPLAY PANEL(SASPLJCL)
ISPEXEC CONTROL DISPLAY REFRESH
ISPEXEC VPUT (JNAM INIT USER LABL YNAM JA IMAG SASBASE) PROFILE
SET &MSGCLS=&STR(A)
IF &HOLD=&STR(N) THEN GOTO J1
SET &MSGCLS=&STR(Y)
J1: +
COPY '#25B.BUGPRGM.TEST(PPJCARD)' APLCLSTR.DATA NON
E APLCLSTR DATA NON EMODE
 TOP
 C * /A8169/A2020/
 C * /INI/&INIT/
 DOWN 1
 C * /MSGCLASS=/MSGCLASS=&MSGCLS/
 C * /MSGLEVEL=/MSGLEVEL=1/
 C * /NOTIFY=/NOTIFY=#&USER/
 C * /REGION=/REGION=&RGN&STR(K)/
 C * /TIME=/TIME=&TIME/
 DOWN 1
 C * /#TSO/#&USER/
 DOWN 1
 C * /UACT=/UACT=&JA/
 DOWN 1
 C * /WO=/WO=&LABL/
 DOWN 1
 C * /UORG=/UORG=NRG/
 DOWN 1
 C * /LOS=/LOS=F/
 DOWN 1
 C * /AD=/AD=&AD/
 DOWN 1
 C * /MAN=/MAN=&USER/
 F '//*FORMAT'
 DEL
 SAVE                                                       Z AD
END
ISPEXEC CONTROL DISPLAY REFRESH
ISPEXEC VGET (SASB PRDC SIES  BSMP STATE1 STATE2 STATE3) PROFILE
ISPEXEC VGET (WLLS SHTP TICK) PROFILE
ISPEXEC DISPLAY PANEL(APLCDTST)
ISPEXEC VPUT (SASB PRDC SIES  BSMP) PROFILE
ISPEXEC VPUT (WLLS SHTP TICK) PROFILE
ISPEXEC CONTROL DISPLAY REFRESH
IF &BSMP=&STR(N) THEN GOTO BS1
ISPEXEC CONTROL DISPLAY REFRESH
```

```
ISPEXEC VGET (STATE1 STATE2 STATE3) PROFILE
ISPEXEC DISPLAY PANEL(BSMPTAPE)
ISPEXEC VPUT (STATE1 STATE2 STATE3) PROFILE
ISPEXEC CONTROL DISPLAY REFRESH
BS1: +
E APLCLSTR DATA NON EMODE
 B
 IN &STR(//SA EXEC SAS,REGION=3500K)
 IN &STR(//WORK DD UNIT=SYSDA,SPACE=(TRK,(4000,200)),DISP=(NEW,DELETE)
 IN &STR(//IMAG DD DSN=&SASB,DISP=SHR)
 IN &STR(//GRID DD DSN=&&&&GRID,UNIT=SYSDA,DISP=(NEW,PASS),)
 IN &STR(//   SPACE=(TRK,(4000,200)))
 IN &STR(//SYSIN DD *)
 IN DATA IMAGERY;;
 IN   SET IMAG.CPDFIMAG;;
 IN   FILE GRID;;
 IN   PUT 'T1' LONG 20-27 'W' LAT 29-35 'N'
 IN       CPDF4 37-43 2 CPDF5 44-50 2 CPDF7 51-57 2 CPDFHI 58-64 2
 IN       CLUSTER 65-71 2;;
 IN //GO EXEC P2020,PROG=P6213B
 IN //GO.FT06F001 DD SYSOUT=A
 IN //GO.FT01F001 DD DSN=&&&&PS1,SPACE=(CYL,(20,5)),DISP=(NEW,PASS),
 IN //  DCB=(RECFM=VBS,BLKSIZE=19069)
IF &WLLS=&STR(N) THEN GOTO A1
 IN //GO.FT02F001 DD DSN=&&&&PS2,SPACE=(CYL,(2,2)),DISP=(NEW,PASS),
 IN //  DCB=(RECFM=VBS,BLKSIZE=19069)
A1: +
IF &SHTP=&STR(N) THEN GOTO A2
 IN //GO.FT03F001 DD DSN=&&&&PS3,SPACE=(CYL,(2,2)),DISP=(NEW,PASS),
 IN //  DCB=(RECFM=VBS,BLKSIZE=19069)
A2: +
IF &TICK=&STR(N) THEN GOTO A3
 IN //GO.FT04F001 DD DSN=&&&&PS4,SPACE=(CYL,(2,2)),DISP=(NEW,PASS),
 IN //  DCB=(RECFM=VBS,BLKSIZE=19069)
A3: +
 IN //GO.FT30F001 DD DSN=&&&&GRID,DISP=SHR
IF &WLLS=&STR(N) THEN GOTO A4
 IN //GO.FT30F002 DD DSN=&PRDC,DISP=SHR
A4: +
IF &SHTP=&STR(N) THEN GOTO A5
 IN //GO.FT30F003 DD DSN=&SIES,DISP=SHR
A5: +
 IN //GO.SYSIN DD *
 SAVE
END

SET &PRJCT=&STR(6)
SET &UPPER=&STR(____)
SET &LOWER=&STR(____)
SET &CMRDN=&STR(____)
SET &SPHRD=&STR(2)
SET &ORGLT=&STR(____)
SET &ORGLN=&STR(____)
SET &HEW=&STR(W)
SET &HNS=&STR(0)
SET &UNT=&STR(2)
SET &DDN=&STR(1)
ISPEXEC CONTROL DISPLAY REFRESH
ISPEXEC DISPLAY PANEL(MPPRJCTN)
ISPEXEC CONTROL DISPLAY REFRESH
E APLCLSTR DATA NON EMODE
 B
 MERGE '#25B.BUGPRGM.TEST(CCARD)'
 B
 C * /#/&PRJCT/
 C * /$$$$/&UPPER/
 C * /$$$$/&LOWER/
 C * /####/&CMRDN/
 C * /H/&HEW/
 C * /H/&HNS/
 C * /S/&SPHRD/
 C * /$$$$/&ORGLT/
 C * /####/&ORGLN/
 C * /U/&UNT/
 C * /D/&DDN/
IF &WLLS=&STR(N) THEN GOTO A8
SET &DDN=&STR(2)
 B
 MERGE '#25B.BUGPRGM.TEST(CCARD)'
 B
 C * /#/&PRJCT/
 C * /$$$$/&UPPER/
 C * /$$$$/&LOWER/
 C * /####/&CMRDN/
 C * /H/&HEW/
```

```
  C * /H/&HNS/
  C * /S/&SPHRD/
  C * /$$$$/&ORGLT/
  C * /#####/&ORGLN/
  C * /U/&UNT/
  C * /D/&DDN/
A8: +
IF &SHTP=&STR(N) THEN GOTO A9
SET &DDN=&STR(3)
  B
  MERGE '#25B.BUGPRGM.TEST(CCARD)'
  B
  C * /#/&PRJCT/
  C * /$$$$/&UPPER/
  C * /$$$$/&LOWER/
  C * /#####/&CMRDN/
  C * /H/&HEW/
  C * /H/&HNS/
  C * /S/&SPHRD/
  C * /$$$$/&ORGLT/
  C * /#####/&ORGLN/
  C * /U/&UNT/
  C * /D/&DDN/
A9: +
 SAVE
END
IF &TICK=&STR(N) THEN GOTO A10
SET &DDN=&STR(4)
SET &BOTTM=&STR(    )
SET &TOP  =&STR(    )
SET &SPCLT=&STR(000500)
SET &DNS=&STR(N)
SET &RIGHT=&STR(    )
SET &LEFT =&STR(    )
SET &SPCLN=&STR(000500)
SET &DEW=&STR(W)
ISPEXEC CONTROL DISPLAY REFRESH
ISPEXEC DISPLAY PANEL(TICKMARK)
ISPEXEC CONTROL DISPLAY REFRESH
E APLCLSTR DATA NON EMODE
  B
  MERGE '#25B.BUGPRGM.TEST(FCARD)'
  TOP
  F '$$$$'
  C * /#/&PRJCT/
  C * /$$$$/&UPPER/
  C * /$$$$/&LOWER/
  C * /#####/&CMRDN/
  C * /H/&HEW/
  C * /H/&HNS/
  C * /S/&SPHRD/
  C * /$$$$/&ORGLT/
  C * /#####/&ORGLN/
  C * /U/&UNT/
  C * /D/&DDN/
  DOWN 1
  C * /$$$$/&BOTTM/
  C * /H/&DNS/
  C * /$$$$/&TOP/
  C * /H/&DNS/
  C * /$$$$/&SPCLT/
  C * /#####/&LEFT/
  C * /H/&DEW/
  C * /#####/&RIGHT/
  C * /H/&DEW/
  C * /####/&SPCLN/
  SAVE
END
A10: +
E APLCLSTR DATA NON EMODE
  TOP
  IF &LOWER^=&STR(____) THEN GOTO L1
  F 'P2020'
  C * 999 /_/ /ALL
  L1: +
  SAVE
END

IF &BSMP=&STR(N) THEN GOTO A23
E APLCLSTR DATA NON EMODE
  B
  MERGE '#25B.BUGPRGM.TEST(BSMPJCL)' NON
  B
  UP 2
  C * /STATE1/&STATE1/
```

```
  F 'STATE'
  IF &STATE2^=&STR( ) THEN GOTO A20
  DEL * 2
  GOTO A22
A20: +
  C * /STATE2/&STATE2/
  F 'STATE'
  IF &STATE3^=&STR( ) THEN GOTO A21
  DEL *
  GOTO A22
A21: +
  C * /STATE3/&STATE3/
A22: +
  SAVE
END
A23: +
SET &GDSP=&STR(OLD)
SET &PRMY=&STR(50)
SET &SCND=&STR(5)
SET &UNIT=&STR(TR)
ISPEXEC CONTROL DISPLAY REFRESH
ISPEXEC VGET (SGNTCPSG) PROFILE
ISPEXEC DISPLAY PANEL(IMGRGRID)
ISPEXEC VPUT (SGNTCPSG) PROFILE
ISPEXEC CONTROL DISPLAY REFRESH
IF &GDSP=&STR(OLD) THEN GOTO A24
ALLOC DA('&SGNTCPSG') NEW SP(&PRMY,&SCND) &UNIT
A24: +
E APLCLSTR DATA NON EMODE
  B
  IN //ST2.FT27F001 DD DSN=&SGNTCPSG,DISP=OLD
  IN //ST2.SYSIN DD *
  SAVE
END
SET &TEXTA=&STR( )
SET &TEXTB=&STR( )
ISPEXEC CONTROL DISPLAY REFRESH
ISPEXEC DISPLAY PANEL(IDNTFYR)
ISPEXEC CONTROL DISPLAY REFRESH
SET &HR=&SUBSTR(1:2,&SYSTIME)
SET &MN=&SUBSTR(4:5,&SYSTIME)
SET &TM=&HR&MN
SET &HRMN=&HR&MN
SET &LBL=&STR( )
IF &TEXTB=&STR( ) THEN GOTO A25
SET &LBL=&STR(.)&TEXTB
A25: +
IF &TEXTA=&STR( ) THEN GOTO A26
SET &LBL=&STR(.)&TEXTA&LBL
A26: +
SET &TM=&TM&LBL
COPY '#25B.IMGRAPLC.DATA(HYPRAPLC)' HYPRAPLC.DATA NON
E HYPRAPLC DATA NON
  TOP
  F 'AT000INI'
  C * 99 /INI/&INIT/ALL
  TOP
  F 'AT000'
  C * 99 /NOTIFY=/NOTIFY=#&USER/ALL
  C * 99 /REGION=/REGION=100K/ALL
  C * 99 /TIME=/TIME=1/ALL
  TOP
  F 'AT000'
  C * 99 /#TSO/#&USER/ALL
  TOP
  F 'AT000'
  C * 99 /UACT=/UACT=&JA/ALL
  TOP
  F 'AT000'
  C * 99 /WO=/WO=&LABL/ALL
  TOP
  F 'AT000'
  C * 99 /UORG=/UORG=NRG/ALL
  TOP
  F 'AT000'
  C * 99 /LOS=/LOS=5/ALL
  TOP
  F 'AT000'
  C * 99 /AD=/AD=&AD/ALL
  TOP
  F 'AT000'
  C * 99 /MAN=/MAN=&USER/ALL
  TOP
  F 'HRMN'
```

```
C * 99 /HRMN/AP&HRMN/ALL
 TOP
 F 'TMSTMP'
 C * 99 /TMSTMP/TM&TM/ALL
 SAVE
END
ISPEXEC VGET (SOURCE DSNCODE) PROFILE
ISPEXEC DISPLAY PANEL(SRCCPS)
ISPEXEC VPUT (SOURCE DSNCODE) PROFILE
IF &SOURCE=&STR(N) THEN GOTO S1
ISPEXEC SELECT CMD(GRDCLSTR)
COPY GRDCLSTR APLCINTR NON
GOTO S2
S1: +
COPY '&DSNCODE' APLCINTR.DATA NON
S2: +
E APLCLSTR DATA NON EMODE
 B
 MERGE APLCINTR NON
 B
 MERGE HYPRAPLC NON
 SAVE
END
DEL (APLCINTR HYPRAPLC)

DSNAME = '#25B.IMGRCLST.DATA(SASPLJCL)'                         VOL=SER=TSOV01
DCB=(RECFM=FB,LRECL=80,BLKSIZE=9440)                            08/24/88 237 14:24:51

)ATTR
/* ****************************************************************/
/* PANEL TO FILL OUT A JOB CARD TO EXECUTE ON BVOJ1.              */
/*                                                                 */
/*     1.   JOBNAME   JES JOBANME (A8169KRS FOR EXAMPLE)          */
/*     2.   INIT      USER'S INITIALS                              */
/*     3.   LABEL     WORD TO PRINT ON OUTPUT PAGE (5 CHARACTERS)  */
/*     4.   YNAM      USER NAME (6 CHARACTERS)                    */
/*     5.   TIME      CPU TIME LINIT                               */
/*     6.   LINE      LINES/10                                     */
/*     7.   JA        FEATURE NUMBER                               */
/*     7.   AD        ADDRESS                                      */
/*                                                                 */
/* ****************************************************************/
)BODY
%
%  JOB CARD AND JCL PARAMETERS
%
%  JOBNAME      =====>:+_Z+
%  INITIALS     =====>:+_Z  +
%  USER ID      =====>:+_Z  +
%  LABEL        =====>:+_Z    +
%  YOUR NAME    =====>:+_Z     +
%  CPU TIME     =====>:+_Z    +
%  LINE/10      =====>:+_Z +
%  FEATURE #    =====>:+_Z     +
%  ADDRESS      =====>:+_Z       +
%  REGION       =====>:+_Z  +
%  HOLD Y OR N  =====>:+_Z   +
%
)INIT
 .ZVARS='(JNAM INIT USER LABL YNAM TIME LINE JA AD RGN HOLD)'
)END

DSNAME = '#25B.IMGRAPLC.DATA(APLCDTST)'                         VOL=SER=TSOV01
DCB=(RECFM=FB,LRECL=80,BLKSIZE=9440)                            08/24/88 237 14:26:05

)ATTR
/* ****************************************************************/
/* PANEL TO SET UP LOCATE IMAGERY, GEOGRAPHIC, AND WELL LOCATION
/* AND DRILLING RESULT INFORMATION TO POST ON AN APPLICON
/* OR VERSATECH CONTOUR MAP.
/*
/*   THE PROGRAM REQUIRES THE FOLLOWING FOR A MINIMUM CONTOUR MAP.
/*
/*    1    SAS DATA BASE CONTAINING THE MSS SIGNATURE AND THE
/*         GEOGRAPHIC LOCATION OF EACH PIXEL IN THE IMAGE
/*
/*   THE PROGRAM CAN POST THE FOLLOWING OPTIONAL DATA
/*
/*    2    GEOGRAPHIC BASE MAP.
/*    3    WELL LOCATIONS AND DRILLING RESULTS.  MUST BE IN T-CARD
/*         FORMAT AND USE THE CPS WELL CODES.  FILE COULD BE
/*         CREATED BY ANY RECOVERY PROCEDURE OF BY EXECUTING
/*         PROGRAM DRILLING IN THIS PACKAGE.
/*    4    SEISMC LINE SHOT POINTS.  FORMAT AS IN 4 ABOVE.
/*    5    GEOGRAPHIC TICK MARKS.
/*
```

```
/* ************************************************************ */
)BODY
%   DATA REQUIRED FOR MINIMAL CONTOUR APPLICON PLOT
%
%   FULLY QUALIFIED DSN OF DATA SET WITH THE IMAGERY DATA
%        DATA SET NAME ===>+_SASB                                    +
%
%   MAP ANNOTATION OPTIONS (SPECIFY Y OR N AND DATASET NAME IF Y)
%
%       OPTION         FULLY QUALIFIED DSN OF APPROPRIATE T-CARD FILE
%
% WELLS   :+_Z+     % DATASET NAME ==>:+_PRDC                          +
% SIESMIC:+_Z+      % DATASET NAME ==>:+_SIES                          +
% TICKS   :+_Z+     % DATASET INTERNAL TO CPS
%
% DO YOU WANT TO POST A BASE MAP (Y OR N) :+_Z+
)INIT
   .ZVARS='(WLLS SHTP TICK BSMP)'
)END

DSNAME = '#25B.IMGRAPLC.DATA(BSMPTAPE)'                   VOL=SER=TSOV01
DCB=(RECFM=FB,LRECL=80,BLKSIZE=9440)                      08/24/88 237 14:26:05

)ATTR
/* ************************************************************ */
/* PANEL TO SELECT BASEMAP TAPE FOR PLOTTING BY CPS VERB PPBM.   */
/* ************************************************************ */
)BODY
% BASEMAP INFORMATION IS DIGITIZED AND IS AVAILABLE IN SEVERAL ONLINE
% DISK FILES.  ENTER THE CODES FOR THE FILES YOU NEED FOR YOUR MAP.
%
% FILE 1 >: +_STATE1+ %FILE 2 >: +_STATE2+ %FILE 3 >: +_STATE3+
%
% ALABAMA                - ALABA
% ALASKA(DIGITIZED)      - ALASK
% ALASKA(PROTRACTED)     - ALASP
% ARIZONA                - ARIZA
% ARKANSAS               - ARKAS
% CALIF(DIGITIZED)       - CALIA
% CALIF(PROTRACTED)      - CALIF
% COLORADO               - COLOR
% TEXAS(EAST)            - EASTX
% IDAHO                  - IDAHO
% KANSAS                 - KANSA
% MISSISSIPPI            - MISSI
% MONTANA                - MONTA
% NEVADA                 - NEVDA
% NORTH DAKOTA           - NODAK
% SOUTH DAKOTA           - SODAK
% NEW MEXICO(NORTH)      - NWMEX
% NEW MEXICO(SOUTH)      - SENMX
% OKLAHOMA               - OKLAX
% OREGAN                 - ORGAN
% UTAH                   - UTAHX
% WYOMING                - WYOMG
)END

DSNAME = '#25B.IMGRAPLC.DATA(MPPRJCTN)'                   VOL=SER=TSOV01
DCB=(RECFM=FB,LRECL=80,BLKSIZE=9440)                      08/24/88 237 14:26:05

)ATTR
/* ************************************************************ */
/* PANEL TO SET UP THE MAP PROJECTION INFORMATION TO CONVERT     */
/* THE LAT-LONG BUG, WELL, AND SHOT POINT DATA TO MAP            */
/* COORDINATES FOR PLOTTING BY CPS.                              */
/* ************************************************************ */
)BODY
%   SPECIFY THE MAP PROJECTION DESIRED ===============>:+_Z+
%      1 LAMBERT                           2 POLYCONIC
%      3 UNIVERSAL TRANSVERSE MERCATOR     4 MERCATOR
%      5 AUSTRAILIAN TRANSVERSE MERCATOR   6 TRANSVERSE MERCATOR
%
% SPECIFY LONG-LAT DEGREES AND MINUTES AS DDDMM AND DDMM
%
% STANDARD PARALLELS, LOWER =>:+_Z   + % UPPER =>:+_Z    +
% CENTRAL MERIDIAN =>:+_Z    + % RESPECT TO PRIME (E OR W) >:+_Z+
% HEMISPHERE (N=0 OR S=1) =>:+_Z+
% SPHEROID CODE ============>:+_Z+
%    1 INTERNATIONAL    2 CLARKE 1866      3 CLARKE 1880
%    4 EVEREST          5 BESSEL           6 AUSTRAILIAN NATIONAL
%    7 NWL-80           8 APL              9 WGS-72
% ORIGIN LONGITUDE =>:+_Z    + % LATITUDE =>:+_Z    +
% MAP UNITS =>: +_Z+
%    0 FEET   1 INCHES
%    2 MILES  3 METERS
)INIT
   .ZVARS='(PRJCT LOWER UPPER CMRDN HEW HNS SPHRD ORGLN ORGLT UNT)'
)END
```

```
DSNAME = '#25B.IMGRAPLC.DATA(TICKMARK)'                           VOL=SER=TSOV01
DCB=(RECFM=FB,LRECL=80,BLKSIZE=9440)                           08/24/88 237 14:26:05

)ATTR
/* ****************************************************************/
/* PANEL TO SET UP THE MAP PROJECTION INFORMATION TO DEFINE THE   */
/* LAT-LONG TICK MARK FILE FOR PLOTTING BY CPS.                   */
/* ****************************************************************/
)BODY
%  SET UP THE LAT-LONG TICK MARK GRID
%
%  SPECIFY LONG-LAT DEGREES MINUTES IN (DDDMM) AND (DDMM) FORM
%
%  LOWER LIMIT   =============>:+_Z    +
%  UPPER LIMIT   =============>:+_Z    +
%  UPPER TO LOWER INTERVAL =>:+_Z      +
%  HEMISPHERE (N OR S) =====>:+_Z+
%  LEFT LIMIT    =============>:+_Z    +
%  RIGHT LIMIT   =============>:+_Z    +
%  LEFT TO RIGHT INTERVAL ==>:+_Z      +
%  HEMISPHERE (W OR E) =====>:+_Z+
)INIT
  .ZVARS='(BOTTM TOP SPCLT DNS LEFT RIGHT SPCLN DEW)'
)END

DSNAME = '#25B.IMGRAPLC.DATA(IMGRGRID)'                           VOL=SER=TSOV01
DCB=(RECFM=FB,LRECL=80,BLKSIZE=9440)                           08/24/88 237 14:26:05

)ATTR
/* ****************************************************************/
/* PANEL SET UP DATA SET TO HOLD CPS IMAGERY GRID                 */
/* ****************************************************************/
)BODY
%  DATA SET HOLDING THE NEAREST NEIGHBOR GRID OF THE IMAGERY DATA
%  AND-OR THE RESULTS OF DISCRIMINANT ANALYSIS ON THE IMAGERY
%
%  FULLY QUALIFIED DATA SET NAME =>:+_SGNTCPSG                     +
%
%  DISPOSTION (OLD OR NEW)   !
%  OLD IF DATASET EXISTS     ! =>:+_GDSP+
%  OR NEW TO CREATE IT       !
%
%  PRIMARY SPACE ALLOCATION ===>:+_PRMY    +
%  SECONDARY ALLOCATION ========>:+_SCND   +
%  STORAGE UNITS (TR OR CY) ===>:+_UNIT+
)END

DSNAME = '#25B.IMGRAPLC.DATA(IDNTFYR)'                            VOL=SER=TSOV01
DCB=(RECFM=FB,LRECL=80,BLKSIZE=9440)                           08/24/88 237 14:26:05

)ATTR
/* ****************************************************************/
/* PANEL LABELS PLOT FOR PLOT OPERATOR INFORMATION                */
/* ****************************************************************/
)BODY
% SPECIFY TWO EIGHT CHARACTER FIELDS TO INCLUDE IN A MESSAGE
% TO THE PLOT OPERATOR.  THE FORM OF THE MESSAGE WILL BE
%
%                                    ! TEXT A=>:+_TEXTA   +
% #TSO.APLCCN.T####.TEXT A.TEXT B    !
%                                    ! TEXT B=>:+_TEXTB   +
%
%         WHERE
%
% #TSO           - USER TSO ID #
% APLCCN         - DENOTES PLOTTER TYPE
% T####          - HOUR AND MINUTE THE JOB WAS CREATED
% TEXT A.TEXT B  - FIELDS OF TEXT THE USER SUPPLIES
%
% THE FIELDS CAN BE LEFT BLANK.
)END

DSNAME = '#25B.IMGRAPLC.DATA(HYPRAPLC)'                           VOL=SER=TSOV01
DCB=(RECFM=FB,LRECL=80,BLKSIZE=9440)                           08/24/88 237 14:26:05

//*
//* JCL FOR APPLICON OUTPUT OF JOB
//*
//*     APPLICON TAPE OUTPUT     ASSIGN DSN
//SORTSTEP.SORTOUT DD DISP=(NEW,PASS,DELETE),UNIT=SYSDA,
//  SPACE=(TRK,(50,10),RLSE),DCB=(RECFM=VS,LRECL=28,BLKSIZE=32)
//APSCAN.FT31F001 DD DSN=&&PLOT,
//     DISP=(NEW,PASS),
//     DCB=(BLKSIZE=1296,RECFM=F),SPACE=(CYL,(10,5),RLSE),UNIT=SYSDA
//*
```

```
//* TRANSFER THE APPLICON PLOT OUTPUT (AND SOME JCL) TO DEVELOPMENT (BVOJ2)
//*
//STEP2 EXEC UTWSPUNL,DLM=#$
//WSPUNL.SYSPRINT DD DUMMY
//WSPUNL.SYSPUNCH DD SYSOUT=(A,INTRDR)
//SYSUT1 DD DSN=&&PLOT,DISP=(OLD,DELETE)
//REMJCL DD DATA,DLM=##
//AT000INI JOB 'HYPERHCANNEL PLOT TRANSFER',                           Z
//   NOTIFY=#,REGION=,TIME=
//*NETACCT ROOM=GSCNCE,USERID=#TSO
//*PPJES UACT=
//*PPJES WO=
//*PPJES UORG=
//*PPJES LOS=
//*PPJES AD=
//*PPJES MAN=
//*MAIN SYSTEM=SYG,CLASS=RA,LINES=(10,W),ORG=BVO27
//*
//* RETRIEVE THE APPLICON TAPE
//*
//STEP3 EXEC UTWSPREL
//SYSUT1 DD DSN=&&PLOT,
//     DISP=(NEW,PASS),UNIT=SYSDA,
//     PACE=(CYL,(10,5),RLSE)
//SYSIN
//*
//* JCL FOR HYPERCHANNEL OUTPUT OF
//*
//HYPER    EXEC PGM=BFXTI,
//   PARM='SEND TO=RDGRAPH1,ID=HRMN,MODE=B,B=32000,MSGLVL=0,UPPER'
//STEPLIB  DD  DSN=SYS3.NSC.NTXLOAD,DISP=SHR
//SYSUDUMP DD  SYSOUT=*
//SYSPRINT DD  SYSOUT=*
//FILEIN   DD  DSN=&&PLOT,
//             DISP=(OLD,PASS)
//RMTJOB   DD  DATA,DLM=#$
$JOB APPLICON
$PASSWORD APPLICON
$USER #TSO.APPLICON.APTMSTMP
$RECEIVE HRMN BIT CNSEIS1
$TAPEOUT
$ EOJ
#$
//*
//* JCL TO SAVE PLOT FILE IF HYPERCHANNEL TRANSMIT FAILS.

DSNAME = '#25B.IMGRAPLC.DATA(SRCCPS)'                      VOL=SER=TSOV01
DCB=(RECFM=FB,LRECL=80,BLKSIZE=9440)                       08/24/88 237 14:26:05

)ATTR
/* ****************************************************************** */
/* PANEL TO SELECT SOURCE OF CPS CODE                                  */
/* ****************************************************************** */
)BODY
%  HOW SHOULD THE CPS CODE FOR THIS RUN BE INCLUDED?
%
%      GENERATE THE CODE INTERNALLY (Y OR N) : +_Z+
%
%      IF (N) THEN PICK UP THE CODE FROM AN EXTERNAL DATA SET.
%      THE FULLY QUALIFIED DATA SET NAME IS
%
%      ===>: +_DSNCODE              +
)INIT
    .ZVARS='(SOURCE)'
)END

DSNAME = '#25B.IMGRAPLC.DATA(GRDCLSTR)'                    VOL=SER=TSOV01
DCB=(RECFM=FB,LRECL=80,BLKSIZE=9440)                       08/24/88 237 14:26:05

/* *******************************************************************
/* COMMANDS CREATE A BATCH PROGRAM TO DRAW APPLICON COLOR CONTOUR
/* PLOTS OF SPECTRAL IMAGERY DATA.  THE DATA ARE GRIDDED WITH THE
/* DISCRETE GRIDDING ALGORITHM, AND THE RESULTS ARE OUTPUT TO A
/* PERMENANT TSO DATA SET IN CPS INTERNAL FORMAT.
/*
/* 1. IMAGERY DATA ARE IN A SAS DATA BASE.
/*
/* 2. WELL LOCATIONS AND DRILLING RESULTS.  A T-CARD FILE GIVING THE
/*    DRILLING RESULTS OF ANY WELLS THE USER WANTS POSTED ON THE PLOT.
/*    FILE COULD BE PREPARED BY ANY RETRIEVAL PROGRAM, SUCH AS THE
/*    PROGRAM PRDCTNMP IN THIS PACKAGE.
/*
/* *******************************************************************
CONTROL LIST CONLIST MSG END(ENDO)
SET &SRFC=4
```

```
ISPEXEC VGET (WELLS SHTP TICK) PROFILE
ISPEXEC CONTROL DISPLAY REFRESH
ISPEXEC VGET (JOBTITLE XMIN XMAX NCOL YMIN YMAX NROW GRDOPTN) PROFILE
ISPEXEC DISPLAY PANEL(INPTGRID)
ISPEXEC VPUT (JOBTITLE XMIN XMAX NCOL YMIN YMAX NROW GRDOPTN) PROFILE
ISPEXEC CONTROL DISPLAY REFRESH
SET &SRFC=&SRFC+4
IF &GRDOPTN>1 THEN GOTO A1
SET &NZ=4
SET &FORMAT=&STR(5F14.6,T85,F14.6)
GOTO A3
A1: +
IF &GRDOPTN>2 THEN GOTO A2
SET &NZ=5
SET &FORMAT=&STR(6F14.6,T85,F14.6)
GOTO A3
A2: +
SET &NZ=2
SET &FORMAT=&STR(2F14.6,T71,2F14.6)
A3: +
ISPEXEC VGET (XSCL YSCL PSCL PWID DXO DYO) PROFILE
ISPEXEC CONTROL DISPLAY REFRESH
ISPEXEC DISPLAY PANEL(PLOTDEF)
ISPEXEC CONTROL DISPLAY REFRESH
ISPEXEC VPUT (XSCL YSCL PSCL PWID DXO DYO) PROFILE
SET &MA1=&STR(PHILLIPS PETROLEUM COMPANY_____)
SET &MA2=&STR(RESEARCH AND DEVELOPMENT_____)
SET &MA3=&STR(ENERGY RESOURCES DIVISION_____)
SET &MB1=&STR(LANDSAT MSS IMAGERY DATA_____)
SET &MB2=&STR(_____)
SET &MB3=&STR(_____)
SET &IPOS=5
SET &ISZE=1
SET &TSCL=1
SET &ITUT=2
SET &LOGO=1
ISPEXEC VGET (MB4 MD1 MG1A MG1B MG1C) PROFILE
ISPEXEC VGET (MH1A MH1B MH1C MJ1A MJ1B ML1) PROFILE
ISPEXEC VGET (MM1 MM2 MM3 MM4 MM5 MM6) PROFILE
ISPEXEC CONTROL DISPLAY REFRESH
ISPEXEC DISPLAY PANEL(MAPTITLE)
ISPEXEC CONTROL DISPLAY REFRESH
ISPEXEC DISPLAY PANEL(BLKTITLE)
ISPEXEC CONTROL DISPLAY REFRESH
ISPEXEC VPUT (MB4 MD1 MG1A MG1B MG1C) PROFILE
ISPEXEC VPUT (MH1A MH1B MH1C MJ1A MJ1B ML1) PROFILE
ISPEXEC VPUT (MM1 MM2 MM3 MM4 MM5 MM6) PROFILE
ISPEXEC VGET (PRJCT BSMP CLON,CMRD,CMRM,BPLD,BPLM,BPUD,BPUM) PROFILE
ISPEXEC VGET (ISL,ISP,ITGO,ITL,IUNT,SZTN,SZSC) PROFILE
ISPEXEC VGET (OLND,OLNM,OLTD,OLTM,SCAL) PROFILE
ISPEXEC VGET (XLFD,XLFM,XRTD,XRTM,YLWD,YLWM,YUPD,YUPM) PROFILE
ISPEXEC CONTROL DISPLAY REFRESH
ISPEXEC DISPLAY PANEL(BSMPRMTR)
ISPEXEC CONTROL DISPLAY REFRESH
ISPEXEC VPUT (PRJCT BSMP CLON,CMRD,CMRM,BPLD,BPLM,BPUD,BPUM) PROFILE
ISPEXEC VPUT (ISL,ISP,ITGO,ITL,IUNT,SZTN,SZSC) PROFILE
ISPEXEC VPUT (OLND,OLNM,OLTD,OLTM,SCAL) PROFILE
ISPEXEC VPUT (XLFD,XLFM,XRTD,XRTM,YLWD,YLWM,YUPD,YUPM) PROFILE
ISPEXEC VGET (CONMIN,CONMAX,CONINT,IMASK,ISCALE,ICVAL,CONTOUR) PROFILE
ISPEXEC VGET (NCOLOR,XBOR,YBOR) PROFILE
ISPEXEC VGET (COLOR1,COLOR2,COLOR3,COLOR4,COLOR5,COLOR6) PROFILE
ISPEXEC VGET (COLOR7,COLOR8,COLOR9,COLOR10,COLOR11) PROFILE
ISPEXEC CONTROL DISPLAY REFRESH
ISPEXEC DISPLAY PANEL(COLORS)
ISPEXEC CONTROL DISPLAY REFRESH
ISPEXEC VPUT (CONMIN,CONMAX,CONINT,IMASK,ISCALE,ICVAL,CONTOUR) PROFILE
ISPEXEC VPUT (NCOLOR,XBOR,YBOR) PROFILE
ISPEXEC VPUT (COLOR1,COLOR2,COLOR3,COLOR4,COLOR5,COLOR6) PROFILE
ISPEXEC VPUT (COLOR7,COLOR8,COLOR9,COLOR10,COLOR11) PROFILE
DEL GRDCLSTR
E GRDCLSTR DATA NON EMODE
 TOP
 IN $VC JOB=1,INDT=999,NCOL=&NCOL,NROW=&NROW $END
 IN &JOBTITLE
 IN  $VC CXIC=1,XMIN=&XMIN,XMAX=&XMAX $END
 IN  $VC CYIC=1,YMIN=&YMIN,YMAX=&YMAX $END
 IN  $VC CMNT=1 $END
 IN ******************************************************************
 IN READ THE IMAGERY GRID USING READ.
 IN ******************************************************************
 IN CEND
 IN  $VC INPT=1,ZIDC=0,LUN=1,IFMT=2,NZ=&NZ $END
 IN (&FORMAT)
 IN  $VC REWD=1,LUN=1 $END
 IN  $VC SAVE=1,ZIDA=0,LUN=41,FILE=1,MODE=1 $END
```

```
IN    $VC EVLF=1,ZIDC=10,PRAM=0.0 $END
IN    $VC SAVE=1,ZIDA=10,LUN=27,FILE=1,MODE=1 $END
IN    $VC SAVE=1,ZIDA=10,LUN=27,FILE=2,MODE=1 $END
IN    $VC SAVE=1,ZIDA=10,LUN=27,FILE=3,MODE=1 $END
IN    $VC SAVE=1,ZIDA=10,LUN=27,FILE=4,MODE=1 $END
IN    $VC SAVE=1,ZIDA=10,LUN=27,FILE=5,MODE=1 $END
IN    $VC DELT=1,ZIDA=10 $END
IN    $VC STAT=1 $END
IN    $VC ZFIT=1,ITYP=11,SLM=1.30,LUN=41,IFMT=3,FILE=1,NZ=&NZ,IANL=0 $END
IF &GRDOPTN>1 THEN GOTO B1
IN    $VC SMTH=1,ZIDA=1,ZIDC=6 $END
IN    $VC SMTH=1,ZIDA=2,ZIDC=7 $END
IN    $VC SMTH=1,ZIDA=3,ZIDC=8 $END
IN    $VC SAVE=1,ZIDA=4,LUN=27,FILE=1,MODE=1 $END
IN    $VC SAVE=1,ZIDA=6,LUN=27,FILE=2,MODE=1 $END
IN    $VC SAVE=1,ZIDA=7,LUN=27,FILE=3,MODE=1 $END
IN    $VC SAVE=1,ZIDA=8,LUN=27,FILE=4,MODE=1 $END
GOTO B3
B1: +
IF &GRDOPTN>2 THEN GOTO B2
IN    $VC SMTH=1,ZIDA=1,ZIDC=6 $END
IN    $VC SMTH=1,ZIDA=2,ZIDC=7 $END
IN    $VC SMTH=1,ZIDA=3,ZIDC=8 $END
IN    $VC SMTH=1,ZIDA=4,ZIDC=9 $END
IN    $VC SAVE=1,ZIDA=5,LUN=27,FILE=1,MODE=1 $END
IN    $VC SAVE=1,ZIDA=6,LUN=27,FILE=2,MODE=1 $END
IN    $VC SAVE=1,ZIDA=7,LUN=27,FILE=3,MODE=1 $END
IN    $VC SAVE=1,ZIDA=8,LUN=27,FILE=4,MODE=1 $END
IN    $VC SAVE=1,ZIDA=9,LUN=27,FILE=5,MODE=1 $END
GOTO B3
B2: +
IN    $VC SMTH=1,ZIDA=1,ZIDC=9 $END
IN    $VC SAVE=1,ZIDA=2,LUN=27,FILE=1,MODE=1 $END
IN    $VC SAVE=1,ZIDA=9,LUN=27,FILE=5,MODE=1 $END
B3: +
IN    $VC READ=1,ZIDC=11,LUN=27,FILE=1,MODE=1 $END
IN    $VC STAT=1 $END
IN    $VC PDEF=1,PSCL=&PSCL,IAOV=1,
IN        DXO=&DXO,DYO=&DXY,XSCL=&XSCL,YSCL=&YSCL,
IN        PWID=&PWID $END
IN    $VC BRDR=1,JSID=0 $END
IN    $VC CMNT=1 $END
IN    **********************************************************************
IN    MAKE PLOTS FOR THE SIGNATURE GRIDS.
IN    **********************************************************************
IN    CEND
IN    $VC PPMT=1,IPOS=&IPOS,ISZE=&ISZE,ITLD=&ITLD,&ASCL=&ASCL,
IN        IUNI=&IUNI,LOGO=&LOGO $END
IN MA1        &MA1
IN MA2        &MA2
IN MA3        &MA3
IN MB1AREA &MB1
IN MB2        &MB2
IN MG1REGION &MG1A    STATE &MG1B    COUNTRY &MG1C
IN MH1INTERPRETATION BY &MH1A   DATE &MH1B
IN MJ1PROCJECTION &MJ1A   CENTRAL_MERIDIAN &MJ1B
IN ML1SCALE &ML1
IN MM1PROCESSING HISTORY:
IN MM2 1 - &MM2
IN MM3 2 - &MM3
IN MM4 3 - &MM4
IN MM5 4 - &MM5
IN MM6 5 - &MM6
IN MM7 6 - &MM7
IN MM8 7 - &MM8
IN MEND
TOP
F  'PPMT'
C  *  0 /_/ /ALL
B
IN    $VC FENC=1,MODE=2,NPC=5,IFMT=2 $END
IN    (F10.0/F10.0)
IN    &XMIN
IN    &YMIN
IN    &XMAX
IN    &YMIN
IN    &XMAX
IN    &YMAX
IN    &XMIN
IN    &YMAX
IN    &XMIN
IN    &YMIN
IF &BSMP=&STR(N) THEN GOTO C1
IN    $VC PPBM=1,CLON='&CLON',CMRD=&CMRD,CMRM=&CMRM,IPRJ=&PRJCT,
IN        BPLD=&BPLD,BPLM=&BPLM,BPUD=&BPUD,BPUM=&BPUM,
```

```
 IN   ISL=&ISL,ISP=&ISP,ITGO=&ITGO,ITL=&ITL,
 IN   IUNT=&IUNT,OLND=&OLND,OLNM=&OLNM,OLTD=&OLTD,OLTM=&OLTM,SCAL=&SCAL,
 IN   SZSC=&SZSC,SZTN=&SZTN,
 IN   XLFD=&XLFD,XLFM=&XLFM,XRTD=&XRTD,XRTM=&XRTM,
 IN   YLWD=&YLWD,YLWM=&YLWM,YUPD=&YUPD,YUPM=&YUPM $END
C1: +
IF &WLLS=&STR(N) THEN GOTO D1
 IN   $VC LGPT=1,MODE=2,ISMB=1,SIZE=0.15,LUN=2,NZ=1,IPRT=0 $END
 IN   $CD FILD=0 $END
 IN   (2F14.6,T127,I2)
 IN   $VC REWD=1,LUN=1,ITYP=1 $END
D1: +
IF &SHTP=&STR(N) THEN GOTO D2
 IN   $VC LGPT=1,MODE=2,ISMB=-6,SIZE=0.25,LUN=3,NZ=1,IPRT=0 $END
 IN   $CD FILD=0 $END
 IN   (2F14.6,T127,I2)
 IN   $VC REWD=1,LUN=2,ITYP=1 $END
D2: +
IF &TICK=&STR(N) THEN GOTO D3
 IN   $VC LGPT=1,MODE=2,ISMB=-1,SIZE=1.00,LUN=4,NZ=1,IPRT=0 $END
 IN   $CD FILD=0 $END
 IN   (2F14.6,T.25,I2)
 IN   $VC REWD=1,LUN=4,ITYP=1 $END
D3: +
 IN   $VC NWPG=1 $END
 IN   $VC SAVE=1,LUN=97,ZIDA=&SRFC $END
 IN   $VC PNCH=1,LUN=98,IFMT=-1 $END
 IN   $INFO CONMIN=&CONMIN,CONMAX=&CONMAX,CONINT=&CONINT,
 IN          IMASK=&IMASK,ICVAL=&ICVAL,ISCALE=&ISCALE,
 IN          NCOLOR=&NCOLOR,XBOR=&XBOR,YBOR=&YBOR,NDECS=3,
 IN          COLORS=&COLOR1,&COLOR2,&COLOR3,&COLOR4,
 IN                 &COLOR5,&COLOR6,&COLOR7,&COLOR8,
 IN                 &COLOR9,&COLOR10,&COLOR11 $END
 IN   $VC STOP=1 $END
 SAVE
END
DSNAME = '#25B.IMGRAPLC.DATA(INPTGRID)'                    VOL=SER=TSOV01
DCB=(RECFM=FB,LRECL=80,BLKSIZE=9440)                       08/24/88 237 14:26:05

)ATTR
/* ****************************************************************/
/* PANEL TO SET UP SET UP CPS INPUT AND GRIDDING OPERATIONS
/*
/*   1  TITLE FOR THE CPS RUN
/*   2  SPECIFY THE AREA OF INTEREST FOR THE MAP
/*   3  SPECIFY THE TYPE OF MAP
/*      A   BAND 4, BAND 5, AND BAND 7
/*      B   MSS ALTERATION SIGNATURE
/*      C   BAND 4, BAND 5, BAND 7, AND ALTERATION SIGNATURE
/* ****************************************************************/
)BODY
% BASIC CPS INPUT AND GRIDDING OPERATION CONTROL PARAMETERS
%
%     TITLE RUN ==>: +_JOBTITLE                                      +
%
%     AREA OF INTEREST UNDER AND GRID INTERVALS (IN MILES FROM ORIGIN)
%
%     X-MIN=:+_XMIN       + % X-MAX=:+_XMAX      + % # OF COLUMNS=:+_NCOL+
%     Y-MIN=:+_YMIN       + % Y-MIN=:+_YMAX      + % # OF ROWS    =:+_NROW+
%
%     DATA TO BE GRIDDED (CHOOSE ONE) ==>:+_Z+
%
%     1. FALSE COLOR (BANDS 4, 5, AND 7)
%     2. FALSE COLOR AND MSS ALTERATION
%     3. MSS ALTERATION
%
%     SURFACE PLOTTED OR PROCESSED (CHOOSE ONE) ==>:+_Z+
%
%     1-BAND 4   3-BAND 7      5-MOST SIGNATURE          7-MSS CLUSTERS
%     2-BAND 5   4-ALTERATION  6-PRODUCTION SIGNATURE
)INIT
 .ZVARS= '(GRDOPTN SRFC)'
)END

DSNAME = '#25B.IMGRAPLC.DATA(PLOTDEF)'                     VOL=SER=TSOV01
DCB=(RECFM=FB,LRECL=80,BLKSIZE=9440)                       08/24/88 237 14:26:05

)ATTR
/* ****************************************************************/
/* PANEL DEFINE GROSS CPS PLOT PARAMETERS                         */
/*                                                                */
/*   1.  YSCL       X-AXIS SCALE FACTOR (ENG./MAP.)               */
/*   2.  YSCL       3-AXIS SCALE FACTOR (ENG./MAP.)               */
/*   3.  PSCL       SCALE FACTOR APPLIED TO WHOLE PLOT (          */
/*                                                                */
```

```
/*    4.   PWID      WIDTH OF PLOTTING PAPER                         */
/*    5.   DXO       X-SHIFT OF APPLICON ORIGIN FROM CPS ORIGIN      */
/*    6.   DYO       X-SHIFT OF APPLICON ORIGIN FROM CPS ORIGIN      */
/* *************************************************************** */
)BODY
%  MAPPING SCALE FACTORS AND PLOTTER CHARACTERISTICS
%
%    X-AXIS SCALE FACTOR (ENGINEERING/MAP) ===>: +_XSCL        +
%    Y-AXIS SCALE FACTOR (ENGINEERING/MAP) ===>: +_YSCL        +
%
%    TOTAL PLOT SCALE FACTOR (MAP/MAP) =======>: +_PSCL        +
%
%    PLOTTER.WIDTH ===========================>: +_PWID        +
%
%    PLOTTER SHIFT WITH RESPECT TO ! X-SHIFT =>: +_DXO         +
%    LOWER LEFT CORNER OF PAPER    ! Y-SHIFT =>: +_DYO         +
%
)END
```

```
DSNAME = '#25B.IMGRAPLC.DATA(MAPTITLE)'                  VOL=SER=TSOV01
DCB=(RECFM=FB,LRECL=80,BLKSIZE=9440)                     08/24/88 237 14:26:05

)ATTR
/* *************************************************************** */
/* PANEL TO SET UP MAT TITLES FOR CPS OR APPLICON CONTOUR PLOTS    */
/* INPUTS ONLY THE VERB CONTROL PARAMETERS, THE TITLE INFORMATION  */
/* IS PLACED ON ANOTHER PANEL.                                     */
/* *************************************************************** */
)BODY
%  MAP TITLE CONTROL PARAMETERS - APPLICON OT VERSATEC PLOTTERS
%
%  TITLE POSITION - PICK A NUMBER    MAP UNITS - PICK A NUMBER
%  1 UPPER LEFT           !            0 IN/IN              !
%  2 UPPER RIGHT          !            1 FT/IN              !
%  3 LOWER LEFT           !            2 MI/IN              !
%  4 LOWER RIGHT          !=>:+_Z+ %   3 STATUTE MI/IN      !=>:+_Z+
%  5 OUTSIDE LOWER RIGHT! !            4 NAUTICAL MI/IN!
%  6 BOTTOM LEFT          !            5 M/M                !
%  7 BOTTOM RIGHT         !            6 KM/M               !
%
%  TITLE SIZE-PICK A NUMBER
%  1 8"X 8"!
%  2 6"X 6"!=>:+_Z+
%  3 4"X 4"!
%
%  MAP SCALE (Y OR N) =>:+_Z+
%  PPCO LOGO (Y OR N) =>:+_Z+
%
)INIT
   .ZVARS='(IPOS ITUT ISZE TSCL LOGO)'
)END
```

```
DSNAME = '#25B.IMGRAPLC.DATA(BLKTITLE)'                  VOL=SER=TSOV01
DCB=(RECFM=FB,LRECL=80,BLKSIZE=9440)                     08/24/88 237 14:26:05

)ATTR
/* *************************************************************** */
/* PANEL TO FILL OUT THE MAP TITLE BLOCK.                          */
/* *************************************************************** */
)BODY
%  TITLE BLOCK TEXT - STANDARD PHILLIPS TITLE FORMAT
%
%         +_MA1                         +
%         +_MA2                         +
%         +_MA3                         +
%   AREA+_MB1                        +
%         +_MB2                         +
%         +_MB3                         +
%         +_MB4                         +
%   REGION+_MG1A        +%STATE+_MG1B         +%COUNTY+_MG1C        +
%   MAP PREPARED BY+_MH1A           +% DATE+_MH1B                   +
%   PROJECTION +_MJ1A               +%CENTRAL MERIDIAN+_MJ1B        +
%   SCALE+_ML1                  +
%   PROCESSING HISTORY:
%   1+_MM2                                                          +
%   2+_MM3                                                          +
%   3+_MM4                                                          +
%   4+_MM5                                                          +
%   5+_MM6                                                          +
)END
```

```
DSNAME = '#25B.IMGRAPLC.DATA(BSMPRMTR)'                  VOL=SER=TSOV01
DCB=(RECFM=FB,LRECL=80,BLKSIZE=9440)                     08/24/88 237 14:26:05

)ATTR
```

```
/* ****************************************************************/
/* PANEL TO SELECT BASEMAP RETRIVAL AND PLOTTING PARAMETERS      */
/* ****************************************************************/
)BODY
% DRAW A BASEMAP ON THE PLOT (Y OR N) =>:+_Z+
%
% MAP PROJECTION DESIRED  ==>:+_Z+ %SPHEROID FOR PROJECTION ==>:+_Z+
%  1 LAMBERT   3 UTM       5 ATM    1 INTERNATIONAL  2 CLARKE 1866
%  2 POLYCONIC 4 MERCATOR  6 TM     3 CLARKE 1880    4 EVEREST
%
% BASE PARALLEL LOWER, DEGREES :+_Z + %MINUTES :+_Z +
% BASE PARALLEL UPPER, DEGREES :+_Z + %MINUTES :+_Z +
% CENTRAL MERIDIAN DEGREES     :+_Z + %MINUTES :+_Z +%(E OR W) :+_Z+
%
% TOWNSHIP PLOT :+_Z+ % SECTION LABELING :+_Z+ %TOWNSHIP LABELING:+_Z+
%  1 FULL                  0 NONE                    0 NONE
%  2 TOWNSHIP & CORNERS    1 FOUR CORNER             1 ALL
%  3 TOWNSHIP CORNERS      2 FULL TOWNSHIP
%  4 SECTION CORNERS & 3
%  5 TOWNSHIP LINES
%
% MAP SCALE               : +_Z +
% SCALE FACTOR            : +_Z      +
% SECTION LABEL SIZE      : +_Z   +
% TOWNSHIP LABEL SIZE     : +_Z   +
%
% ORIGIN LONG, DEGREES :+_Z + %MINUTES :+_Z +
% ORIGIN  LAT, DEGREES :+_Z + %MINUTES :+_Z +
% LEFT LIMIT,  DEGREES :+_Z + %MINUTES :+_Z +
% RIGHT LIMIT, DEGREES :+_Z + %MINUTES :+_Z +
% LOWER LIMIT, DEGREES :+_Z + %MINUTES :+_Z +
% UPPER LIMIT, DEGREES :+_Z + %MINUTES :+_Z +
)INIT
  .ZVARS='(BSMP PRJCT ISP BPLD BPLM BPUD BPUM +
           CMRD CMRM CLON ITGO ISL ITL +
           IUNT SCAL SZSC SZTN +
           OLND OLNM OLTD OLTM +
           XLFD XLFM XRTD XRTM +
           YLWD YLWM YUPD YUPM)'
)END

DSNAME = '#25B.IMGRAPLC.DATA(COLORS)'                    VOL=SER=TSOV01
DCB=(RECFM=FB,LRECL=80,BLKSIZE=9440)                     08/24/88 237 14:26:05

)ATTR
/* ****************************************************************/
/* PANEL TO SET UP SELECT COLORS FOR THE APPLICON CONTOUR PROGRAM */
/* COLORS DEFINED ON APPLICON COLOR TABLES                        */
/*                                                                */
/*CONMIN=LOWEST LEVEL        IMASK=INDETERMINANT MASK CONTROL     */
/*CONMAX=HIGHEST LEVEL       ICVAL=INDETERMINANT REPLACEMENT      */
/*CONINT=LEVEL INTERVAL      ISCAL=COLOR SCALE BAR                */
/*NCOLOR=NUMBER OF COLORS    (XBOR,YBOR)=APPLICON ORIGIN WRT PAPER*/
/*                                                                */
/*COLOR   CODE    RESULT                                          */
/*                                                                */
/* 1     020000  YELLOW                                           */
/* 2     020000  YELLOW                                           */
/* 3     020000  YELLOW                                           */
/* 4     020000  YELLOW                                           */
/* 5     020000  YELLOW                                           */
/* 6     020000  YELLOW                                           */
/* 7     040002  !                                                */
/* 8     060004  ! SHADES OF SPARSE TO DENSE GREEN                */
/* 9     080008  ! DOTS ON A YELLOW BACKGROUND                    */
/* 10    120012  !                                                */
/* 11    160016  !                                                */
/* ****************************************************************/
)BODY
% SET APPLICON CONTROL PARAMETERS AND SET THE COLORS
% TO BE PLOTTED FOR THE CONTOUR INTERVALS
%
% LOWEST LEVEL       >:+_CONMIN+ %INDETERMINANT REPLACEMENT >:+_Z+
% HIGHEST LEVEL      >:+_CONMAX+ %INDETERMINANT MASK        >:+_Z+
% LEVEL INTERVAL     >:+_CONINT+ %COLOR SCALE BAR           >:+_Z+
% NUMBER OF COLORS   >:+_NCOLOR+ %APPLICON ORIGIN >:(+_XBOR +%,+_YBOR+%)
%
% COLOR    LAST USED    RECOMMENDED SPECIFICATION
% LEVEL      CODE                  STYLE
%
%  1   >:+_COLOR1  + %    YELLOW       IF LESS THAN 11 COLORS ARE
%  2   >:+_COLOR2  + %    YELLOW       USED, SUPRESS THE UNWANTED
%  3   >:+_COLOR3  + %    YELLOW       COLORS BY MAKING THEM WHITE;
%  4   >:+_COLOR4  + %    YELLOW       THE APPLICON COLOR CODE IS
% .5   >:+_COLOR5  + %    YELLOW       000000 FOR WHITE.
```

```
%   6  >:+_COLOR6  + %   YELLOW
%   7  >:+_COLOR7  + %   YELLOW !
%   8  >:+_COLOR8  + %   YELLOW ! INCREASINGLY DENSE FIELD OF
%   9  >:+_COLOR9  + %   YELLOW ! GREEN DOTS ON A PALE YELLOW
%  10  >:+_COLOR10 + %   YELLOW ! BACKGROUND
%  11  >:+_COLOR11 + %   YELLOW !
)INIT
   .ZVARS='(ICVAL IMASK ISCALE)'
)END

DSNAME = '#25B.IMGRAPLC.DATA(PDCLSTAT)'                      VOL=SER=TSOV01
DCB=(RECFM=FB,LRECL=80,BLKSIZE=9440)                         08/24/88 237 14:26:05

/* ****************************************************************
/* COMMANDS CREATE A BATCH PROGRAM TO REVERSE INTERPOLATE IMAGERY AND
/* CLUSTERS AT LOCATIONS FOR WHICH DRILLING RESULTS ARE AVAILABLE.
/* IMAGERY DATA AREW READ FROM DISK, WHERE THEY ARE STORED IN INTERNAL
/* CPS FORMAT.  THESE DATA ARE REFFERED TO AS LUN=23, AND THEY ARE
/* ORGANIZED AS FOLLOWS:
/*
/*   FILE 1   CLUSTERS
/*   FILE 2   BAND 4
/*   FILE 3   BAND 5
/*   FILE 4   BAND 7
/*   FILE 5   ALTERATION
/*
/*   WELL DATA ARE IN T-CARD FORM IN A TSO FILE.  THE CARD ORGANIZATION
/*   IS AS FOLLOWS:
/*
/*      COLUMNS          DESCRIPTION
/*
/*      15               EMS CODE FOR INITIAL STATUS
/*      16               EMS CODE FOR FINAL STATUS
/*      17-18            EMS CODE FOR FINAL STATUS
/*      20-27            LONGITUDE OF WELL
/*      28               HEMISPHERE CODE
/*      29-25            LATITUDE OF WELL
/*      35               HEMISPHERE CODE
/* ****************************************************************
CONTROL LIST CONLIST MSG END(ENDO)
ISPEXEC VGET (JNAM INIT USER LABL YNAM JA MCRB BUGSAS) PROFILE
SET &TIME=4
SET &LINE=&STR(09)
SET &AD=&STR(GSCNC)
SET &RGN=&STR(3500)
SET &HOLD=&STR(N)
ISPEXEC VGET (JNAM INIT USER LABL YNAM JA IMAG SASBASE) PROFILE
ISPEXEC CONTROL DISPLAY REFRESH
ISPEXEC DISPLAY PANEL(SASPLJCL)
ISPEXEC CONTROL DISPLAY REFRESH
ISPEXEC VPUT (JNAM INIT USER LABL YNAM JA IMAG SASBASE) PROFILE
SET &MSGCLS=&STR(A)
IF &HOLD=&STR(N) THEN GOTO J1
SET &MSGCLS=&STR(Y)
J1: +
COPY '#25B.BUGPRGM.TEST(PPJCARD)' APLCPRDC.DATA NON
E APLCPRDC DATA NON EMODE
 TOP
 C * /A8169/A2020/
 C * /INI/&INIT/
 DOWN 1
 C * /MSGCLASS=/MSGCLASS=&MSGCLS/
 C * /MSGLEVEL=/MSGLEVEL=1/
 C * /NOTIFY=/NOTIFY=#&USER/
 C * /REGION=/REGION=&RGN&STR(K)/
 C * /TIME=/TIME=&TIME/
 DOWN 1
 C * /#TSO/#&USER/
 DOWN 1
 C * /UACT=/UACT=&JA/
 DOWN 1
 C * /WO=/WO=&LABL/
 DOWN 1
 C * /UORG=/UORG=NRG/
 DOWN 1
 C * /LOS=/LOS=F/
 DOWN 1
 C * /AD=/AD=&AD/
 DOWN 1
 C * /MAN=/MAN=&USER/
 F '//*FORMAT'
 DEL
 SAVE
END                                                                 Z AD
ISPEXEC VGET (WLDT) PROFILE
```

```
ISPEXEC VGET (PRDC SIES  BSMP STATE1 STATE2 STATE3) PROFILE
ISPEXEC VGET (WLLS SHTP TICK) PROFILE
ISPEXEC CONTROL DISPLAY REFRESH
ISPEXEC DISPLAY PANEL(APLCDTST)
ISPEXEC CONTROL DISPLAY REFRESH
ISPEXEC DISPLAY PANEL(PRDCDTST)
ISPEXEC CONTROL DISPLAY REFRESH
ISPEXEC VPUT (BGFL BTCR SMPL GCHM) PROFILE
ISPEXEC VPUT (PRDC SIES  BSMP) PROFILE
ISPEXEC VPUT (WLDT) PROFILE
BS0: +
IF &BSMP=&STR(N) THEN GOTO BS1
ISPEXEC CONTROL DISPLAY REFRESH
ISPEXEC VGET (STATE1 STATE2 STATE3) PROFILE
ISPEXEC DISPLAY PANEL(BSMPTAPE)
ISPEXEC VPUT (STATE1 STATE2 STATE3) PROFILE
ISPEXEC CONTROL DISPLAY REFRESH
BS1: +
E APLCPRDC DATA NON EMODE
 B
 IN //GO EXEC P2020,PROG=P6213B
IF &WLLS=&STR(N) THEN GOTO A1
 IN //GO.FT02F001 DD DSN=&&&&PS2,SPACE=(CYL,(2,2)),DISP=(NEW,PASS),
 IN // DCB=(RECFM=VBS,BLKSIZE=19069)
A1: +
IF &SHTP=&STR(N) THEN GOTO A2
 IN //GO.FT03F001 DD DSN=&&&&PS3,SPACE=(CYL,(2,2)),DISP=(NEW,PASS),
 IN // DCB=(RECFM=VBS,BLKSIZE=19069)
A2: +
IF &TICK=&STR(N) THEN GOTO A3
 IN //GO.FT04F001 DD DSN=&&&&PS4,SPACE=(CYL,(2,2)),DISP=(NEW,PASS),
 IN // DCB=(RECFM=VBS,BLKSIZE=19069)
A3: +
IF &WLLS=&STR(N) THEN GOTO A4
 IN //GO.FT30F001 DD DSN=&PRDC,DISP=SHR
A4: +
IF &SHTP=&STR(N) THEN GOTO A5
 IN //GO.FT30F002 DD DSN=&SIES,DISP=SHR
A5: +
 IN //GO.SYSIN DD *
 SAVE
END
SET &PRJCT=&STR(6)
SET &UPPER=&STR(____)
SET &LOWER=&STR(____)
SET &CMRDN=&STR(____)
SET &SPHRD=&STR(2)
SET &ORGLT=&STR(____)
SET &ORGLN=&STR(____)
SET &HEW=&STR(W)
SET &HNS=&STR(0)
SET &UNT=&STR(2)
SET &DDN=&STR(2)
ISPEXEC CONTROL DISPLAY REFRESH
ISPEXEC DISPLAY PANEL(MPPRJCTN)
ISPEXEC CONTROL DISPLAY REFRESH
E APLCPRDC DATA NON EMODE
IF &PRDC=&STR(N) THEN GOTO A7
SET &DDN=&STR(2)
 B
 MERGE '#25B.BUGPRGM.TEST(CCARD)'
 B
 C * /#/&PRJCT/
 C * /$$$$/&UPPER/
 C * /$$$$/&LOWER/
 C * /#####/&CMRDN/
 C * /H/&HEW/
 C * /H/&HNS/
 C * /S/&SPHRD/
 C * /$$$$/&ORGLT/
 C * /#####/&ORGLN/
 C * /U/&UNT/
 C * /D/&DDN/
A7: +
IF &SHTP=&STR(N) THEN GOTO A8
SET &DDN=&STR(3)
 B
 MERGE '#25B.BUGPRGM.TEST(CCARD)'
 B
 C * /#/&PRJCT/
 C * /$$$$/&UPPER/
 C * /$$$$/&LOWER/
 C * /#####/&CMRDN/
 C * /H/&HEW/
 C * /H/&HNS/
```

```
C * /S/&SPHRD/
C * /$$$$/&ORGLT/
C * /#####/&ORGLN/
C * /U/&UNT/
C * /D/&DDN/
A8: +
 SAVE
END
IF &TICK=&STR(N) THEN GOTO A10
SET &DDN=&STR(4)
SET &BOTTM=&STR(     )
SET &TOP  =&STR(     )
SET &SPCLT=&STR(000500)
SET &DNS=&STR(N)
SET &RIGHT=&STR(     )
SET &LEFT =&STR(     )
SET &SPCLN=&STR(000500)
SET &DEW=&STR(W)
ISPEXEC CONTROL DISPLAY REFRESH
ISPEXEC DISPLAY PANEL(TICKMARK)
ISPEXEC CONTROL DISPLAY REFRESH
E APLCPRDC DATA NON EMODE
 B
 MERGE '#25B.BUGPRGM.TEST(FCARD)'
 TOP
 F '$$$$'
 C * /#/&PRJCT/
 C * /$$$$/&UPPER/
 C * /$$$$/&LOWER/
 C * /#####/&CMRDN/
 C * /H/&HEW/
 C * /H/&HNS/
 C * /S/&SPHRD/
 C * /$$$$/&ORGLT/
 C * /#####/&ORGLN/
 C * /U/&UNT/
 C * /D/&DDN/
 DOWN 1
 C * /$$$$/&BOTTM/
 C * /H/&DNS/
 C * /$$$$/&TOP/
 C * /H/&DNS/
 C * /$$$$/&SPCLT/
 C * /#####/&LEFT/
 C * /H/&DEW/
 C * /#####/&RIGHT/
 C * /H/&DEW/
 C * /####/&SPCLN/
 SAVE
END
A10: +
E APLCPRDC DATA NON EMODE
 TOP
 IF &LOWER^=&STR(____) THEN GOTO L1
 F 'P2020'
 C * 999 /_/ /ALL
 L1: +
 SAVE
END
IF &BSMP=&STR(N) THEN GOTO A23
E APLCPRDC DATA NON EMODE
 B
 MERGE '#25B.BUGPRGM.TEST(BSMPJCL)' NON
 B
 UP 2
 C * /STATE1/&STATE1/
 F 'STATE'
 IF &STATE2^=&STR( ) THEN GOTO A20
 DEL * 2
 GOTO A22
 A20: +
 C * /STATE2/&STATE2/
 F 'STATE'
 IF &STATE3^=&STR( ) THEN GOTO A21
 DEL *
 GOTO A22
 A21: +
 C * /STATE3/&STATE3/
 A22: +
 SAVE
END
A23: +
SET &GDSP=&STR(OLD)
SET &PRMY=&STR(50)
SET &SCND=&STR(5)
```

```
SET &UNIT=&STR(TR)
ISPEXEC CONTROL DISPLAY REFRESH
ISPEXEC VGET (SGNTCPSG GCHMIMGR) PROFILE
ISPEXEC DISPLAY PANEL(GCHMIMGR)
ISPEXEC VPUT (SGNTCPSG GCHMIMGR) PROFILE
ISPEXEC CONTROL DISPLAY REFRESH
IF &GDSP=&STR(OLD) THEN GOTO A24
FREE ATTRLIST(KRS)
ATTR KRS RECFM(F B) LRECL(133) BLKSIZE(3990)
DEL '&GCHMIMGR'
ALLOC DA('&GCHMIMGR') NEW SP(&PRMY,&SCND) &UNIT
A24: +
E APLCPRDC DATA NON EMODE
 B
 IN //ST2.FT27F001 DD DSN=&SGNTCPSG,DISP=SHR
 IN //ST2.FT29F001 DD DSN=&GCHMIMGR,DISP=OLD
 IN //ST2.SYSIN DD *
 SAVE
END
SET &TEXTA=&STR( )
SET &TEXTB=&STR( )
ISPEXEC CONTROL DISPLAY REFRESH
ISPEXEC DISPLAY PANEL(IDNTFYR)
ISPEXEC CONTROL DISPLAY REFRESH
SET &HR=&SUBSTR(1:2,&SYSTIME)
SET &MN=&SUBSTR(4:5,&SYSTIME)
SET &TM=&HR&MN
SET &HRMN=&HR&MN
SET &LBL=&STR( )
IF &TEXTB=&STR( ) THEN GOTO A25
SET &LBL=&STR(.)&TEXTB
A25: +
IF &TEXTA=&STR( ) THEN GOTO A26
SET &LBL=&STR(.)&TEXTA&LBL
A26: +
SET &TM=&TM&LBL
COPY '#25B.IMGRAPLC.DATA(HYPRAPLC)' HYPRAPLC.DATA NON
E HYPRAPLC DATA NON
 TOP
 F 'AT000INI'
 C * 999 /INI/&INIT/ALL
 TOP
 F 'AT000'
 C * 999 /NOTIFY=/NOTIFY=#&USER/ALL
 C * 999 /REGION=/REGION=100K/ALL
 C * 999 /TIME=/TIME=1/ALL
 TOP
 F 'AT000'
 C * 999 /#TSO/#&USER/ALL
 TOP
 F 'AT000'
 C * 999 /UACT=/UACT=&JA/ALL
 TOP
 F 'AT000'
 C * 999 /WO=/WO=&LABL/ALL
 TOP
 F 'AT000'
 C * 999 /UORG=/UORG=NRG/ALL
 TOP
 F 'AT000'
 C * 999 /LOS=/LOS=5/ALL
 TOP
 F 'AT000'
 C * 999 /AD=/AD=&AD/ALL
 TOP
 F 'AT000'
 C * 999 /MAN=/MAN=&USER/ALL
 TOP
 F 'HRMN'
 C * 999 /HRMN/AP&HRMN/ALL
 TOP
 F 'TMSTMP'
 C * 999 /TMSTMP/TM&TM/ALL
 SAVE
END
ISPEXEC VGET (SOURCE DSNCODE) PROFILE
ISPEXEC DISPLAY PANEL(SRCCPS)
ISPEXEC VPUT (SOURCE DSNCODE) PROFILE
IF &SOURCE=&STR(N) THEN GOTO S1
ISPEXEC SELECT CMD(GRIDPDCL)
COPY GRIDPDCL APLCINTR NON
GOTO S2
S1: +
COPY '&DSNCODE' APLCINTR.DATA NON
S2: +
```

```
E APLCPRDC DATA NON EMODE
 B
  MERGE APLCINTR NON
 B
  MERGE HYPRAPLC NON
  SAVE
 END
 DEL (APLCINTR HYPRAPLC)
DSNAME = '#25B.IMGRAPLC.DATA(PRDCDTST)'                              VOL=SER=TSOV01
DCB=(RECFM=FB,LRECL=80,BLKSIZE=9440)                                 08/24/88  237  14:26:05

)ATTR
/* ************************************************************** */
/* PANEL TO LOCATE GEOGRAPHIC COORDINATES, INITIAL STATUS, AND
/* FINAL STATUS OF EACH WELL IN A STUDY AREA.  WELL DATA ARE
/* ASSUMUED TO HAVE BEEN PRODUCED BY A WHCS WELL RECOVERY.
/*
/*    TCARDS SHOULD CONTAIN THE FOLLOWING:
/*
/*    COLUMN     DESRIPTION
/*
/*    15         EMS CODE FOR INITIAL STATUS
/*    16         EMS CODE FOR FINAL STATUS
/*    17-18      CPS CODE FOR FINAL STATUS
/*    20-27      LONGITUDE
/*    28         HEMISPHERE CODE
/*    29-35      LATITUDE
/*    36         HEMISPHERE CODE
/*
/* ************************************************************** */
)BODY
%  FULLY QUALIFIED DSN OF DATA SET CONTAINING T-CARDS WITH
%  WELL LOCATIONS, INITIAL STATUS, AND FINAL STATUS REPORTS
%  FOR WELLS IN THE AREA OF INTEREST.
%
% DATA SET NAME ===>+_WLDT                                                         +
)END
DSNAME = '#25B.IMGRAPLC.DATA(GRIDPDCL)'                              VOL=SER=TSOV0
DCB=(RECFM=FB,LRECL=80,BLKSIZE=9440)                                 08/24/88  237  14:26:0

/* **************************************************************
/* COMMANDS CREATE A BATCH PROGRAM TO DRAW APPLICON COLOR CONTOUR PLOTS
/* OF CLUSTER AND SPECTRAL IMAGERY DATA AND INTERPOLATE THESE DATA AT
/* WELLSITE LOCATIONS.
/*
/* IMAGERY DATA ARE ON LUN=27 IN FILES AS FOLLOWS:
/*
/* FILE 1      IMAGERY CLUSTER
/* FILE 2      BAND 4        !
/* FILE 3      BAND 5        ! PIXEL AVERAGED
/* FILE 4      BAND 7        ! DATA
/* FILE 5      ALTERATION    !
/*
/* OUTPUT DATA ARE ON LUN=29 IN 6E14.6 FORMAT.
/*
/* FIELD 1     X COORDINATE
/* FIELD 2     Y COORDINATE
/* FIELD 3     CPDF OF MSS BAND 4
/* FIELD 4     CPDF OF MSS BAND 5
/* FIELD 5     CPDF OF MSS BAND 7
/* FIELD 6     CPDF OF MSS BAND ALTERATION
/* FIELD 7     CLUSTER
/*
/* **************************************************************
CONTROL LIST CONLIST MSG END(ENDO)
SET &SRFC=3
SET &JOBTITLE=&STR(APPLICON DISPLAY OF IMAGERY DATA)
ISPEXEC VGET (WLLS SHTP TICK) PROFILE
ISPEXEC CONTROL DISPLAY REFRESH
ISPEXEC VGET (XMIN XMAX NCOL YMIN YMAX NROW GRDOPTN) PROFILE
ISPEXEC DISPLAY PANEL(INPTMAPS)
ISPEXEC VPUT (XMIN XMAX NCOL YMIN YMAX NROW GRDOPTN) PROFILE
SET &SRFC=&SRFC+2
ISPEXEC CONTROL DISPLAY REFRESH
ISPEXEC VGET (XSCL YSCL PSCL PWID DXO DYO) PROFILE
ISPEXEC CONTROL DISPLAY REFRESH
ISPEXEC DISPLAY PANEL(PLOTDEF)
ISPEXEC CONTROL DISPLAY REFRESH
ISPEXEC VPUT (XSCL YSCL PSCL PWID DXO DYO) PROFILE
SET &MA1=&STR(PHILLIPS PETROLEUM COMPANY_____)
SET &MA2=&STR(RESEARCH AND DEVELOPMENT_____)
SET &MA3=&STR(ENERGY RESOURCES DIVISION_____)
SET &MB1=&STR(_____)
SET &MB2=&STR(LANDSAT MSS IMAGERY_____)
SET &MB3=&STR(_____)
```

```
SET &IPOS=5
SET &ISZE=1
SET &TSCL=1
SET &ITUT=2
SET &LOGO=1
ISPEXEC VGET (MB4 MD1 MG1A MG1B MG1C) PROFILE
ISPEXEC VGET (MH1A MH1B MH1C MJ1A MJ1B ML1) PROFILE
ISPEXEC VGET (MM1 MM2 MM3 MM4 MM5 MM6) PROFILE
ISPEXEC CONTROL DISPLAY REFRESH
ISPEXEC DISPLAY PANEL(MAPTITLE)
ISPEXEC CONTROL DISPLAY REFRESH
ISPEXEC DISPLAY PANEL(BLKTITLE)
ISPEXEC CONTROL DISPLAY REFRESH
ISPEXEC VPUT (MB4 MD1 MG1A MG1B MG1C) PROFILE
ISPEXEC VPUT (MH1A MH1B MH1C MJ1A MJ1B ML1) PROFILE
ISPEXEC VPUT (MM1 MM2 MM3 MM4 MM5 MM6) PROFILE
ISPEXEC VGET (PRJCT BSMP CLON,CMRD,CMRM,BPLD,BPLM,BPUD,BPUM) PROFILE
ISPEXEC VGET (ISL,ISP,ITGO,ITL,IUNT,SZTN,SZSC) PROFILE
ISPEXEC VGET (OLND,OLNM,OLTD,OLTM,SCAL) PROFILE
ISPEXEC VGET (XLFD,XLFM,XRTD,XRTM,YLWD,YLWM,YUPD,YUPM) PROFILE
ISPEXEC CONTROL DISPLAY REFRESH
ISPEXEC DISPLAY PANEL(BSMPRMTR)
ISPEXEC CONTROL DISPLAY REFRESH
ISPEXEC VPUT (PRJCT BSMP CLON,CMRD,CMRM,BPLD,BPLM,BPUD,BPUM) PROFILE
ISPEXEC VPUT (ISL,ISP,ITGO,ITL,IUNT,SZTN,SZSC) PROFILE
ISPEXEC VPUT (OLND,OLNM,OLTD,OLTM,SCAL) PROFILE
ISPEXEC VPUT (XLFD,XLFM,XRTD,XRTM,YLWD,YLWM,YUPD,YUPM) PROFILE
ISPEXEC VGET (CONMIN,CONMAX,CONINT,IMASK,ISCAL,ICVAL,CONTOUR) PROFILE
ISPEXEC VGET (NCOLOR,XBOR,YBOR) PROFILE
ISPEXEC VGET (COLOR1,COLOR2,COLOR3,COLOR4,COLOR5,COLOR6) PROFILE
ISPEXEC VGET (COLOR7,COLOR8,COLOR9,COLOR10,COLOR11) PROFILE
ISPEXEC CONTROL DISPLAY REFRESH
ISPEXEC DISPLAY PANEL(COLORS)
ISPEXEC CONTROL DISPLAY REFRESH
ISPEXEC VPUT (CONMIN,CONMAX,CONINT,IMASK,ISCAL,ICVAL,CONTOUR) PROFILE
ISPEXEC VPUT (NCOLOR,XBOR,YBOR) PROFILE
ISPEXEC VPUT (COLOR1,COLOR2,COLOR3,COLOR4,COLOR5,COLOR6) PROFILE
ISPEXEC VPUT (COLOR7,COLOR8,COLOR9,COLOR10,COLOR11) PROFILE
DEL GRIDPDCL
E GRIDPDCL DATA NON EMODE
TOP
IN   $VC JOB=1,INDT=999,NCOL=&NCOL,NROW=&NROW $END
IN   &JOBTITLE
IN   $VC CXIC=1,XMIN=&XMIN,XMAX=&XMAX $END
IN   $VC CYIC=1,YMIN=&YMIN,YMAX=&YMAX $END
IN   $VC CMNT=1 $END
IN   ****************************************************************
IN   READ THE WELL DATA AND GRID WITH ZFIT
IN   ****************************************************************
IN CEND
IN   $VC INPT=1,ZIDC=0,LUN=2,IFMT=2,NZ=9 $END
IN   (7F14.6,T113,4A4)
IN   $VC REWD=1,LUN=2 $END
IN   $VC SAVE=1,ZIDA=0,FILE=1,LUN=33 $END
IN   $VC STAT=1 $END
IN   $VC CMNT=1 $END
IN   ****************************************************************
IN   READ THE IMAGERY GRID USING READ.
IN   ****************************************************************
IN CEND
IN   $VC READ=1,ZIDC=2,LUN=27,FILE=1,MODE=1 $END
IN   $VC READ=1,ZIDC=3,LUN=27,FILE=2,MODE=1 $END
IN   $VC READ=1,ZIDC=4,LUN=27,FILE=3,MODE=1 $END
IN   $VC READ=1,ZIDC=5,LUN=27,FILE=4,MODE=1 $END
IN   $VC READ=1,ZIDC=6,LUN=27,FILE=5,MODE=1 $END
IN   $VC STAT=1 $END
IN   $VC ZOXY=1,ITYP=1,ZIDA=3,ZIDC=1 $END
IN   $VC ZOXY=1,ITYP=1,ZIDA=4,ZIDC=2 $END
IN   $VC ZOXY=1,ITYP=1,ZIDA=5,ZIDC=3 $END
IN   $VC ZOXY=1,ITYP=1,ZIDA=6,ZIDC=4 $END
IN   $VC ZOXY=1,ITYP=1,ZIDA=2,ZIDC=5 $END
IN   $VC PNCH=1,ZIDA=0,IFMT=2,LUN=29 $END
IN   (7E14.5,T112,4A4)
IN   $VC REWD=1,LUN=29,ITYP=2 $END
IN   $VC PDEF=1,PSCL=&PSCL,IAOV=1,
IN      DXO=&DXO,DYO=&DYO,XSCL=&XSCL,YSCL=&YSCL,
IN      PWID=&PWID $END
IN   $VC BRDR=1,JSID=0 $END
IN   $VC CMNT=1 $END
IN   ****************************************************************
IN MAKE PLOTS FOR THE SIGNATURE GRIDS.
IN   ****************************************************************
IN CEND
IN   $VC PPMT=1,IPOS=&IPOS,ISZE=&ISZE,ITLD=0,TSCL=&TSCL,
IN      ITUT=&ITUT,LOGO=&LOGO $END
```

```
IN MA1       &MA1
IN MA2       &MA2
IN MA3       &MA3
IN MB1AREA   &MB1
IN MB2       &MB2
IN MG1REGION &MG1A   STATE &MG1B   COUNTRY &MG1C
IN MH1INTERPRETATION BY &MH1A   DATE &MH1B
IN MJ1PROCJECTION &MJ1A   CENTRAL MERIDIAN &MJ1B
IN ML1SCALE &ML1
IN MM1PROCESSING HISTORY:
IN MM2  1 - &MM2
IN MM3  2 - &MM3
IN MM4  3 - &MM4
IN MM5  4 - &MM5
IN MM6  5 - &MM6
IN MM7  6 - &MM7
IN MM8  7 - &MM8
IN MEND
TOP
F  'PPMT'
C * 20 /_/ /ALL
B
IN   $VC FENC=1,MODE=2,NPC=5,IFMT=2 $END
IN   (F10.0/F10.0)
IN   &XMIN
IN   &YMIN
IN   &XMAX
IN   &YMIN
IN   &XMAX
IN   &YMAX
IN   &XMIN
IN   &YMAX
IN   &XMIN
IN   &YMIN
IF &BSMP=&STR(N) THEN GOTO C0
IN   $VC PPBM=1,CLON='&CLON',CMRD=&CMRD,CMRM=&CMRM,IPRJ=&PRJCT,
IN   BPLD=&BPLD,BPLM=&BPLM,BPUD=&BPUD,BPUM=&BPUM,
IN   ISL=&ISL,ISP=&ISP,ITGO=&ITGO,ITL=&ITL,
IN   IUNT=&IUNT,OLND=&OLND,OLNM=&OLNM,OLTD=&OLTD,OLTM=&OLTM,SCAL=&SCAL,
IN   SZSC=&SZSC,SZTN=&SZTN,
IN   XLFD=&XLFD,XLFM=&XLFM,XRTD=&XRTD,XRTM=&XRTM,
IN   YLWD=&YLWD,YLWM=&YLWM,YUPD=&YUPD,YUPM=&YUPM $END
C0: +
IF &SMPL=&STR( ) THEN GOTO C1
IN   $VC LGPT=1,MODE=2,ISMB=-1,SIZE=0.15,LUN=1,NZ=1,IPRT=0 $END
IN   $CD FILD=0 $END
IN   (2F14.6,T127,I2)
IN   $VC REWD=1,LUN=1,ITYP=1 $END
C1: +
IF &WLLS=&STR(N) THEN GOTO D1
IN   $VC LGPT=1,MODE=2,ISMB=1,SIZE=0.15,LUN=2,NZ=1,IPRT=0 $END
IN   $CD FILD=0 $END
IN   (2F14.6,T127,I2)
IN   $VC REWD=1,LUN=1,ITYP=1 $END
D1   +
IF &SHTP=&STR(N) THEN GOTO D2
IN   $VC LGPT=1,MODE=2,ISMB=-6,SIZE=0.25,LUN=3,NZ=1,IPRT=0 $END
IN   $CD FILD=0 $END
IN   (2F14.6,T127,I2)
IN   $VC REWD=1,LUN=2,ITYP=1 $END
D2: +
IF &TICK=&STR(N) THEN GOTO D3
IN   $VC LGPT=1,MODE=2,ISMB=-1,SIZE=1.00,LUN=4,NZ=1,IPRT=0 $END
IN   $CD FILD=0 $END
IN   (2F14.6,T125,I2)
IN   $VC REWD=1,LUN=4,ITYP=1 $END
D3: +
IF &SMPL=&STR(N) THEN GOTO D4
IN   $VC LGPT=1,MODE=2,ISMB=1,SIZE=0.15,LUN=2,NZ=1,IPRT=0 $END
IN   $CD FILD=0 SEND
IN   (2F14.6,T127,I2)
IN   $VC REWD=1,LUN=4,ITYP=1 $END
D4: +
IN   $VC NWPG=1 $END
IN   $VC SAVE=1,LUN=97,ZIDA=&SRFC $END
IN   $VC PNCH=1,LUN=98,IFMT=-1 $END
IN   $INFO CONMIN=&CONMIN,CONMAX=&CONMAX,CONINT=&CONINT,
IN       IMASK=&IMASK,ICVAL=&ICVAL,ISCALE=&ISCALE,
IN       NCOLOR=&NCOLOR,XBOR=&XBOR,YBOR=&YBOR,NDECS=3,
IN       COLORS=&COLOR1,&COLOR2,&COLOR3,&COLOR4,
IN              &COLOR5,&COLOR6,&COLOR7,&COLOR8,
IN              &COLOR9,&COLOR10,&COLOR11 $END
IN   $VC STOP=1 $END
SAVE
END
```

```
DSNAME = '#25B.IMGRAPLC.DATA(PDCLFILE)'                          VOL=SER=TSOV01
DCB=(RECFM=FB,LRECL=80,BLKSIZE=9440)                             08/24/88 237 14:26:05

/* *****************************************************************
/* COMMANDS CREATE A BATCH PROGRAM TO WRITE THE IMAGERY AND CLUSTER DATA
/* TO A TSO FILE FOR LATER USE BY THE DISCRIMINANT ANLYSIS PROGRAM.
/* IMAGERY DATA SET WILL BE REFERRED TO AS LUN=23, AND WILL BE
/* ORGANIZED AS FOLLOWS:
/*
/*    FILE 1    CLUSTER
/*    FILE 2    BAND 4
/*    FILE 3    BAND 5
/*    FILE 4    BAND 7
/*    FILE 5    ALTERATION
/*
/* OUTPUT FILE WILL BE ON LUN=29, FORMAT 6E10.3, THE FIELDS ARE
/*
/*    FIELD 1   EASTING
/*    FIELD 2   NORTHING
/*    FIELD 3   BAND 4
/*    FIELD 4   BAND 5
/*    FIELD 5   BAND 7
/*    FIELD 6   ALTERATION SIGNATURE
/*    FIELD 7   CLUSTER
/*
/* *****************************************************************
CONTROL LIST CONLIST MSG END(ENDO)
ISPEXEC VGET (JNAM INIT USER LABL YNAM JA MCRB BUGSAS) PROFILE
SET &TIME=4
SET &LINE=&STR(09)
SET &AD=&STR(GSCNC)
SET &RGN=&STR(3500)
SET &HOLD=&STR(N)
ISPEXEC VGET (JNAM INIT USER LABL YNAM JA IMAG SASBASE) PROFILE
ISPEXEC CONTROL DISPLAY REFRESH
ISPEXEC DISPLAY PANEL(SASPLJCL)
ISPEXEC CONTROL DISPLAY REFRESH
ISPEXEC VPUT (JNAM INIT USER LABL YNAM JA IMAG SASBASE) PROFILE
SET &MSGCLS=&STR(A)
IF &HOLD=&STR(N) THEN GOTO J1
SET &MSGCLS=&STR(Y)
J1: +
COPY '#25B.BUGPRGM.TEST(PPJCARD)' APLCFILE.DATA NON
E APLCFILE DATA NON EMODE
 TOP
 C * /A8169/A2020/
 C * /INI/&INIT/
 DOWN 1
 C * /MSGCLASS=/MSGCLASS=&MSGCLS/
 C * /MSGLEVEL=/MSGLEVEL=1/
 C * /NOTIFY=/NOTIFY=#&USER/
 C * /REGION=/REGION=&RGN&STR(K)/
 C * /TIME=/TIME=&TIME/
 DOWN 1
 C * /#TSO/#&USER/
 DOWN
 C * /UACT=/UACT=&JA/
 DOWN 1
 C * /WO=/WO=&LABL/
 DOWN 1
 C * /UORG=/UORG=NRG/
 DOWN 1
 C * /LOS=/LOS=F/
 DOWN 1
 C * /AD=/AD=&AD/
 DOWN 1
 C * /MAN=/MAN=&USER/
 F '//*FORMAT'
 DEL
 SAVE                                                            Z AD
END
ISPEXEC VGET (SGNT) PROFILE
ISPEXEC VGET (PRDC SIES BSMP STATE1 STATE2 STATE3) PROFILE
ISPEXEC VGET (WLLS SHTP TICK) PROFILE
ISPEXEC VGET (SGNTCPSG) PROFILE
ISPEXEC CONTROL DISPLAY REFRESH
ISPEXEC DISPLAY PANEL(APLCDTST)
ISPEXEC CONTROL DISPLAY REFRESH
SET &GDSP=&STR(OLD)
SET &PRMY=&STR( )
SET &SCND=&STR( )
SET &UNIT=&STR( )
ISPEXEC CONTROL DISPLAY REFRESH
ISPEXEC DISPLAY PANEL(IMGRGRID)
ISPEXEC CONTROL DISPLAY REFRESH
```

```
SET &PRMY=&STR(100)
SET &SCND=&STR(20)
SET &UNIT=&STR(TR)
SET &SDSP=(N)
ISPEXEC CONTROL DISPLAY REFRESH
ISPEXEC DISPLAY PANEL(SGNTDTST)
ISPEXEC CONTROL DISPLAY REFRESH
ISPEXEC VPUT (SGNT) PROFILE
ISPEXEC VPUT (PRDC SIES  BSMP) PROFILE
ISPEXEC VPUT (WLLS SHTP TICK) PROFILE
IF &SDSP=&STR(N) THEN GOTO BS0
DEL '&SGNT'
FREE ATTRLIST(KRS)
ATTR KRS RECFM(F B) LRECL(60) BLKSIZE(6000)
ALLOC DA('&SGNT') NEW SP(&PRMY,&SCND) &UNIT USING(KRS)
BS0: +
IF &BSMP=&STR(N) THEN GOTO BS1
ISPEXEC CONTROL DISPLAY REFRESH
ISPEXEC VGET (STATE1 STATE2 STATE3) PROFILE
ISPEXEC DISPLAY PANEL(BSMPTAPE)
ISPEXEC VPUT (STATE1 STATE2 STATE3) PROFILE
ISPEXEC CONTROL DISPLAY REFRESH
BS1: +
E APLCFILE DATA NON EMODE
 B
 IN //GO EXEC P2020,PROG=P6213B
IF &WLLS=&STR(N) THEN GOTO A1
 IN //GO.FT02F001 DD DSN=&&&&PS2,SPACE=(CYL,(2,2)),DISP=(NEW,PASS),
 IN // DCB=(RECFM=VBS,BLKSIZE=19069)
A1: +
IF &SHTP=&STR(N) THEN GOTO A2
 IN //GO.FT03F001 DD DSN=&&&&PS3,SPACE=(CYL,(2,2)),DISP=(NEW,PASS),
 IN // DCB=(RECFM=VBS,BLKSIZE=19069)
A2: +
IF &TICK=&STR(N) THEN GOTO A3
 IN //GO.FT04F001 DD DSN=&&&&PS4,SPACE=(CYL,(2,2)),DISP=(NEW,PASS),
 IN // DCB=(RECFM=VBS,BLKSIZE=19069)
A3: +
IF &WLLS=&STR(N) THEN GOTO A4
 IN //GO.FT30F001 DD DSN=&PRDC,DISP=SHR
A4: +
IF &SHTP=&STR(N) THEN GOTO A5
 IN //GO.FT30F002 DD DSN=&SIES,DISP=SHR
A5: +
 IN //GO.SYSIN DD *
 SAVE
END
SET &PRJCT=&STR(6)
SET &UPPER=&STR(     )
SET &LOWER=&STR(     )
SET &CMRDN=&STR(    )
SET &SPHRD=&STR(2)
SET &ORGLT=&STR(    )
SET &ORGLN=&STR(     )
SET &HEW=&STR(W)
SET &HNS=&STR(O)
SET &UNT=&STR(2)
SET &DDN=&STR(2)
ISPEXEC CONTROL DISPLAY REFRESH
ISPEXEC DISPLAY PANEL(MPPRJCTN)
ISPEXEC CONTROL DISPLAY REFRESH
E APLCFILE DATA NON EMODE
IF &PRDC=&STR(N) THEN GOTO A7
SET &DDN=&STR(2)
 B
 MERGE '#25B.BUGPRGM.TEST(CCARD)'
 B
 C * /#/&PRJCT/
 C * /$$$$/&UPPER/
 C * /$$$$/&LOWER/
 C * /#####/&CMRDN/
 C * /H/&HEW/
 C * /H/&HNS/
 C * /S/&SPHRD/
 C * /$$$$/&ORGLT/
 C * /#####/&ORGLN/
 C * /U/&UNT/
 C * /D/&DDN/
A7: +
IF &SHTP=&STR(N) THEN GOTO A8
SET &DDN=&STR(3)
 B
 MERGE '#25B.BUGPRGM.TEST(CCARD)'
 B
 C * /#/&PRJCT/
```

```
 C * /$$$$/&UPPER/
 C * /$$$$/&LOWER/
 C * /####/&CMRDN/
 C * /H/&HEW/
 C * /H/&HNS/
 C * /S/&SPHRD/
 C * /$$$$/&ORGLT/
 C * /####/&ORGLN/
 C * /U/&UNT/
 C * /D/&DDN/
A8: +
 SAVE
END
IF &TICK=&STR(N) THEN GOTO A10
SET &DDN=&STR(4)
SET &BOTTM=&STR(        )
SET &TOP  =&STR(        )
SET &SPCLT=&STR(000500)
SET &DNS=&STR(N)
SET &RIGHT=&STR(        )
SET &LEFT =&STR(        )
SET &SPCLN=&STR(000500)
SET &DEW=&STR(W)
ISPEXEC CONTROL DISPLAY REFRESH
ISPEXEC DISPLAY PANEL(TICKMARK)
ISPEXEC CONTROL DISPLAY REFRESH
E APLCFILE DATA NON EMODE
 B
 MERGE '#25B.BUGPRGM.TEST(FCARD)'
 TOP
 F '$$$$'
 C * /#/&PRJCT/
 C * /$$$$/&UPPER/
 C * /$$$$/&LOWER/
 C * /####/&CMRDN/
 C * /H/&HEW/
 C * /H/&HNS/
 C * /S/&SPHRD/
 C * /$$$$/&ORGLT/
 C * /####/&ORGLN/
 C * /U/&UNT/
 C * /D/&DDN/
 DOWN 1
 C * /$$$$/&BOTTM/
 C * /H/&DNS/
 C * /$$$$/&TOP/
 C * /H/&DNS/
 C * /$$$$/&SPCLT/
 C * /####/&LEFT/
 C * /H/&DEW/
 C * /####/&RIGHT/
 C * /H/&DEW/
 C * /####/&SPCLN/
 SAVE
END
A10: +
E APLCFILE DATA NON EMODE
 TOP
 IF &LOWER^=&STR(____) THEN GOTO L1
 F 'P2020'
 C * 999 /_/ /ALL
L1: +
 SAVE
END
IF &BSMP=&STR(N) THEN GOTO A23
E APLCFILE DATA NON EMODE
 B
 MERGE '#25B.BUGPRGM.TEST(BSMPJCL)' NON
 B
 UP 2
 C * /STATE1/&STATE1/
 F 'STATE'
 IF &STATE2^=&STR( ) THEN GOTO A20
 DEL * 2
 GOTO A22
A20: +
 C * /STATE2/&STATE2/
 F 'STATE'
 IF &STATE3^=&STR( ) THEN GOTO A21
 DEL *
 GOTO A22
A21: +
 C * /STATE3/&STATE3/
A22: +
 SAVE
END
```

```
A23: +
E APLCFILE DATA NON EMODE
 B
  IN //ST2.FT27F001 DD DSN=&SGNTCPSG,DISP=SHR
  IN //ST2.FT29F001 DD DSN=&SGNT,DISP=OLD
  IN //ST2.SYSIN DD *
  SAVE
END
SET &TEXTA=&STR( )
SET &TEXTB=&STR( )
ISPEXEC CONTROL DISPLAY REFRESH
ISPEXEC DISPLAY PANEL(IDNTFYR)
ISPEXEC CONTROL DISPLAY REFRESH
SET &HR=&SUBSTR(1:2,&SYSTIME)
SET &MN=&SUBSTR(4:5,&SYSTIME)
SET &TM=&HR&MN
SET &HRMN=&HR&MN
SET &LBL=&STR( )
IF &TEXTB=&STR( ) THEN GOTO A25
SET &LBL=&STR(.)&TEXTB
A25. +
IF &TEXTA=&STR( ) THEN GOTO A26
SET &LBL=&STR(.)&TEXTA&LBL
A26: +
SET &TM=&TM&LBL
COPY '#25B.IMGRAPLC.DATA(HYPRAPLC)' HYPRAPLC.DATA NON
E HYPRAPLC DATA NON
 TOP
 F 'AT000INI'
 C * 999 /INI/&INIT/ALL
 TOP
 F 'AT000'
 C * 999 /NOTIFY=/NOTIFY=#&USER/ALL
 C * 999 /REGION=/REGION=100K/ALL
 C * 999 /TIME=/TIME=1/ALL
 TOP
 F 'AT000'
 C * 999 /#TSO/#&USER/ALL
 TOP
 F 'AT000'
 C * 999 /UACT=/UACT=&JA/ALL
 TOP
 F 'AT000'
 C * 999 /WO=/WO=&LABL/ALL
 TOP
 F 'AT000'
 C * 999 /UORG=/UORG=NRG/ALL
 TOP
 F 'AT000'
 C * 999 /LOS=/LOS=5/ALL
 TOP
 F 'AT000'
 C * 999 /AD=/AD=&AD/ALL
 TOP
 F 'AT000'
 C * 999 /MAN=/MAN=&USER/ALL
 TOP
 F 'HRMN'
 C * 999 /HRMN/AP&HRMN/ALL
 TOP
 F 'TMSTMP'
 C * 999 /TMSTMP/TM&TM/ALL
 SAVE
END
ISPEXEC VGET (SOURCE DSNCODE) PROFILE
ISPEXEC DISPLAY PANEL(SRCCPS)
ISPEXEC VPUT (SOURCE DSNCODE) PROFILE
IF &SOURCE=&STR(N) THEN GOTO S1
ISPEXEC SELECT CMD(GRIDCLFL)
COPY G IDCLFL APLCINTR NON
GOTO S2
S1: +
COPY '&DSNCODE' APLCINTR.DATA NON
S2: +
E APLCFILE DATA NON EMODE
 B
 MERGE APLCINTR NON
 B
 MERGE HYPRAPLC NON
 SAVE
END
DEL (APLCINTR HYPRAPLC)
DSNAME = '#25B.IMGRAPLC.DATA(SGNTDTST)'
DCB=(RECFM=FB,LRECL=80,BLKSIZE=9440)
```

Z AD

```
)ATTR
/* ******************************************************************* */
/* PANEL TO SELECT STATISTICAL OR MAPPING PROGRAM                       */
/*                                                                      */
/*    SETS SPACE AND DCB PARAMETERS TO CREATE A TSO DATASET.            */
/*                                                                      */
/* ******************************************************************* */
)BODY
%SPECIFY THE DATA SET NAME AND SPACE PARAMETERS FOR THE DATA
%SET TO HOLD THE IMAGERY DATA FOR DISCRIMINANT ANALYSIS.
% DATA SET WILL BE FORMATED 6E10.3
%
%FULLY QUALIFIED DATA SET NAME =>:+_SGNT                                +
%
%CREATE THE DATASET (Y OR N) =>+_Z+
%
%SPACE-PRIMARY ==================>:+_Z     +
%SECONDARY     ==================>:+_Z     +
%
%STORAGE UNITS ==================>:+_Z     +    %TR=TRACKS, CYL=CYLINDER
)INIT
   .ZVARS='(SDSP PRMY SCND UNIT)'
)END

DSNAME = '#25B.IMGRAPLC.DATA(GRIDCLFL)'                    VOL=SER=TSOV01
DCB=(RECFM=FB,LRECL=80,BLKSIZE=9440)                    08/24/88 237 14:26:05

/* ********************************************************************
/* COMMANDS CREATE A BATCH PROGRAM TO DRAW APPLICON COLOR CONTOUR
/* PLOTS OF SPECTRAL IMAGERY DATA.  THE DATA WERE PREVIOUSLY GRIDDED.
/*
/* DATA ARE ON LUN=27 IN FILES AS FOLLOWS:
/*
/* FILE 1       CLUSTERS
/* FILE 2       BAND 4      !
/* FILE 3       BAND 5      ! PIXEL AVERAGED
/* FILE 4       BAND 7      ! DATA
/* FILE 5       ALTERATION  !
/*
/* DATA ARE ON LUN=29 IN FILES AS FOLLOWS:
/*
/* FIELD X
/* FIELD Y
/* FIELD 3      BAND 4      !
/* FIELD 4      BAND 5      !
/* FIELD 5      BAND 7      ! DATA
/* FIELD 6      ALTERATION  !
/* FIELD 7      CLUSTER     !
/*
/* ********************************************************************
CONTROL LIST CONLIST MSG END(ENDO)
SET &SRFC=3
SET &JOBTITLE=&STR(APPLICON DISPLAY OF IMAGERY DATA)
ISPEXEC VGET (WLLS SHTP TICK) PROFILE
ISPEXEC CONTROL DISPLAY REFRESH
ISPEXEC VGET (XMIN XMAX NCOL YMIN YMAX NROW GRDOPTN) PROFILE
ISPEXEC DISPLAY PANEL(INPTMAPS)
ISPEXEC VPUT (XMIN XMAX NCOL YMIN YMAX NROW GRDOPTN) PROFILE
SET &FILE=&SRFC+1
ISPEXEC CONTROL DISPLAY REFRESH
ISPEXEC VGET (XSCL YSCL PSCL PWID DXO DYO) PROFILE
ISPEXEC CONTROL DISPLAY REFRESH
ISPEXEC DISPLAY PANEL(PLOTDEF)
ISPEXEC CONTROL DISPLAY REFRESH
ISPEXEC VPUT (XSCL YSCL PSCL PWID DXO DYO) PROFILE
SET &MA1=&STR(PHILLIPS PETROLEUM COMPANY____)
SET &MA2=&STR(RESEARCH AND DEVELOPMENT_____)
SET &MA3=&STR(ENERGY RESOURCES DIVISION_____)
SET &MB1=&STR(_____)
SET &MB2=&STR(LANDSAT MSS IMAGERY DISPLAY__)
SET &MB3=&STR(_____)
SET &IPOS=5
SET &ISZE=1
SET &TSCL=1
SET &ITUT=2
SET &LOGO=1
ISPEXEC VGET (MB4 MD1 MG1A MG1B MG1C) PROFILE
ISPEXEC VGET (MH1A MH1B MH1C MJ1A MJ1B ML1) PROFILE
ISPEXEC VGET (MM1 MM2 MM3 MM4 MM5 MM6) PROFILE
ISPEXEC CONTROL DISPLAY REFRESH
ISPEXEC DISPLAY PANEL(MAPTITLE)
ISPEXEC CONTROL DISPLAY REFRESH
ISPEXEC DISPLAY PANEL(BLKTITLE)
ISPEXEC CONTROL DISPLAY REFRESH
ISPEXEC VPUT (MB4 MD1 MG1A MG1B MG1C) PROFILE
```

```
ISPEXEC VPUT (MH1A MH1B MH1C MJ1A MJ1B ML1) PROFILE
ISPEXEC VPUT (MM1 MM2 MM3 MM4 MM5 MM6) PROFILE
ISPEXEC VGET (PRJCT BSMP CLON,CMRD,CMRM,BPLD,BPLM,BPUD,BPUM) PROFILE
ISPEXEC VGET (ISL,ISP,ITGO,ITL,IUNT,SZTN,SZSC) PROFILE
ISPEXEC VGET (OLND,OLNM,OLTD,OLTM,SCAL) PROFILE
ISPEXEC VGET (XLFD,XLFM,XRTD,XRTM,YLWD,YLWM,YUPD,YUPM) PROFILE
ISPEXEC CONTROL DISPLAY REFRESH
ISPEXEC DISPLAY PANEL(BSMPRMTR)
ISPEXEC CONTROL DISPLAY REFRESH
ISPEXEC VPUT (PRJCT BSMP CLON,CMRD,CMRM,BPLD,BPLM,BPUD,BPUM) PROFILE
ISPEXEC VPUT (ISL,ISP,ITGO,ITL,IUNT,SZTN,SZSC) PROFILE
ISPEXEC VPUT (OLND,OLNM,OLTD,OLTM,SCAL) PROFILE
ISPEXEC VPUT (XLFD,XLFM,XRTD,XRTM,YLWD,YLWM,YUPD,YUPM) PROFILE
ISPEXEC VGET (CONMIN,CONMAX,CONINT,IMASK,ISCAL,ICVAL,CONTOUR) PROFILE
ISPEXEC VGET (NCOLOR,XBOR,YBOR) PROFILE
ISPEXEC VGET (COLOR1,COLOR2,COLOR3,COLOR4,COLOR5,COLOR6) PROFILE
ISPEXEC VGET (COLOR7,COLOR8,COLOR9,COLOR10,COLOR11) PROFILE
ISPEXEC CONTROL DISPLAY REFRESH
ISPEXEC DISPLAY PANEL(COLORS)
ISPEXEC CONTROL DISPLAY REFRESH
ISPEXEC VPUT (CONMIN,CONMAX,CONINT,IMASK,ISCAL,ICVAL,CONTOUR) PROFILE
ISPEXEC VPUT (NCOLOR,XBOR,YBOR) PROFILE
ISPEXEC VPUT (COLOR1,COLOR2,COLOR3,COLOR4,COLOR5,COLOR6) PROFILE
ISPEXEC VPUT (COLOR7,COLOR8,COLOR9,COLOR10,COLOR11) PROFILE
DEL GRIDCLFL
E GRIDCLFL DATA NON EMODE
 TOP
IN   $VC JOB=1,INDT=999,NCOL=&NCOL,NROW=&NROW $END
IN   &JOBTITLE
IN   $VC CXIC=1,XMIN=&XMIN,XMAX=&XMAX $END
IN   $VC CYIC=1,YMIN=&YMIN,YMAX=&YMAX $END
IN   $VC CMNT=1 $END
IN   ****************************************************************
IN   READ THE IMAGERY GRID USING READ.
IN   ****************************************************************
IN   CEND
IN   $VC READ=1,ZIDC=1,LUN=27,FILE=2,MODE=1 $END
IN   $VC READ=1,ZIDC=2,LUN=27,FILE=3,MODE=1 $END
IN   $VC READ=1,ZIDC=3,LUN=27,FILE=4,MODE=1 $END
IN   $VC READ=1,ZIDC=4,LUN=27,FILE=5,MODE=1 $END
IN   $VC READ=1,ZIDC=5,LUN=27,FILE=1,MODE=1 $END
IN   $VC GTXY=1,ZIDA=1,LUN=41,IFMT=2,MODE=2 $END
IN   (3E10.3)
IN   $VC REWD=1,LUN=41,ITYP=2 $END
IN   $VC INPT=1,ZIDC=0,LUN=41,IFMT=2,NZ=5 $END
IN  (3E10.3,T1,3E10.3,T1,E10.3)
IN   $VC REWD=1,LUN=41,ITYP=1 $END
IN   $VC ZOXY=1,ITYP=1,ZIDA=1,ZIDC=1 $END
IN   $VC ZOXY=1,ITYP=1,ZIDA=2,ZIDC=2 $END
IN   $VC ZOXY=1,ITYP=1,ZIDA=3,ZIDC=3 $END
IN   $VC ZOXY=1,ITYP=1,ZIDA=4,ZIDC=4 $END
IN   $VC ZOXY=1,ITYP=1,ZIDA=5,ZIDC=5 $END
IN   $VC PNCH=1,ZIDA=0,IFMT=2,LUN=29 $END
IN   (7E10.3)
IN   $VC REWD=1,LUN=29,ITYP=2 $END
IN   $VC STAT=1 $END
IN   $VC PDEF=1,PSCL=&PSCL,IAOV=1,
IN       DXO=&DXO,DYO=&DYO,XSCL=&XSCL,YSCL=&YSCL,
IN       PWID=&PWID $END
IN   $VC BRDR=1,JSID=0 $END
IN   $VC CMNT=1 $END
IN   ****************************************************************
IN   MAKE PLOTS FOR THE SIGNATURE GRIDS.
IN   ****************************************************************
IN   CEND
IN   $VC PPMT=1,IPOS=&IPOS,ISZE=&ISZE,ITLD=&ITLD,&ASCL=&ASCL,
IN       IUNI=&IUNI,LOGO=&LOGO $END
IN MA1      &MA1
IN MA2      &MA2
IN MA3      &MA3
IN MB1AREA &MB1
IN MB2      &MB2
IN MG1REGION &MG1A   STATE &MG1B   COUNTRY &MG1C
IN MH1INTERPRETATION BY &MH1A   DATE &MH1B
IN MJ1PROJECTION &MJ1A   CENTRAL MERIDIAN &MJ1B
IN ML1SCALE &ML1
IN MM1PROCESSING HISTORY:
IN MM2 1 - &MM2
IN MM3 2 - &MM3
IN MM4 3 - &MM4
IN MM5 4 - &MM5
IN MM6 5 - &MM6
IN MM7 6 - &MM7
IN MM8 7 - &MM8
IN MEND
```

```
TOP
F  'PPMT'
C  * 20 /_/ /ALL
B
IN   $VC FENC=1,MODE=2,NPC=5,IFMT=2 $END
IN   (F10.0/F10.0)
IN   &XMIN
IN   &YMIN
IN   &XMAX
IN   &YMIN
IN   &XMAX
IN   &YMAX
IN   &XMIN
IN   &YMAX
IN   &XMIN
IN   &YMIN
IF &BSMP=&STR(N) THEN GOTO C1
IN   $VC PPBM=1,CLON='&CLON',CMRD=&CMRD,CMRM=&CMRM,IPRJ=&PRJCT,
IN       BPLD=&BPLD,BPLM=&BPLM,BPUD=&BPUD,BPUM=&BPUM,
IN       ISL=&ISL,ISP=&ISP,ITGO=&ITGO,ITL=&ITL,
IN       IUNT=&IUNT,OLND=&OLND,OLNM=&OLNM,OLTD=&OLTD,OLTM=&OLTM,SCAL=&SCAL,
IN       SZSC=&SZSC,SZTN=&SZTN,
IN       XLFD=&XLFD,XLFM=&XLFM,XRTD=&XRTD,XRTM=&XRTM,
IN       YLWD=&YLWD,YLWM=&YLWM,YUPD=&YUPD,YUPM=&YUPM $END
C1: +
IF &WLLS=&STR(N) THEN GOTO D1
IN   $VC LGPT=1,MODE=2,ISMB=1,SIZE=0.15,LUN=2,NZ=1,IPRT=0 $END
IN   $CD FILD=0 $END
IN   (2F14.6,T127,I2)
IN   $VC REWD=1,LUN=1,ITYP=1 $END
D1: +
IF &SHTP=&STR(N) THEN GOTO D2
IN   $VC LGPT=1,MODE=2,ISMB=-6,SIZE=0.25,LUN=3,NZ=1,IPRT=0 $END
IN   $CD FILD=0 $END
IN   (2F14.6,T127,I2)
IN   $VC REWD=1,LUN=2,ITYP=1 $END
D2: +
IF &TICK=&STR(N) THEN GOTO D3
IN   $VC LGPT=1,MODE=2,ISMB=-1,SIZE=1.00,LUN=4,NZ=1,IPRT=0 $END
IN   $CD FILD=0 $END
IN   (2F14.6,T125,I2)
IN   $VC REWD=1,LUN=4,ITYP=1 $END
D3: +
IN   $VC NWPG=1 $END
IN   $VC SAVE=1,LUN=97,ZIDA=&SRFC $END
IN   $VC PNCH=1,LUN=98,IFMT=-1 $END
IN   $INFO CONMIN=&CONMIN,CONMAX=&CONMAX,CONINT=&CONINT,
IN         IMASK=&IMASK,ICVAL=&ICVAL,ISCALE=&ISCALE,NDECS=3,
IN         NCOLOR=&NCOLOR,XBOR=&XBOR,YBOR=&YBOR,
IN         COLORS=&COLOR1,&COLOR2,&COLOR3,&COLOR4,
IN                &COLOR5,&COLOR6,&COLOR7,&COLOR8,
IN                &COLOR9,&COLOR10,&COLOR11 $END
IN   $VC STOP=1 $END
SAVE
END
DSNAME = '#25B.IMGRCLST.DATA(PDCLQUAD)'                    VOL=SER=TSOV01
DCB=(RECFM=FB,LRECL=80,BLKSIZE=9440)                       08/24/88 237 14:24:51

/* ****************************************************************
/* COMMANDS COMPUTE THE ALTERATION SIGANTURE BASED BY FITTING THE
/* CPDF'S OF THE IMAGERY DATA TO A SET OF ACTUAL DRILLING RESULTS.
/*
/* THE DATA SETS NEEDED ARE AS FOLLOWS
/*
/*   1. RECORDS GIVING THE WELL LOCATIONS AND DRILLINR RESULTS FOR
/*      WELL IN THE STUDY AREA.  THE FORMAT IS AS FOLLOWS:
/*
/*      COLUMNS      DESCRIPTION
/*       1-14        WELL EASTING (MI)
/*      15-28        WELL NORTHING (MI)
/*      28-42        CPDF 4
/*      43-56        CPDF 5
/*      57-70        CPDF 7
/*      71-84        CPDF ALTERATION
/*      85-98        CPDF 7
/*      125          EMS INITIAL STATUS CODE
/*      126          EMS FINAL STATUS CODE
/*      127-128      CPS FINAL STATUS CODE
/*
/*      THESE DATA WERE PRODUCED BY PROGRAM PRDCFILE.
/*
/* OUTPUT ARE THE FOLLOWING:
/*
/*   1. SIGNATURE COMPUTED BY A DISCRIMINANT FUNCTION TRAINED ON THE
/*      WELL DATA IS OUTPUT TO THE SAS DATA BASE CONTAINING THE
```

```
/*      IMAGERY DATA.  THE SAS DATA SET MEMBER NAME IS PRDCSGNT.
/*
/* ****************************************************************
CONTROL LIST CONLIST MSG END(ENDO)
SET &BDSP=&STR(N)
SET &VRBL4=&STR( )
SET &VRBL5=&STR( )
SET &VRBL7=&STR( )
SET &VRBLH=&STR( )
ISPEXEC VGET (WLLCNTRL SGNTAREA) PROFILE
ISPEXEC CONTROL DISPLAY REFRESH
ISPEXEC DISPLAY PANEL(PRDSCRDT)
ISPEXEC CONTROL DISPLAY REFRESH
ISPEXEC DISPLAY PANEL(DSCRVRBL)
ISPEXEC CONTROL DISPLAY REFRESH
ISPEXEC VPUT (WLLCNTRL SGNTAREA) PROFILE
FREE FI(WLLS) DA('&WLLCNTRL')
ALLOC FI(WLLS) DA('&WLLCNTRL') SHR
FREE FI(IMGR) DA('&SGNTAREA')
ALLOC FI(IMGR) DA('&SGNTAREA') SHR
SET &VRBL=&STR( )
IF &VRBL4^=&STR(Y) THEN GOTO V1
SET &VRBL=&VRBL&STR( CPDF4)
V1: +
IF &VRBL5^=&STR(Y) THEN GOTO V2
SET &VRBL=&VRBL&STR( CPDF5)
V2: +
IF &VRBL7^=&STR(Y) THEN GOTO V3
SET &VRBL=&VRBL&STR( CPDF7)
V3: +
IF &VRBLH^=&STR(Y) THEN GOTO V4
SET &VRBL=&VRBL&STR( CPDFHI)
V4: +
SET &BDSP=&STR(N)
SET &PRMY=&STR( )
SET &SCND=&STR( )
SET &UNIT=&STR( )
ISPEXEC VGET (SASPRDSC) PROFILE
ISPEXEC CONTROL DISPLAY REFRESH
ISPEXEC DISPLAY PANEL(ALCTPRDS)
ISPEXEC CONTROL DISPLAY REFRESH
ISPEXEC VPUT (SASPRDSC) PROFILE
FREE FI(IMAG) DA('&SASPRDSC')
IF &BDSP=&STR(N) THEN GOTO C1
ALLOC FI(IMAG) DA('&SASPRDSC') NEW SP(&PRMY,&SCND) &UNIT
C1: +
ALLOC FI(IMAG) DA('&SASPRDSC') OLD
FREE FI(FT08F001) DA(OUTPUT.TRNG)
FREE FI(FT09F001) DA(OUTPUT.DATA)
FREE ATTRLIST(KRS)
ATTR KRS RECFM(F B) LRECL(132) BLKSIZE(1320)
DEL (DSCRMNTR OUTPUT.DATA OUTPUT.TRNG)
ALLOC FI(FT08F001) DA(OUTPUT.TRNG) NEW SP(250,50) TR USING(KRS)
ALLOC FI(FT09F001) DA(OUTPUT.DATA) NEW SP(250,50) TR USING(KRS)
E DSCRMNTR DATA NON EMODE
 TOP
 IN OPTIONS TLS=80;;
 IN GOPTIONS CTITLE=WHITE,DEVICE=GDDM79,HSIZE=7.5;;
 IN DATA TRNNG;;
 IN   INFILE WLLS MISSOVER;;
 IN   INPUT X E14.6 Y E14.6
 IN         CPDF4 E14.6 CPDF5 E14.6 CPDF7 E14.6 CPDFHI E14.6
 IN         CLUSTER E14.6 ISMB 126-127;;
 IN   CLUSTER=INT(CLUSTER+0.50);;
 IN   IF CPDF4>900 OR CPDF5>900 OR CPDF7>900 THEN DO;;
 IN       DELETE;; RETURN;; END;;
 IN   LABEL=9999900000+_N_;;
 IN   PRDC=0;;
 IN   IF ISMB^=1 AND ISMB^=12 THEN DO;; PRDC=1;; END;;
 IN   IF ISMB=0 THEN DO;; DELETE;; RETURN;; END;;
 IN   OUTPUT;;
 IN CLEAR;; RUN;;
 IN PROC SORT DATA=TRNNG;;
 IN   BY CLUSTER;;
 IN DATA TRNNG;;
 IN   SET TRNNG;;
 IN   LABEL=9999900000+_N_;;
 IN PROC CORR DATA=TRNNG;;
 IN   VAR PRDC CPDF4 CPDF5 CPDF7 CPDFHI;;
 IN   TITLE1 GEOCHEMICAL AND WELL DATA CORRELATIONS;;
 IN   BY CLUSTER;;
 IN CLEAR PAUSE;; RUN;;
 IN PROC CORR DATA=TRNNG;;
 IN   VAR PRDC CPDF4 CPDF5 CPDF7 CPDFHI CLUSTER;;
 IN   TITLE1 GEOCHEMICAL AND WELL DATA CORRELATIONS;;
 IN CLEAR PAUSE;; RUN;;
```

```
IN PROC DISCRIM DATA=TRNNG POOL=TEST;;
IN   BY CLUSTER;;
IN   CLASS PRDC;;
IN   VAR &VRBL;;
IN CLEAR PAUSE;; RUN;;
IN PROC PRINTTO UNIT=08;;
IN PROC DISCRIM DATA=TRNNG POOL=TEST LIST;;
IN   BY CLUSTER;;
IN   CLASS PRDC;;
IN   VAR &VRBL;;
IN   ID LABEL;;
IN PROC PRINTTO UNIT=12;;
IN DATA ALTRTN;;
IN   INFILE FT08F001;;
IN   INPUT TEST :$5. @@;;
IN   IF TEST='99999' THEN DO;; DELETE;; INPUT;; RETURN;; END;;
IN   INPUT @ 1 LABEL :10. PROB 90-99 4;;
IN PROC SORT DATA=TRNNG;;
IN   BY LABEL;;
IN PROC SORT DATA=ALTRTN;;
IN   BY LABEL;;
IN DATA TRNNG;;
IN   MERGE TRNNG ALTRTN;;
IN   BY LABEL;;
IN PROC SORT DATA=TRNNG;;
IN   BY CLUSTER PROB;;
IN PROC FREQ DATA=TRNNG;;
IN   TABLES PROB/NOPRINT OUT=FREQ;;
IN   BY CLUSTER;;
IN PROC SORT DATA=FREQ;;
IN   BY CLUSTER PROB;;
IN DATA FREQ;;
IN   SET FREQ;;
IN   BY CLUSTER;;
IN   IF FIRST.CLUSTER THEN SGNT=0.0;;
IN   PDF=PERCENT/100;;
IN   SGNT+PDF;;
IN   DROP COUNT PERCENT PDF;;
IN PROC SORT DATA=FREQ;;
IN   BY CLUSTER PROB;;
IN DATA TRNNG;;
IN   MERGE TRNNG FREQ;;
IN   BY CLUSTER PROB;;
IN DATA TRNNG;;
IN   SET TRNNG;;
IN   PROB=SGNT;;
IN   DROP SGNT;;
IN DATA TRNNG;;
IN   SET TRNNG;;
IN   IF CPDF4>900.0 OR
IN      CPDF5>900.0 OR
IN      CPDF7>900.0 OR
IN      CPDFHI>900.0 THEN PROB=.;;
IN      INDX=INT(10*PROB);;
IN    · PRED=0;;
IN      IF INDX >= 5 THEN PRED=1;;
IN      IF INDX >= 5 THEN PRED=1;;
IN      IF PRED=0 AND PRDC=0 THEN OTCM=0;;
IN      IF PRED=1 AND PRDC=0 THEN OTCM=1;;
IN      IF PRED=0 AND PRDC=1 THEN OTCM=2;;
IN      IF PRED=1 AND PRDC=1 THEN OTCM=3;;
IN PROC SORT DATA=TRNNG;;
IN   BY CLUSTER;;
IN PROC CORR DATA=TRNNG;;
IN   VAR PRDC PRED PROB;;
IN   BY CLUSTER;;
IN CLEAR PAUSE;; RUN;;
IN PROC CORR DATA=TRNNG;;
IN   VAR PRDC PRED PROB;;
IN CLEAR PAUSE;; RUN;;
IN PROC FREQ DATA=TRNNG;;
IN   TABLES PRDC*PRED/CHISQ;;
IN   BY CLUSTER;;
IN PROC FREQ DATA=TRNNG;;
IN   TABLES PRDC*PRED/CHISQ;;
IN CLEAR PAUSE;; RUN;;
IN DATA IMGRY;;
IN   INFILE IMGR;;
IN   INPUT X E10.3 Y E10.3 CPDF4 E10.3 CPDF5 E10.3 CPDF7 E10.3
IN         CPDFHI E10.3 CLUSTER E10.3;;
IN   CLUSTER=INT(CLUSTER+0.50);;
IN   IF CPDF4>100.0 OR CPDF5>100.0 OR CPDF7>100.0 THEN DO;;
IN     CLUSTER=1;;
IN   END;;
IN PROC SORT DATA=IMGRY;;
```

```
IN    BY CLUSTER;;
IN DATA IMGRY;;
IN    SET IMGRY;;
IN    LABEL=8888800000+_N_;;
IN DATA CLSFY;;
IN    SET TRNNG IMGRY;;
IN PROC SORT DATA=CLSFY;;
IN    BY CLUSTER;;
IN PROC PRINTTO UNIT=09;;
IN PROC DISCRIM DATA=CLSFY POOL=TEST LIST;;
IN    CLASS PRDC;;
IN    BY CLUSTER;;
IN    ID LABEL;;
IN    VAR &VRBL;;
IN CLEAR;; RUN;;
IN PROC PRINTTO UNIT=12;;
IN DATA ALTRTN;;
IN    INFILE FT09F001;;
IN    INPUT TEST :$5. @@;;
IN    IF TEST^='88888' THEN DO;; DELETE;; INPUT;; RETURN;; END;;
IN    INPUT @ 1 LABEL :10. PROB 90-99 4;;
IN PROC SORT DATA=ALTRTN;;
IN    BY LABEL;;
IN PROC SORT DATA=IMGRY;;
IN    BY LABEL;;
IN DATA IMGRY;;
IN    MERGE IMGRY ALTRTN;;
IN    BY LABEL;;
IN    IF CPDF4>900.0 OR
IN       CPDF5>900.0 OR
IN       CPDF7>900.0 THEN PROB=.;;
IN PROC SORT DATA=IMGRY;;
IN    BY CLUSTER PROB;;
IN PROC FREQ DATA=IMGRY;;
IN    TABLES PROB/NOPRINT OUT=FREQ;;
IN    BY CLUSTER;;
IN PROC SORT DATA=FREQ;;
IN    BY CLUSTER PROB;;
IN DATA FREQ;;
IN    SET FREQ;;
IN    BY CLUSTER;;
IN    IF FIRST.CLUSTER THEN SGNT=0.0;;
IN    PDF=PERCENT/100;;
IN    SGNT+PDF;;
IN    DROP COUNT PERCENT PDF;;
IN PROC SORT DATA=FREQ;;
IN    BY CLUSTER PROB;;
IN DATA IMGRY;;
IN    MERGE IMGRY FREQ;;
IN    BY CLUSTER PROB;;
IN DATA IMGRY;;
IN    SET IMGRY;;
IN    PROB=SGNT;;
IN    DROP SGNT;;
IN GOPTIONS CTITLE=WHITE,DEVICE=GDDM79,HSIZE=7.5;;
IN PROC GPLOT DATA=TRNNG;;
IN    PLOT Y*X=OTCM/
IN         CAXIS=WHITE CTEXT=WHITE;;
IN    LABEL X=EASTING;;
IN    LABEL Y=NORTHING;;
IN    SYMBOL1 C=CYAN   V=PLUS;;
IN    SYMBOL2 C=GREEN  V=PLUS;;
IN    SYMBOL3 C=PINK   V=PLUS;;
IN    SYMBOL4 C=YELLOW V=PLUS;;
IN    TITLE1 MAP OF DRILLING OUTCOMES AND PREDICTIONS;;
IN    TITLE2 .C=CYAN +  DRILLING(DRY)        PREDICTION(DRY)         +;;
IN    TITLE3 .C=GREEN + DRILLING(DRY)        PREDICTION(PRODUCER)    +;;
IN    TITLE4 .C=PINK +  DRILLING(PRODUCER)   PREDICTION(DRY)         +;;
IN    TITLE5 .C=YELLOW+ DRILLING(PRODUCER)   PREDICTION(PRODUCER)    +;;
IN PROC GPLOT DATA=TRNNG;;
IN    PLOT CPDF5*CPDF4=PRED/NOLEGEND
IN         CAXIS=WHITE CTEXT=WHITE;;
IN    LABEL PROB=POSTERIOR PROBABILITY;;
IN    SYMBOL1 C=GREEN  V=PLUS;;
IN    SYMBOL2 C=YELLOW V=PLUS;;
IN    TITLE1 PDF CROSSPLOT OF IMAGERY DATA IN TRAINING SET;;
IN    TITLE2 LANDSAT BAND4 4 AND 5;;
IN    TITLE3 POSTERIOR PROBABILITY < 0.5 .C=GREEN +;;
IN    TITLE4 POSTERIOR PROBABILITY > 0.5 .C=YELLOW +;;
IN PROC GPLOT DATA=TRNNG;;
IN    PLOT CPDF7*CPDF4=PRED/NOLEGEND
IN         CAXIS=WHITE CTEXT=WHITE;;
IN    LABEL PROB=POSTERIOR PROBABILITY;;
IN    SYMBOL1 C=GREEN  V=PLUS;;
IN    SYMBOL2 C=YELLOW V=PLUS;;
```

```
IN   TITLE1 PDF CROSSPLOT OF IMAGERY DATA IN TRAINING SET;;
IN   TITLE2 LANDSAT BANDS 4 AND 7;;
IN   TITLE3 POSTERIOR PROBABILITY < 0.5 .C=GREEN +;;
IN   TITLE4 POSTERIOR PROBABILITY > 0.5 .C=YELLOW +;;
IN PROC GPLOT DATA=TRNNG;;
IN   PLOT CPDF7*CPDF5=PRED/NOLEGEND
IN        CAXIS=WHITE CTEXT=WHITE;;
IN   LABEL PROB=POSTERIOR PROBABILITY;;
IN   SYMBOL1 C=GREEN  V=PLUS;;
IN   SYMBOL2 C=YELLOW V=PLUS;;
IN   TITLE1 PDF CROSSPLOT OF IMAGERY DATA IN TRAINING SET;;
IN   TITLE2 LANDSAT BANDS 5 AND 7;;
IN   TITLE3 POSTERIOR PROBABILITY < 0.5 .C=GREEN +;;
IN   TITLE4 POSTERIOR PROBABILITY > 0.5 .C=YELLOW +;;
IN PROC GCHART DATA=TRNNG;;
IN   VBAR PROB/TYPE=PCT MIDPOINTS=0.0125 TO 0.9875 BY 0.025
IN        SUBGROUP=PRDC
IN        CAXIS=WHITE CTEXT=WHITE;;
IN   LABEL PROB=POSTERIOR PROBABILITY;;
IN   PATTERN1 C=BLUE  V=X1;;
IN   PATTERN2 C=RED   V=X1;;
IN   TITLE1 PDF OF DISCRIMINANT POSTERIOR PROBABILITY-TRAINING SET;;
IN   TITLE2 NOTE PROBABILITY CUTOFF CORRESPONDING;;
IN   TITLE3 DIVISION OF GEOCHEM DATA INTO NORMAL;;
IN   TITLE4 AND ANOMALOUS SAMPLES;;
IN PROC GCHART DATA=TRNNG;;
IN   VBAR PROB/TYPE=CPCT MIDPOINTS=0.0125 TO 0.9875 BY 0.025
IN        SUBGROUP=PRDC
IN        CAXIS=WHITE CTEXT=WHITE;;
IN   LABEL PROB=POSTERIOR PROBABILITY;;
IN   PATTERN1 C=BLUE  V=X1;;
IN   PATTERN2 C=RED   V=X1;;
IN   TITLE1 CPDF OF DISCRIMINANT POSTERIOR PROBABILITY-TRAINING SET;;
IN   TITLE2 NOTE PROBABILITY CUTOFF CORRESPONDING;;
IN   TITLE3 DIVISION OF GEOCHEM DATA INTO NORMAL;;
IN   TITLE4 AND ANOMALOUS SAMPLES;;
IN PROC GCHART DATA=IMGRY;;
IN   VBAR PROB/TYPE=PCT
IN        MIDPOINTS=0.0125 TO 0.9875 BY 0.025
IN        CAXIS=WHITE CTEXT=WHITE;;
IN   LABEL PROB=POSTERIOR PROBABILITY;;
IN   PATTERN1 C=YELLOW  V=X1;;
IN   TITLE1 PDF OF DISCRIMINANT POSTERIOR PROBABILITY;;
IN   TITLE2 NOTE PROBABILITY CUTOFF CORRESPONDING;;
IN   TITLE3 DIVISION OF DRILLING RESULTS INTO;;
IN   TITLE4 AND ANOMALOUS SAMPLES NORMAL;;
IN PROC GCHART DATA=IMGRY;;
IN   VBAR PROB/TYPE=CPCT
IN        MIDPOINTS=0.0125 TO 0.9875 BY 0.025
IN        CAXIS=WHITE CTEXT=WHITE;;
IN   LABEL PROB=POSTERIOR PROBABILITY;;
IN   PATTERN1 C=YELLOW  V=X1;;
IN   TITLE1 CPDF OF DISCRIMINANT POSTERIOR PROBABILITY;;
IN   TITLE2 NOTE PROBABILITY CUTOFF CORRESPONDING;;
IN   TITLE3 DIVISION OF DRILLING RESULTS INTO;;
IN   TITLE4 AND ANOMALOUS SAMPLES NORMAL;;
IN PROC UNIVARIATE DATA=IMGRY;;
IN   VAR PROB;;
 SAVE
END
ALLOC FI(DSCR) DA(DSCRMNTR.DATA) SHR
SAS OPTIONS(SYSIN=DSCR) WORK('30 5') LOG(*)
SET &NEXT=&STR(Y)
ISPEXEC CONTROL DISPLAY REFRESH
ISPEXEC DISPLAY PANEL(ALTRNEXT)
ISPEXEC CONTROL DISPLAY REFRESH
IF &NEXT=&STR(N) THEN GOTO E1
DEL OUTPUT
E DSCRMNTR DATA NON EMODE
 TOP
 DEL * 99999
 IN PROC SORT DATA=IMGRY;;
 IN   BY X DESCENDING Y;;
 IN PROC DELETE DATA=IMAG.PRDCLSTR;;
 IN DATA IMAG.PRDCLSTR (KEEP=X Y CPDF4 CPDF5 CPDF7
 IN                            CPDFHI PROB CLUSTER);;
 IN   SET IMGRY;;
 SAVE
END
SAS GO OPTIONS(SYSIN=DSCR)
E1: +
END
DSNAME = '#25B.IMGRCLST.DATA(PRDSCRDT)'                        VOL=SER=TSOV01
DCB=(RECFM=FB,LRECL=80,BLKSIZE=9440)                           08/24/88 237 14:24:51
```

```
)ATTR
/* ****************************************************************/
/* PANEL TO SPECIFY THE WELLSITE CONTROL DATA SETS TO USE TO
/* TRAIN AN IMAGERY DISCRIMINANT TO RECOGNIZE SURFACE ALTERATION,
/* AND THE IMAGERY DATA TO BE CLASSIFIED.
/*
/* THE DATA SETS ARE ORGANIZED AS FOLLOWS.
/*
/* TRAINING SET- FORMAT 6E14.6,T125,2A1,I2
/*
/*                  X         EASTING (MI)
/*                  Y         NORTHING (MI)
/* PROBABLE         CPDF4     CPDF OF GEOCHEMICAL INDICATIOR
/* SOURCE IS        CPDF5     VALUES OF GEOCHEMICAL INDICATIOR
/* PROGRAM          CPDF7     CPDF OF LANDSAT BAND 4
/* PRDCIMGR         CPDFHI    ALTERATION SIGNATURE
/*                  INL       INITIAL STATUS (EMS CODE)
/*                  FNL       FINAL STATUS (EMS CODE)
/*                  FNLST     FINAL STATUS (CPS CODE)
/*
/* ****************************************************************/
)BODY
% SPECIFY WELLDATA IMAGERY DATA SET TO BE USED
% FOR DISCRIMINANT TRAINING AND APPLICATION
%
%      CONTENTS              DATA SET NAME AND FORMAT
%
% LOCATIONS AND VALUES =====>:+_WLLCNTRL                              +
%                             !
% WELL DATA AND IMAGERY     ! FORMAT 6E14.6,T125,A1,I1,I2 PROBABLE
% CONTROL POINTS            ! SOURCE WAS SGNTGCHM. RECORDS CONTAIN
%                           ! X, Y, CPDF-IMAGERY, EMS AND CPS STATUS
%
% LOCATIONS AND VALUES =====>:+_SGNTAREA                              +
%                             !
% IMAGERY DATA TO BE        ! FORMAT 8E10.3, PROBABLE SOURCE
% CLASSIFIED                ! WAS SGNTSTAT. RECORDS CONTAIN
%                           ! X, Y, CPDF-4, CPDF-5, CPDF-7, CPDF-SGNTR
)END
DSNAME = '#25B.IMGRCLST.DATA(DSCRVRBL)'                      VOL=SER=TSOV01
DCB=(RECFM=FB,LRECL=80,BLKSIZE=9440)                         08/24/88 237 14:24:51
)ATTR
/* ****************************************************************/
/* PANEL TO SPECIFY THE IMAGERY VARIABLES TO
/* USE IN THE IMAGERY DISCRIMINANT ANALYSIS.
/* ****************************************************************/
)BODY
% IMAGERY VARIABLES TO USE IN THE DISCRIMINANT
% ANALYSIS TO BE BASED ON CONTROL DATA
%
% INDICATE YES OR NO (Y OR N) BESIDE
% EACH VARIABLE TO BE USED.
%
% CPDF MSS BAND 4 =====>:+_Z+
% CPDF MSS BAND 5 =====>:+_Z+
% CPDF MSS BAND 7 =====>:+_Z+
% ALTERATION INDEX ====>:+_Z+
)INIT
  .ZVARS='(VRBL4 VRBL5 VRBL7 VRBLH)'
)END
DSNAME = '#25B.IMGRCLST.DATA(ALCTPRDS)'                      VOL=SER=TSOV01
DCB=(RECFM=FB,LRECL=80,BLKSIZE=9440)                         08/24/88 237 14:24:51
)ATTR
/* ****************************************************************/
/* SPECIFIES DATA SPACE AND UNIT PARAMETERS FOR THE SAS DATA BASE
/* TO CONTAIN THE DISRIMINANT ANLAYSIS CALCULATED VALUES
/* FOR THE ALTERATION SIGNATURE BASED ON WELL DATA
/*
/*    PRMY     PRIMARY ALLOCATION
/*    SCND     SECONDARY ALLOCATION
/*    UNIT     STORAGE UNITS
/* ****************************************************************/
)BODY
% SPECIFIES DATA NAME, SPACE, AND UNIT PARAMETERS FOR THE SAS
% DATA BASE TO CONTAIN THE WELLSITE DATA TRAINED DISCRIMINANT
% ANALYSIS VALUES FOR THE ALTERATION SIGNATURE
%
%     FULLY QUALIFIED NAME OF SAS DATA BASE
%     ===>:+_SASPRDSC                                        +
%
%     SHOULD THE DATA SET BE CREATED =>:+_Z+
%
```

```
%    PRIMARY ALLOCATION ===>:+_PRMY+
%    SECONDARY ALLOCATION =>:+_SCND+
%                                      !TR FOR TRACKS
%    STORAGE UNITS ========>:+_UNIT   +%!CY FOR CYLINDERS
%                                      !NUMERIC FOR BYTES
%
)INIT
   .ZVARS='( .SP)'
)END

DSNAME = '#25B.IMGRCLST.DATA(ALTRNEXT)'                    VOL=SER=TSOV01
DCB=(RECFM=FB,LRECL=80,BLKSIZE=9440)                       08/24/88 237 14:24:51

)ATTR
/* ** *************************************************************/
/* PANEL TO ALLOW DISCRIMINANT SIGNATURE TO BE PLACED IN SAS DATA BASE
/* *****************************************************************/
)BODY
% IF THE OBSERVATIONS IN THE IMAGERY DATA SET AND THE
% DATA SET CREATED DURING THE DISCRIMINANT ANALYSIS
% BALANCE, THEN OK PLACEMENT OF THE DISCRIMINANT
% SIGNATURE IN THE IMAGERY SAS DATA BASE
%
% DATA SET TO CONTAIN PRODUCTION CLASSIFIED IMAGERY
%       ========>: &SASPRDSC
% DATA SET TO CONTAIN GEOCHEMICALLY CLASSIFIED IMAGERY
%       ========>: &SASALTRN
%
%      OK TO PUT IN DATA BASE (Y OR N)=>:+_Z+
)INIT
 .ZVARS='(NEXT)'
)END

DSNAME = '#25B.IMGRCLST.DATA(PDCLSGNF)'                    VOL=SER=TSOV01
DCB=(RECFM=FB,LRECL=80,BLKSIZE=9440)                       08/24/88 237 14:24:51

/* ******************************************************************
/* COMMANDS COMPUTE THE ALTERATION SIGANTURE BASED BY FITTING THE
/* CPDF'S OF THE IMAGERY DATA TO A SET OF DRILLING RESULTS.
/*
/* THE DATA ARE SCRAMBLED TO TEST THE SIGNIFCIANCE OF THE DISCRIMINANAT
/*
/* THE DATA SETS NEEDED ARE AS FOLLOWS
/*
/*  1  MAP COORDINATES AND DRILLING RESULTS.
/*
/*     X, Y, CPDF BAND 4, CPDF BAND 5, CPDF BAND 7, CPDF ALTERATION,
/*     INITIAL STATUS (EMS), FINAL STATUS (EMS),
/*     FINAL STATUS (CPS).
/*
/*  2. IMAGERY DATA.  FILE ASSUMED TO BE IN THE FORM
/*
/*     X, Y, CPDF BAND 4, CPDF BAND 5, CPDF BAND 7, CPDF ALTERATION
/*
/* OUTPUT ARE THE FOLLOWING:
/*
/*  1. SET OF DISCRIMINANT RESULTS FOR RANDOMIZED GEOCHEMICAL ANOMALIES.
/*
/* ******************************************************************
CONTROL LIST CONLIST MSG END(ENDO)
SET &BDSP=&STR(N)
SET &VRBL4=&STR( )
SET &VRBL5=&STR( )
SET &VRBL7=&STR( )
ISPEXEC VGET (WLLCNTRL SGNTAREA) PROFILE
ISPEXEC VGET (PRBLTY) PROFILE
ISPEXEC CONTROL DISPLAY REFRESH
ISPEXEC DISPLAY PANEL(PRDSCRDT)
ISPEXEC CONTROL DISPLAY REFRESH
ISPEXEC DISPLAY PANEL(DSCRVRBL)
ISPEXEC CONTROL DISPLAY REFRESH
ISPEXEC DISPLAY PANEL(CTFFPRBL)
ISPEXEC CONTROL DISPLAY REFRESH
ISPEXEC VPUT (PRBLTY) PROFILE
ISPEXEC VPUT (WLLCNTRL SGNTAREA) PROFILE
SET &VRBL=&STR( )
IF &VRBL4^=&STR(Y) THEN GOTO V1
SET &VRBL=&VRBL&STR( CPDF4)
V1: +
IF &VRBL5^=&STR(Y) THEN GOTO V2
SET &VRBL=&VRBL&STR( CPDF5)
V2: +
IF &VRBL7^=&STR(Y) THEN GOTO V3
SET &VRBL=&VRBL&STR( CPDF7)
V3: +
FREE FI(WLDT) DA('&WLLCNTRL')
```

```
FREE FI(IMGR) DA('&SGNTAREA')
FREE FI(FT09F001) DA(OUTPUT.DATA)
FREE ATTRLIST(KRS)
ALLOC FI(WLDT) DA('&WLLCNTRL') SHR
ALLOC FI(IMGR) DA('&SGNTAREA') SHR
SET &CNTR=&STR(0)
FREE ATTRLIST(KRS)
ATTR KRS RECFM(F B) LRECL(132) BLKSIZE(1320)
DEL OUTPUT.DATA
ALLOC FI(FT09F001) DA(OUTPUT.DATA) NEW SP(100,25) TR USING(KRS)
DEL DSCRMNTR
E DSCRMNTR DATA NON EMODE
 TOP
 IN DATA TRNNG;;
 IN  INFILE WLDT;;
 IN  INPUT X E14.6 Y E14.6
 IN       CPDF4 E14.6 CPDF5 E14.6 CPDF7 E14.6 CPDFHI E14.6
 IN       CLUSTER E14.6
 I        ISMB 126-127;;
 IN  CLUSTER=INT(CLUSTER+0.5);;
 IN  IF CPDF4>900 OR CPDF5>900 OR CPDF7>900 THEN DO;;
 IN    DELETE;; RETURN;; END;;
 IN  PRDC=0;;
 IN  IF ISMB^=1 AND ISMB^=12 THEN DO;; PRDC=1;; END;;
 IN  IF ISMB=0 THEN DO;; DELETE;; RETURN;; END;;
 IN  RUN=0;;
 IN  OUTPUT;;
S0: +
IF &CNTR=51 THEN GOTO S1
SET &CNTR=&CNTR+1
 IN  PRDC=INT(RANUNI(0)+1.0-&PRBLTY);;
 IN  RUN=&CNTR;;
 IN  OUTPUT;;
GOTO S0
S1: +
 IN PROC SORT DATA=TRNNG;;
 IN  BY RUN CLUSTER;;
 IN PROC PRINTTO UNIT=09;;
 IN PROC DISCRIM DATA=TRNNG POOL=TEST OUT=DSCRMNT;;
 IN  CLASS PRDC;;
 IN  BY RUN CLUSTER;;
 IN  VAR &VRBL;;
 IN CLEAR PAUSE;; RUN;;
 IN PROC PRINTTO UNIT=12;;
 SAVE
END
FREE FI(DSCR) DA(DSCRMNTR.DATA)
ALLOC FI(DSCR) DA(DSCRMNTR.DATA) SHR
SAS OPTIONS(SYSIN=DSCR) WORK('50 15')
DEL CLSSFCTN.DATA
DEL STRING.DATA
E STRING DATA NON EMODE
 TOP
 IN /1    TOTAL/ 8
 SAVE
END
TOUT OUTPUT.DATA CLSSFCTN.DATA STRING.DATA
DEL STRING
COPY '#25B.BUGPRGM.TEST(PPJCARD)' APLCDSCR.DATA NON
E APLCDSCR DATA NON EMODE
 TOP
 C * /A8169/A2020/
 C * /INI/&INIT/
 DOWN 1
 C * /MSGCLASS=/MSGCLASS=&MSGCLS/
 C * /MSGLEVEL=/MSGLEVEL=1/
 C * /NOTIFY=/NOTIFY=#&USER/
 C * /REGION=/REGION=&RGN&STR(K)/
 C * /TIME=/TIME=&TIME/
 DOWN 1
 C * /#TSO/#&USER/
 DOWN 1
 C * /UACT=/UACT=&JA/
 DOWN 1
 C * /WO=/WO=&LABL/
 DOWN 1
 C * /UORG=/UORG=NRG/
 DOWN 1
 C * /LOS=/LOS=F/
 DOWN 1
 C * /AD=/AD=&AD/
 DOWN 1
 C * /MAN=/MAN=&USER/
 F '//*FORMAT'
 DEL
```

```
 SAVE
END
ISPEXEC VGET (PRDCSGNT PRDC SIES  BSMP STATE1 STATE2 STATE3) PROFILE
ISPEXEC VGET (SASF WLLS SHTP TICK) PROFILE
ISPEXEC CONTROL DISPLAY REFRESH
ISPEXEC DISPLAY PANEL(PRDCSGNT)
ISPEXEC CONTROL DISPLAY REFRESH
SET &SASFILE=&STR(PRDCDSCR)
IF &SASF=2 THEN SET &SASFILE=&STR(PRDCLVL2)
IF &SASF=3 THEN SET &SASFILE=&STR(PRDCLSTR)
ISPEXEC VPUT (PRDCSGNT PRDC SIES  BSMP) PROFILE
ISPEXEC VPUT (SASF WLLS SHTP TICK) PROFILE
IF &BSMP=&STR(N) THEN GOTO BS1
ISPEXEC CONTROL DISPLAY REFRESH
ISPEXEC VGET (STATE1 STATE2 STATE3) PROFILE
ISPEXEC DISPLAY PANEL(BSMPTAPE)
ISPEXEC VPUT (STATE1 STATE2 STATE3) PROFILE
ISPEXEC CONTROL DISPLAY REFRESH
BS1: +
E APLCDSCR DATA NON EMODE
 B
 IN &STR(//SA EXEC SAS,REGION=3500K)
 IN &STR(//WORK DD UNIT=SYSDA,SPACE=(TRK,(4000,200)),DISP=(NEW,DELETE)
 IN &STR(//ALTR DD DSN=&PRDCSGNT,DISP=SHR)
 IN &STR(//DSCR DD DSN=&&&&GRID,UNIT=SYSDA,DISP=(NEW,PASS),)
 IN &STR(//    SPACE=(TRK,(4000,200)))
 IN &STR(//SYSIN DD *)
 IN OPTIONS PAGESIZE=56,LS=110;;
 IN DATA ALTRTN;;
 IN   SET ALTR.&SASFILE;;
 IN   FILE DSCR;;
 IN   IF CPDF4>900 THEN PROB=1000;;
 IN   PUT PROB 1-10 3;;
 IN //GO EXEC P2020,PROG=P6213B
 IN //GO.FT06F001 DD SYSOUT=A
IF &WLLS=&STR(N) THEN GOTO A1
 IN //GO.FT02F001 DD DSN=&&&&PS2,SPACE=(CYL,(2,2)),DISP=(NEW,PASS),
 IN // DCB=(RECFM=VBS,BLKSIZE=19069)
A1: +
IF &SHTP=&STR(N) THEN GOTO A2
 IN //GO.FT03F001 DD DSN=&&&&PS3,SPACE=(CYL,(2,2)),DISP=(NEW,PASS),
 IN // DCB=(RECFM=VBS,BLKSIZE=19069)
A2: +
IF &TICK=&STR(N) THEN GOTO A3
 IN //GO.FT04F001 DD DSN=&&&&PS4,SPACE=(CYL,(2,2)),DISP=(NEW,PASS)
 IN // DCB=(RECFM=VBS,BLKSIZE=19069)
A3: +
IF &WLLS=&STR(N) THEN GOTO A4
 IN //GO.FT30F001 DD DSN=&PRDC,DISP=SHR
A4: +
IF &SHTP=&STR(N) THEN GOTO A5
 IN //GO.FT30F002 DD DSN=&SIES,DISP=SHR
A5: +
 IN //GO.SYSIN DD *
 SAVE
END
SET &PRJCT=&STR(6)
SET &UPPER=&STR(____)
SET &LOWER=&STR(____)
SET &CMRDN=&STR(    )
SET &SPHRD=&STR(2)
SET &ORGLT=&STR(____)
SET &ORGLN=&STR(____)
SET &HEW=&STR(W)
SET &HNS=&STR(0)
SET &UNT=&STR(2)
SET &DDN=&STR(1)
ISPEXEC CONTROL DISPLAY REFRESH
ISPEXEC DISPLAY PANEL(MPPRJCTN)
ISPEXEC CONTROL DISPLAY REFRESH
E APLCDSCR DATA NON EMODE
 B
IF &WLLS=&STR(N) THEN GOTO A8
SET &DDN=&STR(2)
 B
 MERGE '#25B.BUGPRGM.TEST(CCARD)'
  B
  C * /#/&PRJCT/
  C * /$$$$/&UPPER/
  C * /$$$$/&LOWER/
  C * /#####/&CMRDN/
  C * /H/&HEW/
  C * /H/&HNS/
  C * /S/&SPHRD/
  C * /$$$$/&ORGLT/
```

```
C * /#####/&ORGLN/
C * /U/&UNT/
C * /D/&DDN/
A8: +
IF &SHTP=&STR(N) THEN GOTO A9
SET &DDN=&STR(2)
 B
 MERGE '#25B.BUGPRGM.TEST(CCARD)'
 B
 C * /#/&PRJCT/
 C * /$$$$/&UPPER/
 C * /$$$$/&LOWER/
 C * /#####/&CMRDN/
 C * /H/&HEW/
 C * /H/&HNS/
 C * /S/&SPHRD/
 C * /$$$$/&ORGLT/
 C * /#####/&ORGLN/
 C * /U/&UNT/
 C * /D/&DDN/
A9: +
 SAVE
END
IF &TICK=&STR(N) THEN GOTO A10
SET &DDN=&STR(4)
SET &BOTTM=&STR(    )
SET &TOP  =&STR(    )
SET &SPCLT=&STR(000500)
SET &DNS=&STR(N)
SET &RIGHT=&STR(    )
SET &LEFT =&STR(    )
SET &SPCLN=&STR(000500)
SET &DEW=&STR(W)
ISPEXEC CONTROL DISPLAY REFRESH
ISPEXEC DISPLAY PANEL(TICKMARK)
ISPEXEC CONTROL DISPLAY REFRESH
E APLCDSCR DATA NON EMODE
 B
 MERGE '#25B.BUGPRGM.TEST(FCARD)'
 TOP
 F '$$$$'
 C * /#/&PRJCT/
 C * /$$$$/&UPPER/
 C * /$$$$/&LOWER/
 C * /#####/&CMRDN/
 C * /H/&HEW/
 C * /H/&HNS/
 C * /S/&SPHRD/
 C * /$$$$/&ORGLT/
 C * /#####/&ORGLN/
 C * /U/&UNT/
 C * /D/&DDN/
 DOWN 1
 C * /$$$$/&BOTTM/
 C * /H/&DNS/
 C * /$$$$/&TOP/
 C * /H/&DNS/
 C * /$$$$/&SPCLT/
 C * /#####/&LEFT/
 C * /H/&DEW/
 C * /#####/&RIGHT/
 C * /H/&DEW/
 C * /#####/&SPCLN/
 SAVE
END
A10: +
E APLCDSCR DATA NON EMODE
 TOP
 IF &LOWER¬=&STR(____) THEN GOTO L1
 F 'P2020'
 C * 999 /_/ /ALL
 L1: +
 SAVE
 END
IF &BSMP=&STR(N) THEN GOTO A23
E APLCDSCR DATA NON EMODE
 B
 MERGE '#25B.BUGPRGM.TEST(BSMPJCL)' NON
 B
 UP 2
 C * /STATE1/&STATE1/
 F 'STATE'
 IF &STATE2¬=&STR( ) THEN GOTO A20
 DEL * 2
 GOTO A22
```

```
A20: +
C * /STATE2/&STATE2/
F 'STATE'
IF &STATE3¬=&STR( ) THEN GOTO A21
DEL *
GOTO A22
A21: +
C * /STATE3/&STATE3/
A22: +
SAVE
END
A23: +
SET &GDSP=&STR(OLD)
SET &PRMY=&STR(50)
SET &SCND=&STR(5)
SET &UNIT=&STR(TR)
ISPEXEC CONTROL DISPLAY REFRESH
ISPEXEC VGET (SGNTCPSG) PROFILE
ISPEXEC DISPLAY PANEL(IMGRGRID)
ISPEXEC VPUT (SGNTCPSG) PROFILE
ISPEXEC CONTROL DISPLAY REFRESH
IF &GDSP=&STR(OLD) THEN GOTO A24
ALLOC DA('&SGNTCPSG') NEW SP(&PRMY,&SCND) &UNIT
A24: +
E APLCDSCR DATA NON EMODE
 B
 IN //ST2.FT27F001 DD DSN=&SGNTCPSG,DISP=OLD
 IN //ST2.FT28F001 DD DSN=&&&&GRID,DISP=(OLD,DELETE)
 IN //ST2.SYSIN DD *
 SAVE
END
SET &TEXTA=&STR( )
SET &TEXTB=&STR( )
ISPEXEC CONTROL DISPLAY REFRESH
ISPEXEC DISPLAY PANEL(IDNTFYR)
ISPEXEC CONTROL DISPLAY REFRESH
SET &HR=&SUBSTR(1:2,&SYSTIME)
SET &MN=&SUBSTR(4:5,&SYSTIME)
SET &TM=&HR&MN
SET &HRMN=&HR&MN
SET &LBL=&STR( )
IF &TEXTB=&STR( ) THEN GOTO A25
SET &LBL=&STR(.)&TEXTB
A25: +
IF &TEXTA=&STR( ) THEN GOTO A26
SET &LBL=&STR(.)&TEXTA&LBL
A26: +
SET &TM=&TM&LBL
COPY '#25B.IMGRAPLC.DATA(HYPRAPLC)' HYPRAPLC.DATA NON
E HYPRAPLC DATA NON
 TOP
 F 'AT000INI'
 C * 99 /INI/&INIT/ALL
 TOP
 F 'AT000'
 C * 99 /NOTIFY=/NOTIFY=#&USER/ALL
 C * 99 /REGION=/REGION=100K/ALL
 C * 99 /TIME=/TIME=1/ALL
 TOP
 F 'AT000'
 C * 99 /#TSO/#&USER/ALL
 TOP
 F 'AT000'
 C * 99 /UACT=/UACT=&JA/ALL
 TOP
 F 'AT000'
 C * 99 /WO=/WO=&LABL/ALL
 TOP
 F 'AT000'
 C * 99 /UORG=/UORG=NRG/ALL
 TOP
 F 'AT000'
 C * 99 /LOS=/LOS=5/ALL
 TOP
 F 'AT000'
 C * 99 /AD=/AD=&AD/ALL
 TOP
 F 'AT000'
 C * 99 /MAN=/MAN=&USER/ALL
 TOP
 F 'HRMN'
 C * 99 /HRMN/AP&HRMN/ALL
 TOP
 F 'TMSTMP'
 C * 99 /TMSTMP/TM&TM/ALL
 SAVE
```

```
END
ISPEXEC VGET (SOURCE DSNCODE) PROFILE
ISPEXEC DISPLAY PANEL(SRCCPS)
ISPEXEC VPUT (SOURCE DSNCODE) PROFILE
IF &SOURCE=&STR(N) THEN GOTO S1
DEL GRIDDSCR
ISPEXEC SELECT CMD(GRIDDSCR)
COPY GRIDDSCR APLCINTR NON
SET &DSNCODE=&STR(GRIDDSCR)
GOTO S2
S1: +
COPY '&DSNCODE' APLCINTR.DATA NON
S2: +
E APLCDSCR DATA NON EMODE
 B
  MERGE APLCINTR NON
 B
  MERGE HYPRAPLC NON
  SAVE
END
DEL (APLCINTR HYPRAPLC)

DSNAME = '#25B.IMGRAPLC.DATA(PRDCSGNT)'                              VOL=SER=TSOV01
DCB=(RECFM=FB,LRECL=80,BLKSIZE=9440)                                 08/24/88 237 14:26:05

)ATTR
/* ***************************************************************/
/* PANEL TO SET UP LOCATE IMAGERY, GEOGRAPHIC, AND WELL LOCATION
/* AND DRILLING RESULT INFORMATION TO POST ON AN APPLICON
/* OR VERSATECH CONTOUR MAP.
/*
/*    THE PROGRAM REQUIRES THE FOLLOWING FOR A MINIMUM CONTOUR MAP.
/*
/*   1     SAS DATA BASE CONTAINING THE MSS SIGNATURE
/*
/*    THE PROGRAM CAN POST THE FOLLOWING OPTIONAL DATA
/*
/*   2     GEOGRAPHIC BASE MAP.
/*   3     WELL LOCATIONS AND DRILLING RESULTS.  MUST BE IN T-CARD
/*         FORMAT AND USE THE CPS WELL CODES.  FILE COULD BE
/*         CREATED BY ANY RECOVERY PROCEDURE OF BY EXECUTING
/*         PROGRAM DRILLING IN THIS PACKAGE.
/*   4     SEISMC LINE SHOT POINTS.  FORMAT AS IN 4 ABOVE.
/*   5     GEOGRAPHIC TICK MARKS.
/*
/* ***************************************************************/
)BODY
%   DATA REQUIRED FOR MINIMAL CONTOUR APPLICON PLOT
%
%   FULLY QUALIFIED DSN OF SAS DATA SET WITH
%   PRODUCTION TRAINED ALTERATION SIGNATURE
%       DATA SET NAME =========>+_PRDCSGNT                                +
%       DATA SOURCE   =========>+_Z+
%       (1) PRODUCTION (BASIC)
%       (2) PRODUCTION (LEVEL 2)
%       (3) PRODUCTION (CLUSTERED)
%
%   MAP ANNOTATION OPTIONS (SPECIFY Y OR N AND DATASET NAME IF Y)
%
%       OPTION         FULLY QUALIFIED DSN OF APPROPRIATE T-CARD FILE
%
% WELLS  :+_Z+    % DATASET NAME ==>:+_PRDC                                +
% SIESMIC:+_Z+    % DATASE  NAME ==>:+_SIES                                +
% TICKS  :+_Z+    % DATASET INTERNAL TO CPS
%
% DO YOU WANT TO POST A BASE MAP (Y OR N) :+_Z+
)INIT
    .ZVARS='(SASF WLLS SHTP TICK BSMP)'
)END

DSNAME = '#25B.IMGRAPLC.DATA(GRIDDSCR)'                              VOL=SER=TSOV01
DCB=(RECFM=FB,LRECL=80,BLKSIZE=9440)                                 08/24/88 237 14:26:05

/* ***************************************************************
/* COMMANDS CREATE A BATCH PTOGRAM TO ADD THE DISCRIMINANT ANALYSIS
/* SURFACE TO THE CPS INTERNAL FILES AND TO DRAW A COLOR CONTOUR MAP
/* OF THE DISCRIMINAT SURFACE.
/*
/* DATA ARE ON LUN=27 IN FILES AS FOLLOWS:
/*
/* FILE 1       UNGRIDDED CONTROL POINTS (DO NOT PLOT IN THIS PROGRAM)
/* FILE 2       BAND 4                   !
/* FILE 3       BAND 5                   ! PIXEL AVERAGED
/* FILE 4       BAND 7                   ! DATA
```

```
/* FILE 5        ALTERATION                  !
/* FILE 6        DISCRIMINANT ALTERATION (GEOCHEMICAL)
/* FILE 7        DISCRIMINANT ALTERATION (PRODUCTION)
/*
/* **********************************************************************
CONTROL LIST CONLIST MSG END(ENDO)
SET &SRFC=4
SET &JOBTITLE=&STR(APPLICON DISPLAY OF IMAGERY DATA)
ISPEXEC VGET (WLLS SHTP TICK) PROFILE
ISPEXEC VGET (XMIN XMAX NCOL YMIN YMAX NROW GRDOPTN) PROFILE
ISPEXEC CONTROL DISPLAY REFRESH
ISPEXEC DISPLAY PANEL(INPTMAPS)
ISPEXEC CONTROL DISPLAY REFRESH
ISPEXEC VPUT (XMIN XMAX NCOL YMIN YMAX NROW GRDOPTN) PROFILE
SET &FILE=&SRFC+1
ISPEXEC CONTROL DISPLAY REFRESH
ISPEXEC VGET (XSCL YSCL PSCL PWID DXO DYO) PROFILE
ISPEXEC CONTROL DISPLAY REFRESH
ISPEXEC DISPLAY PANEL(PLOTDEF)
ISPEXEC CONTROL DISPLAY REFRESH
ISPEXEC VPUT (XSCL YSCL PSCL PWID DXO DYO) PROFILE
SET &MA1=&STR(PHILLIPS PETROLEUM COMPANY_____)
SET &MA2=&STR(RESEARCH AND DEVELOPMENT_____)
SET &MA3=&STR(ENERGY RESOURCES DIVISION_____)
SET &MB1=&STR(_____)
SET &MB2=&STR(LANDSAT MSS IMAGERY DISPLAY___)
SET &MB3=&STR(_____)
SET &IPOS=5
SET &ISZE=1
SET &TSCL=1
SET &ITUT=2
SET &LOGO=1
ISPEXEC VGET (MB4 MD1 MG1A MG1B MG1C) PROFILE
ISPEXEC VGET (MH1A MH1B MH1C MJ1A MJ1B ML1) PROFILE
ISPEXEC VGET (MM1 MM2 MM3 MM4 MM5 MM6) PROFILE
ISPEXEC CONTROL DISPLAY REFRESH
ISPEXEC DISPLAY PANEL(MAPTITLE)
ISPEXEC CONTROL DISPLAY REFRESH
ISPEXEC DISPLAY PANEL(BLKTITLE)
ISPEXEC CONTROL DISPLAY REFRESH
ISPEXEC VPUT (MB4 MD1 MG1A MG1B MG1C) PROFILE
ISPEXEC VPUT (MH1A MH1B MH1C MJ1A MJ1B ML1) PROFILE
ISPEXEC VPUT (MM1 MM2 MM3 MM4 MM5 MM6) PROFILE
ISPEXEC VGET (PRJCT BSMP CLON,CMRD,CMRM,BPLD,BPLM,BPUD,BPUM) PROFILE
ISPEXEC VGET (ISL,ISP,ITCO,ITL,IUNT,SZTN,SZSC) PROFILE
ISPEXEC VGET (OLND,OLNM,OLTD,OLTM,SCAL) PROFILE
ISPEXEC VGET (XLFD,XLFM,XRTD,XRTM,YLWD,YLWM,YUPD,YUPM) PROFILE
ISPEXEC CONTROL DISPLAY REFRESH
ISPEXEC DISPLAY PANEL(BSMPRMTR)
ISPEXEC CONTROL DISPLAY REFRESH
ISPEXEC VPUT (PRJCT BSMP CLON,CMRD,CMRM,BPLD,BPLM,BPUD,BPUM) PROFILE
ISPEXEC VPUT (ISL,ISP,ITGO,ITL,IUNT,SZTN,SZSC) PROFILE
ISPEXEC VPUT (OLND,OLNM,OLTD,OLTM,SCAL) PROFILE
ISPEXEC VPUT (XLFD,XLFM,XRTD,XRTM,YLWD,YLWM,YUPD,YUPM) PROFILE
ISPEXEC VGET (CONMIN,CONMAX,CONINT,IMASK,ISCAL,ICVAL,CONTOUR) PROFILE
ISPEXEC VGET (NCOLOR,XBOR,YBOR) PROFILE
ISPEXEC VGET (COLOR1,COLOR2,COLOR3,COLOR4,COLOR5,COLOR6) PROFILE
ISPEXEC VGET (COLOR7,COLOR8,COLOR9,COLOR10,COLOR11) PROFILE
ISPEXEC CONTROL DISPLAY REFRESH
ISPEXEC DISPLAY PANEL(COLORS)
ISPEXEC CONTROL DISPLAY REFRESH
ISPEXEC VPUT (CONMIN,CONMAX,CONINT,IMASK,ISCAL,ICVAL,CONTOUR) PROFILE
ISPEXEC VPUT (NCOLOR,XBOR,YBOR) PROFILE
ISPEXEC VPUT (COLOR1,COLOR2,COLOR3,COLOR4,COLOR5,COLOR6) PROFILE
ISPEXEC VPUT (COLOR7,COLOR8,COLOR9,COLOR10,COLOR11) PROFILE
DEL GRIDMAPS
E GRIDDSCR DATA NON EMODE
 TOP
 IN    $VC JOB=1,INDT=999,NCOL=&NCOL,NROW=&NROW $END
 IN    &JOBTITLE
 IN    $VC CXIC=1,XMIN=&XMIN,XMAX=&XMAX $END
 IN    $VC CYIC=1,YMIN=&YMIN,YMAX=&YMAX $END
 IN    $VC CMNT=1 $END
 IN ***********************************************************************
 IN READ THE IMAGERY GRID USING READ.
 IN ***********************************************************************
 IN CEND
 IN    $VC INPT=1,ZIDC=1,LUN=28,IFMT=2,MODE=1 $END
 IN    (F20.3)
 IN    $VC REWD=1,LUN=28,ITYP=1 $END
 IN    $VC SAVE=1,ZIDA=1,LUN=27,FILE=&FILE $END
IF &SRFC=&STR(5) THEN GOTO A1
IF &SRFC=&STR(6) THEN GOTO A1
 IN    $VC DELT=1,ZIDA=1 $END
 IN    $VC READ=1,ZIDA=1,LUN=27,FILE=&FILE $END
```

```
A1: +
 IN   $VC STAT=1 $END
 IN   $VC PDEF=1,PSCL=&PSCL,IAOV=1,
 IN      DXO=&DXO,DYO=&DYO,XSCL=&XSCL,YSCL=&YSCL,
 IN      PWID=&PWID $END
 IN   $VC BRDR=1,JSID=0 $END
 IN   $VC CMNT=1 $END
 IN ****************************************************************
 IN MAKE PLOTS FOR THE SIGNATURE GRIDS.
 IN ****************************************************************
 IN CEND
 IN   $VC PPMT=1,IPOS=&IPOS,ISZE=&ISZE,ITLD=&ITLD,&ASCL=&ASCL,
 IN      IUNI=&IUNI,LOGO=&LOGO $END
 IN MA1      &MA1
 IN MA2      &MA2
 IN MA3      &MA3
 IN MB1AREA &MB1
 IN MB2      &MB2
 IN MG1REGION &MG1A   STATE &MG1B   COUNTRY &MG1C
 IN MH1INTERPRETATION BY &MH1A   DATE &MH1B
 IN MJ1PROJCJECTION &MJ1A   CENTRAL MERIDIAN &MJ1B
 IN ML1SCALE &ML1
 IN MM1PROCESSING HISTORY:
 IN MM2 1 - &MM2
 IN MM3 2 - &MM3
 IN MM4 3 - &MM4
 IN MM5 4 - &MM5
 IN MM6 5 - &MM6
 IN MM7 6 - &MM7
 IN MM8 7 - &MM8
 IN MEND
 TOP
 F  'PPMT'
 C * 20 /_/ /ALL
 B
 IN   $VC FENC=1,MODE=2,NPC=5,IFMT=2 $END
 IN   (F10.0/F10.0)
 IN   &XMIN
 IN   &YMIN
 IN   &XMAX
 IN   &YMIN
 IN   &XMAX
 IN   &YMAX
 IN   &XMIN
 IN   &YMAX
 IN   &XMIN
 IN   &YMIN
 IF &BSMP=&STR(N) THEN GOTO C1
 IN   $VC PPBM=1,CLON='&CLON',CMRD=&CMRD,CMRM=&CMRM,IPRJ=&PRJCT,
 IN      BPLD=&BPLD,BPLM=&BPLM,BPUD=&BPUD,BPUM=&BPUM,
 IN      ISL=&ISL,ISP=&ISP,ITGO=&ITGO,ITL=&ITL,
 IN      IUNT=&IUNT,OLND=&OLND,OLNM=&OLNM,OLTD=&OLTD,OLTM=&OLTM,SCAL=&SCAL,
 IN      SZSC=&SZSC,SZTN=&SZTN,
 IN      XLFD=&XLFD,XLFM=&XLFM,XRTD=&XRTD,XRTM=&XRTM,
 IN      YLWD=&YLWD,YLWM=&YLWM,YUPD=&YUPD,YUPM=&YUPM $END
C1: +
 IF &WLLS=&STR(N) THEN GOTO D1
 IN   $VC LGPT=1,MODE=2,ISMB=1,SIZE=0.15,LUN=2,NZ=1,IPRT=0 $END
 IN   $CD FILD=0 $END
 IN   (2F14.6,T127,I2)
 IN   $VC REWD=1,LUN=2,ITYP=1 $END
D1: +
 IF &SHTP=&STR(N) THEN GOTO D2
 IN   $VC LGPT=1,MODE=2,ISMB=-6,SIZE=0.25,LUN=3,NZ=1,IPRT=0 $END
 IN   $CD FILD=0 $END
 IN   (2F14.6,T127,I2)
 IN   $VC REWD=1,LUN=3,ITYP=1 $END
D2: +
 IF &TICK=&STR(N) THEN GOTO D3
 IN   $VC LGPT=1,MODE=2,ISMB=-1,SIZE=1.00,LUN=4,NZ=1,IPRT=0 $END
 IN   $CD FILD=0 $END
 IN   (2F14.6,T125,I2)
 IN   $VC REWD=.,LUN=4,ITYP=1 $END
D3: +
 IN   $VC NWPG=1 $END
 IN   $VC SAVE=1,LUN=97,ZIDA=1 $END
 IN   $VC PNCH=1,LUN=98,IFMT=-1 $END
 IN   $INFO CONMIN=&CONMIN,CONMAX=&CONMAX,CONINT=&CONINT,
 IN         IMASK=&IMASK,ICVAL=&ICVAL,ISCALE=&ISCALE,NDECS=3,
 IN         NCOLOR=&NCOLOR,XBOR=&XBOR,YBOR=&YBOR,
 IN         COLORS=&COLOR1,&COLOR2,&COLOR3,&COLOR4,
 IN                &COLOR5,&COLOR6,&COLOR7,&COLOR8,
 IN                &COLOR9,&COLOR10,&COLOR11 SEND
 IN   $VC STOP=1 $END
 SAVE
END
```

```
DSNAME = '#25B.IMGRAPLC.DATA(INPTMAPS)'                           VOL=SER=TSOV01
DCB=(RECFM=FB,LRECL=80,BLKSIZE=9440)                              08/24/88 237 14:26:05
)ATTR
/* ***************************************************************/
/* PANEL TO SET UP SET UP CPS INPUT AND GRIDDING OPERATIONS
/*
/*   1    TITLE FOR THE CPS RUN
/*   2    SPECIFY THE AREA OF INTEREST FOR THE MAP
/*   3    SPECIFY THE SURFACE TO BE MAPPED
/*        1    BAND 4
/*        2    BAND 5
/*        3    BAND 7
/*        4    MSS ALTERATION SIGNATURE
/*        5    DISCRIMINANT ANALYSIS SIGNATURE (GEOCHEMICAL)
/*        6    DISCRIMINANT ANALYSIS SIGNATURE (PRODUCTION)
/* ***************************************************************/
)BODY
% BASIC CPS INPUT AND GRIDDING OPERATION CONTROL PARAMETERS
%
%     TITLE RUN ==>: +_JOBTITLE                                                    +
%
%     AREA OF INTEREST AND GRID INTERVALS (IN MILES FROM ORIGIN)
%
%     X-MIN=:+_XMIN       + % X-MAX=:+_XMAX        + % # OF X-LINES=:+_NCOL+
%     Y-MIN=:+_YMIN       + % Y-MIN=:+_YMAX        + % # OF Y-LINES=:+_NROW+
%
%     SURFACE PLOTTED (CHOOSE ONE) ==>:+_Z+
%
%          0.  CLUSTER MAP
%          1.  BAND 4
%          2.  BAND 5
%          3.  BAND 7
%          4.  A PRIORI ALTERATION SIGNATURE
%          5   DISCRIMINANT ANALYSIS (GEOCHEMICAL)
%          6.  DISCRIMINANT ANALYSIS (PRODUCTION)
)INIT
   ZVARS='(SRFC)'
)END
```

That which is claimed is:

1. A method of processing spectral data for a preselected set of pixels which correspond to adjacent areas of the earth's surface comprising:
   (a) selecting n waveband(s) as represented by the positive integers 1, ... n;
   (b) obtaining intensity values for each waveband with respect to electromagnetic radiation reflected from areas of the earth's surface corresponding to each pixel so as to yield an intensity data set $\{x_1, \ldots, x_n\}$ for each pixel where $x_1, \ldots, x_n$ correspond to the intensity values for respective wavebands $1, \ldots, n$;
   (c) dividing said intensity data sets into a predetermined number of disjoint data set clusters, wherein any one intensity data set is contained in only one cluster;
   (d) determining the value of each of monotonic functions $f_1(x), \ldots, f_n(x)$, where x represents intensity, for each respective waveband for each pixel in each cluster so as to yield a function data set $\{f_1(x_1), \ldots, f_n(x_n)\}$ for each pixel in each cluster, wherein $f_1(x_1), \ldots, f_n(x_n)$ are hereinafter denoted as $y_1, \ldots, y_n$ respectively;
   (e) selecting certain productive pixels and dry pixels, associated with each of the clusters, previously determined to correspond to hydrocarbon-bearing and nonbearing areas of the earth's surface respectively;
   (f) determining a discriminant probability function, being a function of $y_1, \ldots, y_n$, for each cluster by utilizing the function data sets corresponding to the productive pixels and dry pixels associated with each respective cluster;
   (g) determining for at least one cluster the value P of its corresponding discriminant probability function with respect to at least one function data set and its corresponding pixel, said value of the discriminant probability function being indicative of the probability of the presence of hydrocarbons;
   (h) determining said at least one pixel to be either potentially productive or dry with respect to hydrocarbons based on its corresponding discriminant probability function value.

2. A method as recited in claim 1 wherein step (g) a discriminant probability function value is determined for each pixel in each cluster, and wherein in step (h) certain pixels are selected as potentially productive based on such values.

3. A method as recited in claim 2 further comprising the step of determining the value of a cumulative probability density function CPDF(P) for each pixel in each cluster, and wherein in step (h) said certain pixels are selected if the value of their corresponding CPDF(P) values is above a predetermined value.

4. A method as recited in claim 3 wherein said predetermined value is at least 0.05.

5. A method as recited in claim 3 wherein said productive pixels have productive wellsites associated therewith and wherein said dry pixels have nonproductive wellsites associated therewith.

6. A method as recited in claim 5 further comprising the step of mapping the CPDF(P) values by plotting on a map, of said areas corresponding to said pixels, locations having associated therewith pixels with CPDF(P) values above a predetermined value.

7. A method as recited in claim 6 wherein the functions $f_1(x_1), \ldots, f_n(x_n)$ are cumulative probability density functions for each respective cluster.

8. A method as recited in claim 7 wherein in step (c) said predetermined number of clusters is in the range of 3 to 5.

9. A method as recited in claim 8 wherein the number of wavebands n is at least 2.

10. A method as recited in claim 9 wherein at least one of said wavebands is in the green wavelength range of about 500 nm to about 600 nm.

11. A method as recited in claim 10 wherein another of said wavebands is in the red wavelength range of about 600 nm to about 700 nm.

12. A method as recited in claim 11 wherein the number of wavebands n is at least 3.

13. A method as recited in claim 12 wherein another of said wavebands is in an infrared wavelength range.

14. A method of processing spectral data for a preselected set of pixels which correspond to adjacent areas of the earth's surface comprising:

(a) selecting n waveband(s) as represented by the positive integers $1, \ldots n$;

(b) obtaining intensity values for each waveband with respect to electromagnetic radiation reflected from areas of the earth's surface corresponding to each pixel so as to yield an intensity data set $\{x_1, \ldots, x_n\}$ for each pixel where $x_1, \ldots, x_n$ correspond to the intensity values for respective wavebands $1, \ldots, n$;

(c) dividing said intensity data sets into a predetermined number of disjoint data set clusters, wherein any one intensity data set is contained in only one cluster;

(d) determining the value of each of monotonic functions $f_1(x), \ldots, f_n(x)$ where x represents intensity, for each respective waveband for each pixel in each cluster so as to yield a function data set $\{f_1(x_1), \ldots, f_n(x_n)\}$ for each pixel in each cluster, wherein $f_1(x_1), \ldots, f_n(x_n)$ are hereinafter denoted as $y_1, \ldots, y_n$ respectively;

(e) selecting certain productive pixels and dry pixels, associated with each of the clusters, previously determined to correspond to hydrocarbon-bearing and nonbearing areas of the earth's surface respectively;

(f) determining a discriminant probability function, being a function of $y_1, \ldots, y_n$, for each cluster by utilizing the function data sets corresponding to the productive pixels and dry pixels associated with each respective cluster;

(g) determining for each cluster the value P of its corresponding discriminant probability function with respect to each function data set and its corresponding pixel, said value of the discriminant probability function being indicative of the probability of the presence of hydrocarbons;

(h) plotting a map of the areas corresponding to said pixels based on the P values associated with said pixels.

15. A method as recited in claim 14 further comprising the step of determining the value of a cumulative probability density function CPDF(P) for each pixel in each cluster, and wherein in step (h) locations are plotted on said map which have CPDF(P) values above a predetermined value.

16. A method as recited in claim 15 wherein different ranges of CPDF(P) values are plotted so as to be visually distinguishable.

* * * * *

UNITED STATES PATENT AND TRADEMARK OFFICE
CERTIFICATE OF CORRECTION

PATENT NO. : 4,908,763

DATED : March 13, 1990

INVENTOR(S) : Kenneth R. Sundberg

It is certified that error appears in the above-identified patent and that said Letters Patent is hereby corrected as shown below:

Column 7, line 54, "0.05" should be --- 0.50 ---.

Column 8, line 46, "0.06" should be --- 0.60 ---.

Column 106, claim 4, line 51, "0.05" should be --- 0.50 ---.

Signed and Sealed this

Twenty-seventh Day of August, 1991

Attest:

HARRY F. MANBECK, JR.

Attesting Officer

Commissioner of Patents and Trademarks